US010592709B2

(12) United States Patent
Colby

(10) Patent No.: US 10,592,709 B2
(45) Date of Patent: Mar. 17, 2020

(54) PASSPORT SHIELD

(71) Applicant: Steven Michael Colby, Mountain View, CA (US)

(72) Inventor: Steven Michael Colby, Mountain View, CA (US)

( * ) Notice: Subject to any disclaimer, the term of this patent is extended or adjusted under 35 U.S.C. 154(b) by 0 days.

(21) Appl. No.: 16/186,544

(22) Filed: Nov. 11, 2018

(65) Prior Publication Data

US 2019/0138762 A1    May 9, 2019

Related U.S. Application Data

(63) Continuation-in-part of application No. 15/418,726, filed on Jan. 28, 2017, which is a continuation of application No. 14/660,825, filed on Mar. 17, 2015, now Pat. No. 9,569,777, which is a continuation-in-part of application No. 13/481,104, filed on May 25, 2012, now abandoned, which is a continuation of application No. 12/777,474, filed on May 11, 2010, now abandoned, which is a continuation of application No. 11/350,309, filed on Feb. 7, 2006, now Pat. No. 7,719,425, said application No. 14/660,825 is a continuation-in-part (Continued)

(51) Int. Cl.
*G06K 19/06* (2006.01)
*G06K 7/10* (2006.01)
*G06Q 20/32* (2012.01)
*G06Q 20/22* (2012.01)
*G06K 19/077* (2006.01)
*G06Q 20/40* (2012.01)
*G07G 1/00* (2006.01)

(52) U.S. Cl.
CPC ..... *G06K 7/10158* (2013.01); *G06K 7/10316* (2013.01); *G06K 19/07709* (2013.01); *G06K 19/07758* (2013.01); *G06Q 20/227* (2013.01); *G06Q 20/327* (2013.01); *G06Q 20/3278* (2013.01); *G06Q 20/4012* (2013.01); *G07G 1/009* (2013.01)

(58) Field of Classification Search
CPC .......... G06K 19/07749; G06Q 10/087; B42D 25/00; B42D 25/24; B42D 25/29; B42D 15/042; B42D 15/045
USPC ............ 235/375, 385, 492; 340/572.1, 572.8
See application file for complete search history.

(56) References Cited

U.S. PATENT DOCUMENTS 5,528,222 A    6/1996  Moskkowitz et al.
6,111,506 A    8/2000  Yap et al.
(Continued)

OTHER PUBLICATIONS

Kuklinski, "Automated Authentication of Current Identity", 2004 IEEE Conference on Technologies for Homeland Security, Cambridge, MA, Apr. 21-22, 2004.
(Continued)

*Primary Examiner* — Jamara A Franklin
(74) *Attorney, Agent, or Firm* — Royse Law Firm, PC

(57) ABSTRACT

Various switchable RFID devices are disclosed. These switchable RFID devices may include one or more RFID tags and one or more switches. Some of these one or more switches are optionally wireless. In various embodiments, the switchable RFID devices include cellular phones, security devices, identity devices, financial devices, remote controls, and the like. The switchable RFID devices are optionally disposed in a passport.

16 Claims, 35 Drawing Sheets

Related U.S. Application Data of application No. 13/084,433, filed on Apr. 11, 2011, now abandoned, which is a continuation of application No. 11/458,620, filed on Jul. 19, 2006, now Pat. No. 7,924,156, which is a continuation-in-part of application No. 11/382,052, filed on May 7, 2006, now abandoned, and a continuation-in-part of application No. 11/382,053, filed on May 7, 2006, now abandoned, and a continuation-in-part of application No. 11/382,054, filed on May 8, 2006, now abandoned, and a continuation-in-part of application No. 11/382,264, filed on May 8, 2006, now abandoned, and a continuation-in-part of application No. 11/382,265, filed on May 8, 2006, now abandoned, and a continuation-in-part of application No. 11/420,721, filed on May 26, 2006, now abandoned, said application No. 13/084,433 is a continuation-in-part of application No. 11/382,050, filed on May 7, 2006, now abandoned, said application No. 14/660,825 is a continuation-in-part of application No. 14/468,110, filed on Aug. 25, 2014, now Pat. No. 9,495,852, which is a continuation of application No. 12/577,209, filed on Oct. 12, 2009, now Pat. No. 8,816,826, which is a continuation-in-part of application No. 11/382,054, filed on May 8, 2006, now abandoned.

(60) Provisional application No. 60/712,308, filed on Aug. 30, 2005, provisional application No. 60/715,641, filed on Sep. 10, 2005, provisional application No. 60/752,933, filed on Dec. 21, 2005, provisional application No. 60/758,751, filed on Jan. 13, 2006, provisional application No. 60/782,068, filed on Mar. 13, 2006, provisional application No. 60/744,154, filed on Apr. 3, 2006, provisional application No. 60/746,636, filed on May 6, 2006, provisional application No. 60/685,331, filed on May 27, 2005, provisional application No. 60/650,478, filed on Feb. 7, 2005, provisional application No. 60/678,428, filed on May 6, 2005, provisional application No. 60/700,884, filed on Jul. 19, 2005.

(56) References Cited

U.S. PATENT DOCUMENTS

| | | | |
|---|---|---|---|
| 6,785,405 B2 | 8/2004 | Tuttle et al. | |
| 7,243,840 B2 | 7/2007 | Bason et al. | |
| 7,479,882 B2* | 1/2009 | Mahaffey | G06K 19/07327 340/10.51 |
| 7,837,119 B2 | 11/2010 | Graf et al. | |
| 2006/0065714 A1 | 3/2006 | Jesme | |

OTHER PUBLICATIONS

"Denmark to Launch First Country-wide Scheme", Smart Card News Ltd., Brighton England, 1992.
"Post Office Plans £19.5m Terminal Network in UK", Smart Card News, Apr. 1993, vol. 2, No. 4.
"P&O Passengers Enjoy Cashless Cruising", Smart Card News, Apr. 1994.
"Smart Card Payphones on Channel Tunnel Trains", Smart Card News, Aug. 1994.
"Japan and USA to Push Smart Card Technology", Smart Card News, Aug. 1993.
"NatWest Launch Mondex Global Electronic Cash", Smart Card News, Dec. 1993.
"British Govt Launches Smart Card Initiative", Smart Card News, Dec. 1997, vol. 6, No. 12.
"Gaudi Multiservice Smart Card Trials in Dublin", Smart Card News, Feb. 1994.
"Austria Starts Trials for National Electronic Purse", Smart Card News, Feb. 1995.
"Smart Card Being Used in Swiss Ski Resorts", Smart Card News, Jan. 1993, vol. 2, No. 1.
"BT Tender for Smart Payphones and Cards", Smart Card News, Jan. 1994.
"Swiss Electronic Purse to go Nationwide in 1995", Smart Card News, Jul. 1993.
"Shell Loyalty Scheme Launched in Scotland", Smart Card News, Jul. 1994.
"Major Stored Value Card Plan in Australia", Smart Card News, Jun. 1993.
"Mobile Credit Card from Barclaycard and Mercury", Smart Card News, Jun. 1994.
"Lufthansa AirPlus Card for Frequent Flyers", Smart Card News, Mar. 1993, vol. 2, No. 2.
"Portugal to Lead Europe with Electronic Purse", Smart Card News, May 1993, vol. 2, No. 5.
"Patient Smart Card Trials in Portugal and UK", Smart Card News, May 1994.
"Sun Launches Java Card API for Smart Cards", Smart Card News, Nov. 1996, vol. 5, No. 11.
"Social Security Card Pilot in Spain to Prevent Fraud", Smart Card News, Nov. 1994.
"Russian Banks to Introduce Smart Card Technology", Smart Card News, Nov. 1993.
"Spanish Banks to Launch Electronic Purse Scheme", Smart Card News, Oct. 1993.
"British Gas Leads with UK National Network", Smart Card News, Sep. 1992, vol. 1, No. 1.
"Bank Passbook and Purse in Indonesia", Smart Card News, Sep. 1993.
"Mikcon Austria Bid for World Ticket Card", Smart Card News, Sep. 1994.
"Rabobank Success in Electronic Banking", Smart Card News, Feb. 1993, vol. 2, No. 2.
"Emergency Health Card Trials to Start in Ireland", Smart Card News, Mar. 1995.
In the United States Court of Federal Claims, Case 1:16-cv-01647-SGB, Document 68, Filed Aug. 17, 2018, 43 pages.
International Standard ISO/IEC FEDIS 14443-1: Final Draft. Identification cards—Contactless Integrated circuit(s) carrds—Proximity Cards Parts 1: Physical characteristics. ISO/IEC 2000, Jan. 11, 2000.
ISO/IEC JTC1/SC-17. Identification cards—Contactless integrated circuit(s) cards—Proximity cards = Part 2: Radio frequency power and signal interface, Oct. 8, 2003.
ISO/IEC JTC 1/SC 17. Identification cards m Contactless integrated circuit(s) cards—Proximity cards m Part 3: Initialization and anti-collision, Jul. 27, 2000.
ISO/IEC JTC 1/SC 17, Identification cards m Contactless integrated circuit(s) cards m Proximity cards = Part 4: Transmission protocol, Dec. 4, 2000.
Biometrics Deployment of Machine Readable Travel Documents, ICAO NTWG Biometrics TR v2-0 final TAG 15 Jul. 16, 2004.
Machine Readable Travel Documents. Development of a Logical Data Structure—LDS for Optional Capacity Expansion Technologies, LDS-technical report—Version 1.7 Approved Jun. 4, 2004.
Machine Readable Travel Documents. Supplement to 6th Edition. Part 1.Doc 9303.Release_4.Jun. 2006 Jun. 19, 2006.
Machine Readable Travel Documents Technical Report, PKI for Machine Readable Travel Documents offering ICC Read-Only Access. TR-PKI for MRTDs offering ICC Read-Only Access VI. 1. Oct. 4, 2004.
International Standard ISO/IEC 7816, Information Technology. Identification cards. Integrated circuit(s) cards with contacts.Part 4: Interindustry commands for interchange. May 18, 2001.
International Standard ISO/IEC 7816, Information Technology. Identification cards. Integrated circuit(s) cards with contacts Part 6: Interindustry data elements. May 18, 2001.

(56) References Cited

OTHER PUBLICATIONS

International Standard ISO/IEC 7816, Information Technology. Identification cards. Integrated circuit(s) cards with contacts Part 8: Security related interindustry commands. May 18, 2001.
International Standard ISO/IEC 7816, Information Technology. Identification cards. Integrated circuit(s) cards with contacts Part 9: Additional interindustry commands and security attributes. May 18, 2001.
International Standard, ISO/IEC 14443-3. Identification Cards Integrated circuit(s) cards with contacts. Part 3: Initialization and anticollision. Jul. 4, 2005.
International Standard, ISO/IEC 14443-3. Identification Cards Integrated circuit(s) cards with contacts. Proximity cards. Part 4: Transmission Protocol. Jul. 4, 2005.
First DRAFT Aug. 15, 2005, Machine Readable Travel Documents, Aug. 15, 2005.
International Standard, ISO/IEC 1443-2. Identification cards. Integrated circuit(s) cards with contacts. Proximity Cards. Part 2: Radio frequency power and signal interface. Sep. 18, 2017.

\* cited by examiner

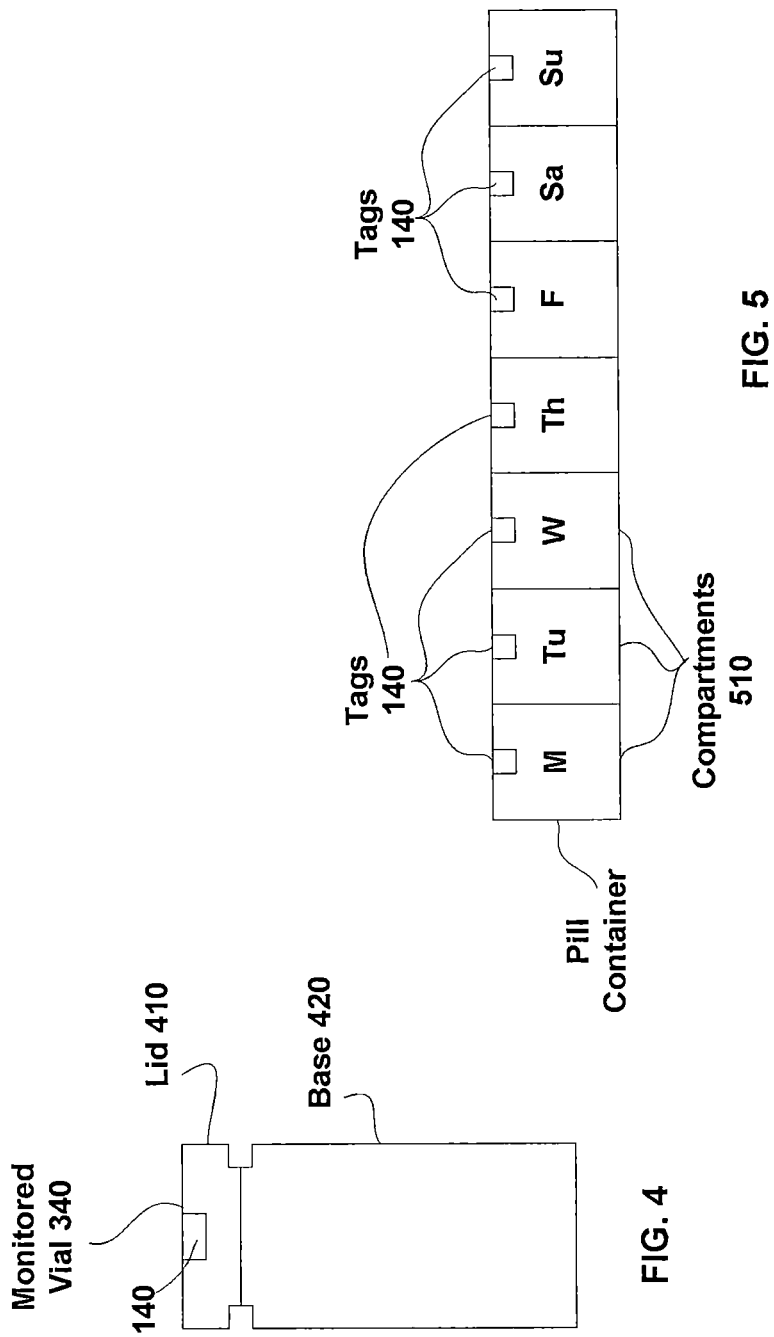

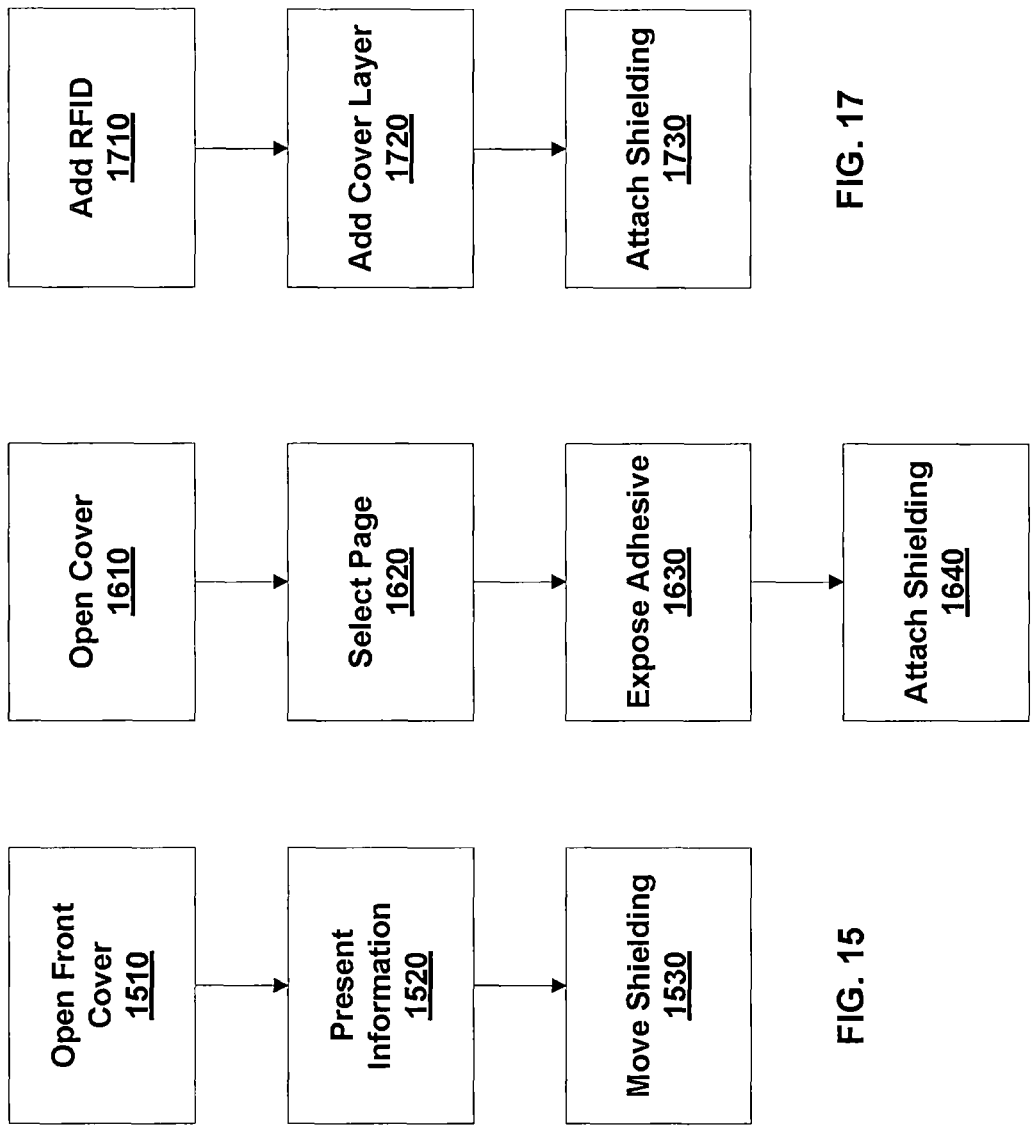

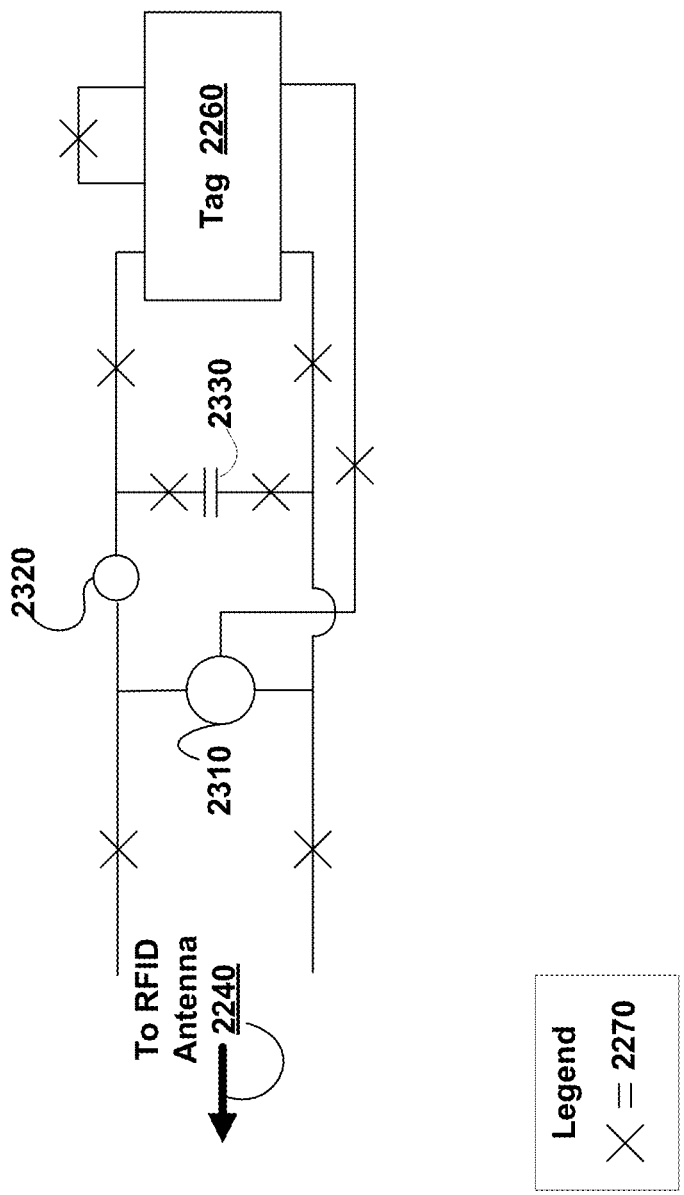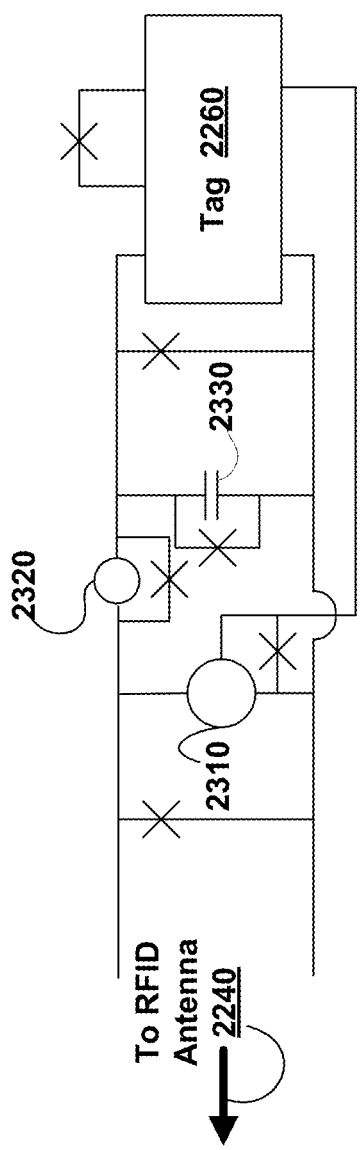

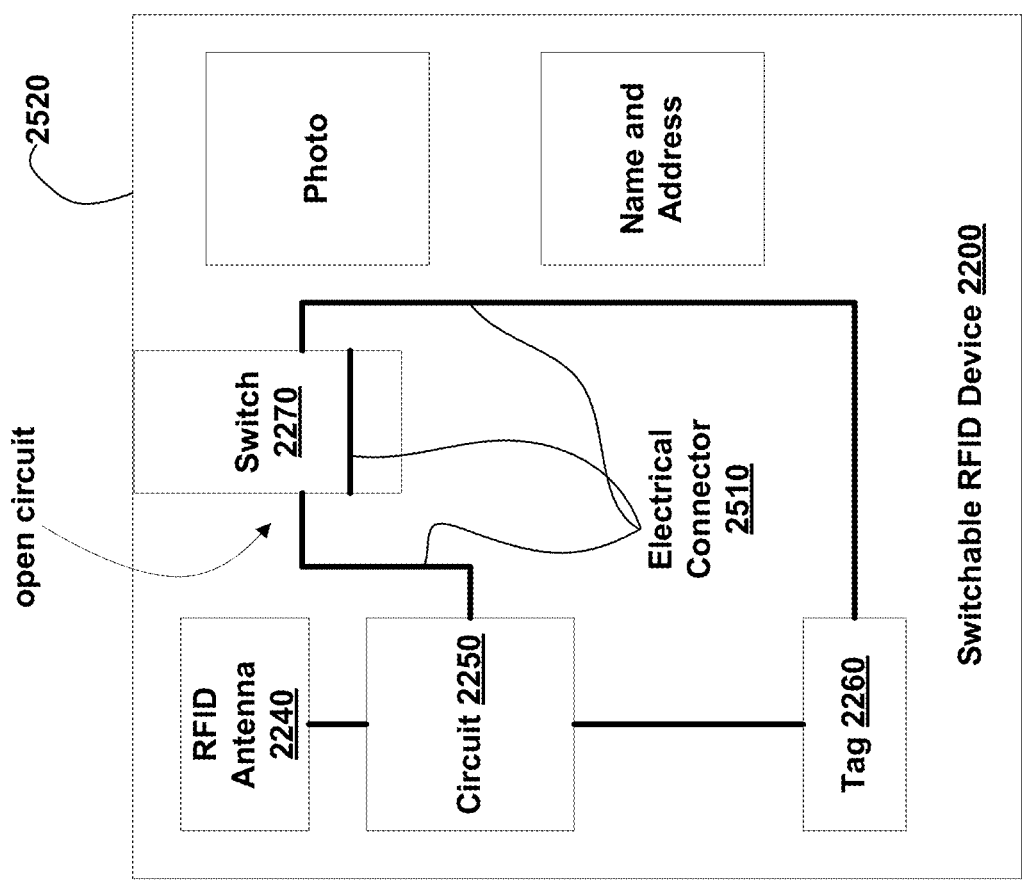

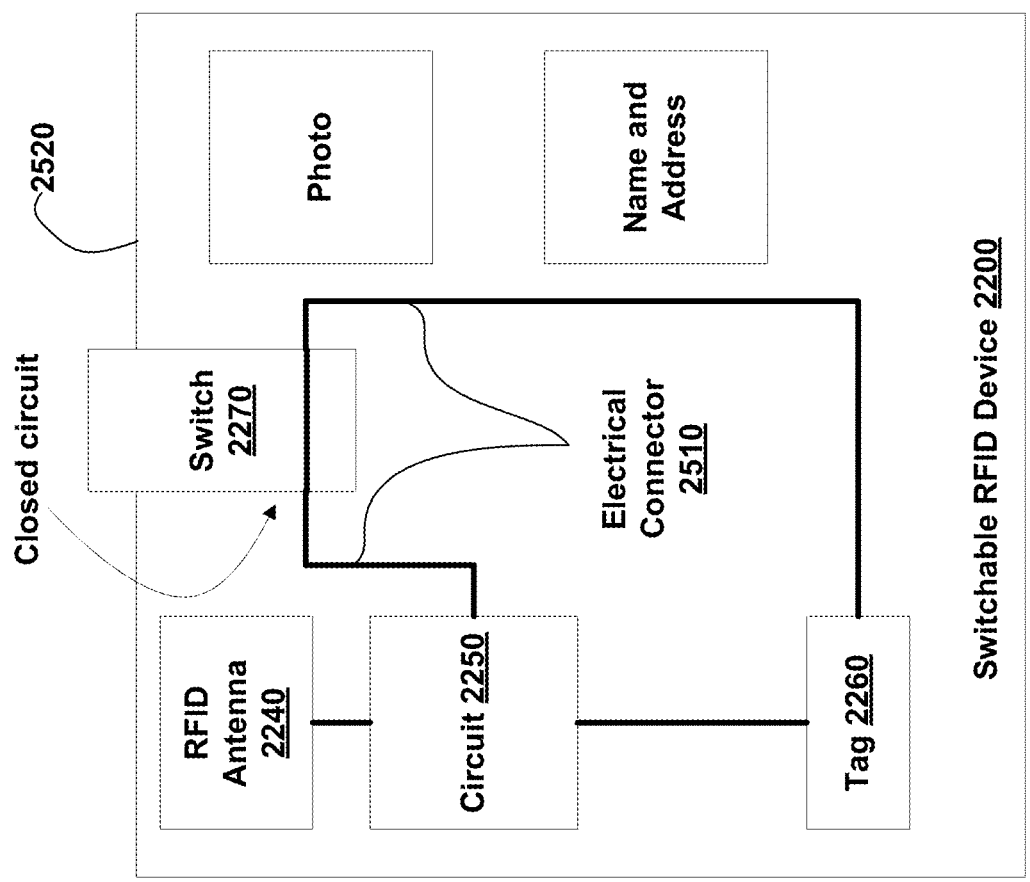
FIG. 25B ON Position

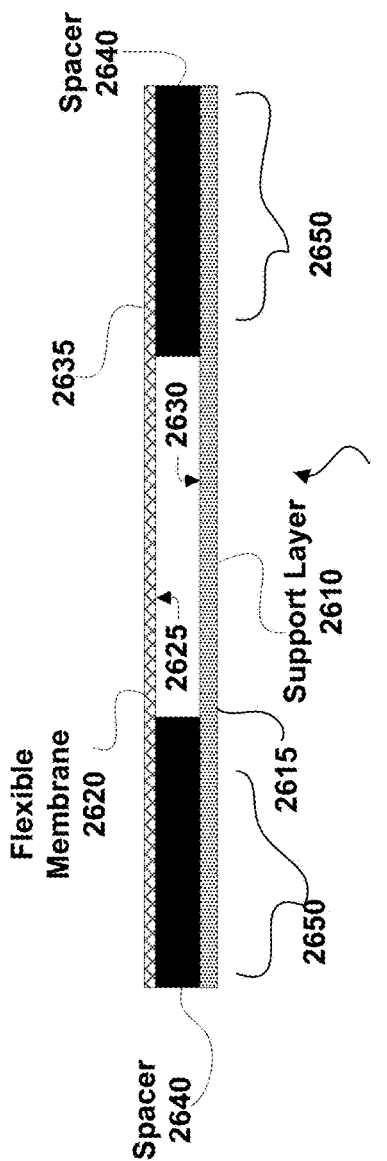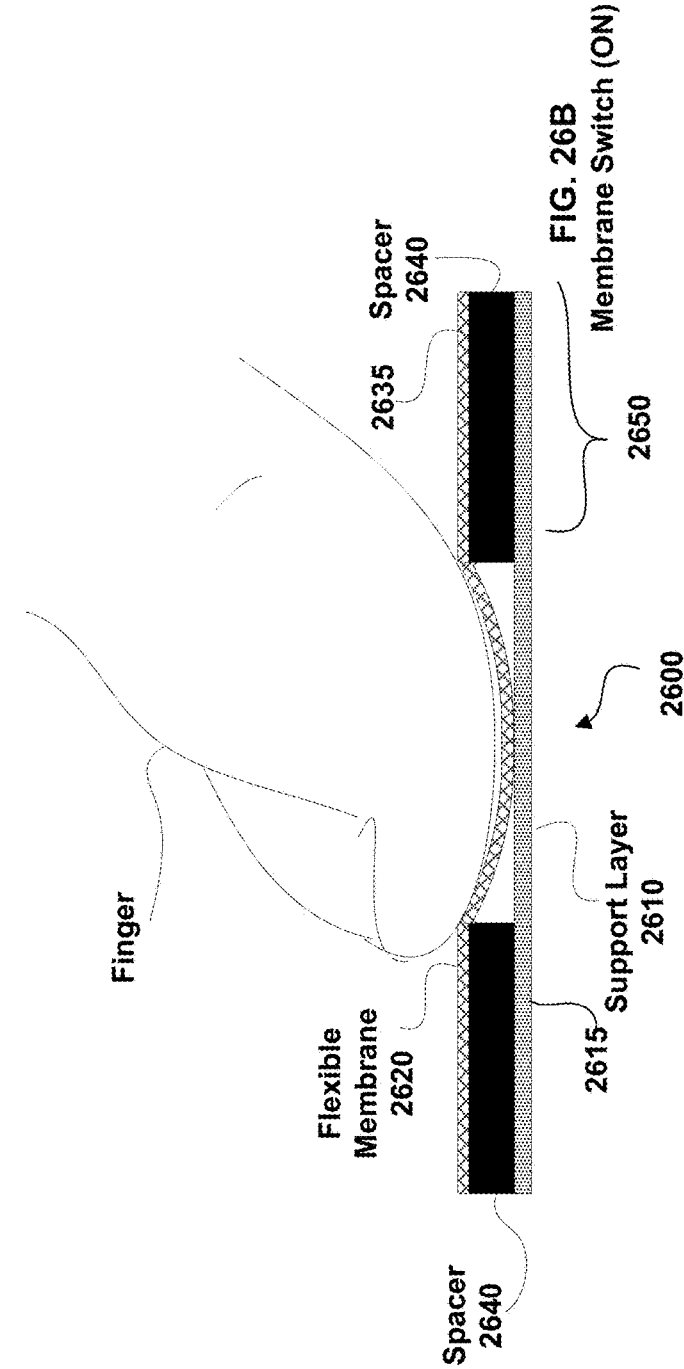

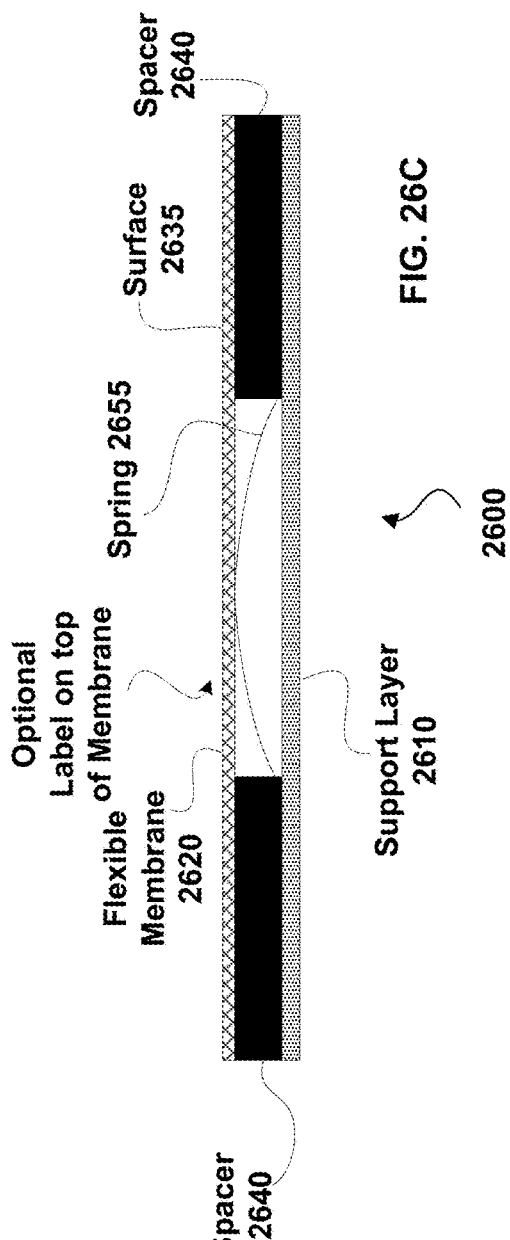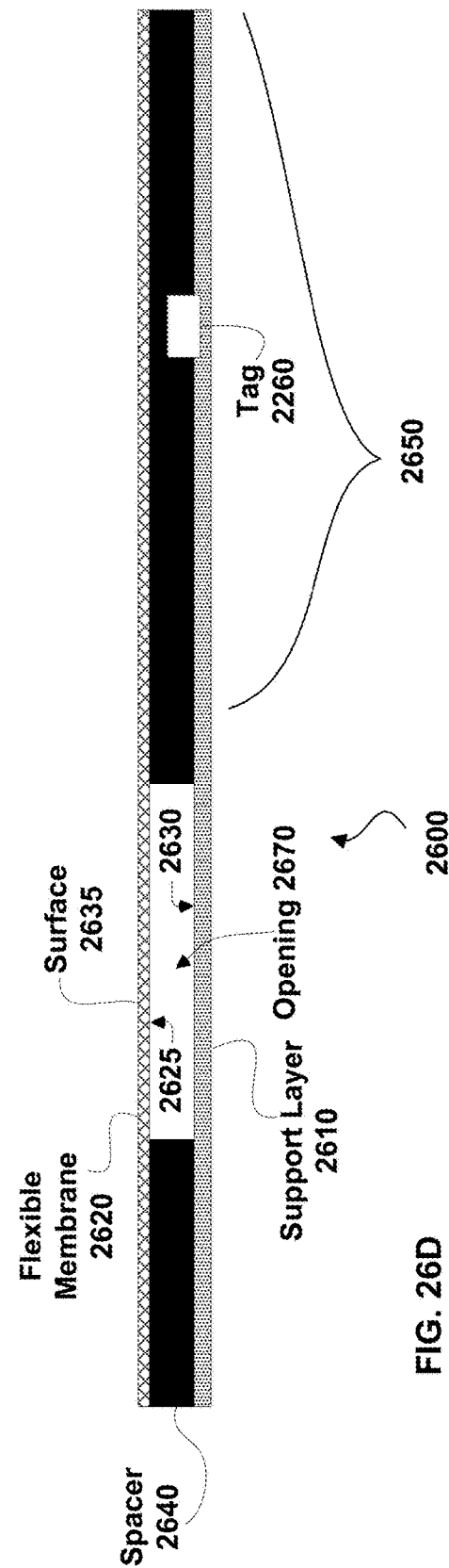

(Top View)

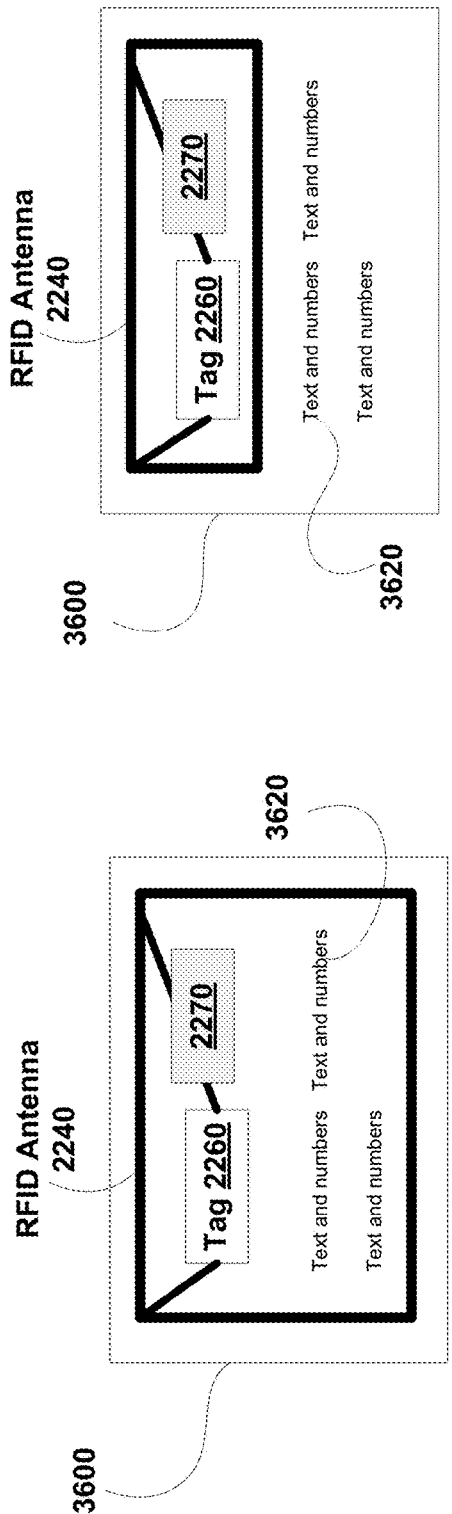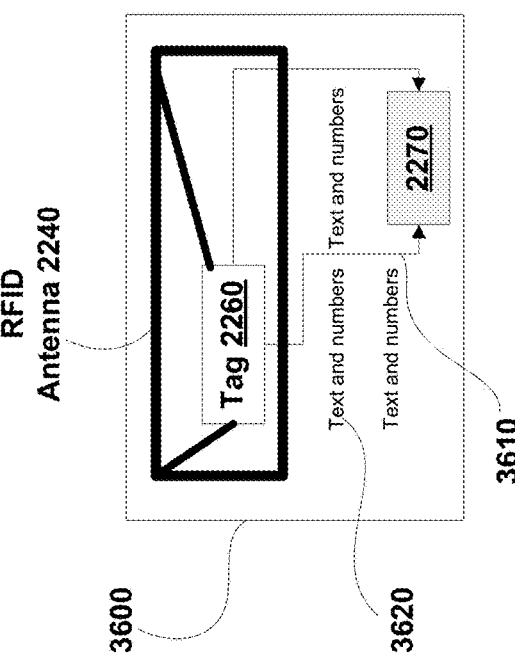
FIG. 37A
FIG. 37B
FIG. 37C

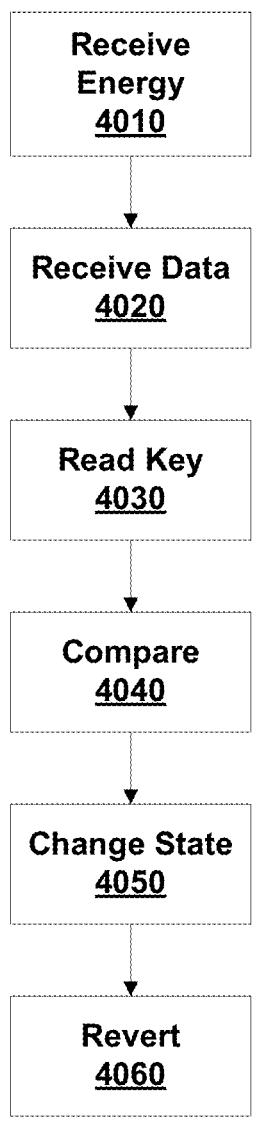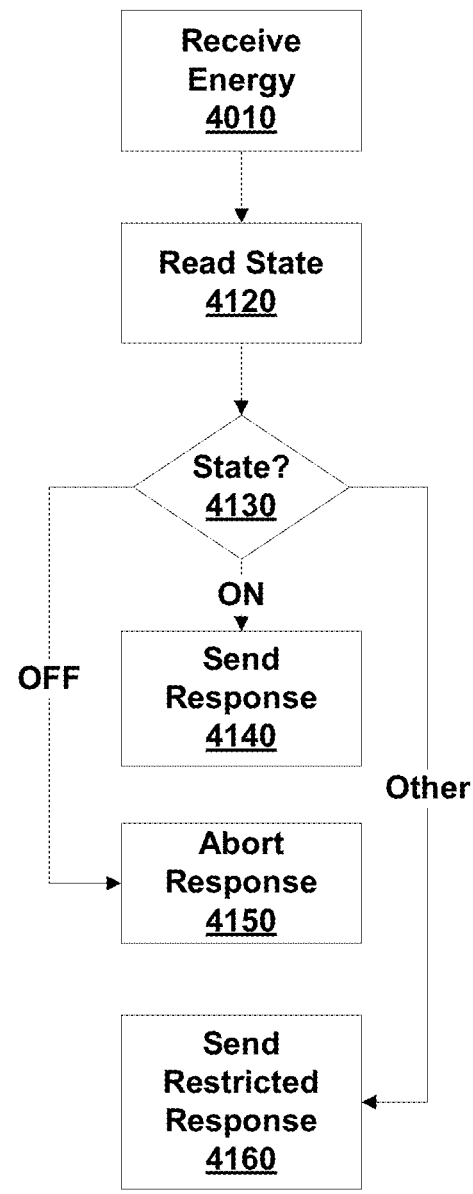
FIG. 40
FIG. 41

PASSPORT SHIELD

CROSS-REFERENCE TO RELATED APPLICATIONS

This application is a continuation of U.S. non-provisional patent application Ser. No. 15/418,726 filed Jan. 28, 2017; which, in turn, is a continuation of U.S. non-provisional patent application Ser. No. 14/660,825 filed Mar. 17, 2015, which in turn is:
a continuation in part of U.S. non-provisional patent application Ser. No. 13/481,104 filed May 25, 2012; which is in turn is a continuation of Ser. No. 12/777,474 filed May 11, 2010, which in turn is a continuation of Ser. No. 11/350,309 filed Feb. 7, 2006, now U.S. Pat. No. 7,719,425, and claims benefit of provisional patent applications:
  60/650,478 filed Feb. 7, 2005,
  60/678,428 filed May 6, 2005,
  60/685,331 filed May 27, 2005,
  60/700,884 filed Jul. 19, 2005,
  60/712,308 filed Aug. 30, 2005,
  60/715,641 filed Sep. 10, 2005,
  60/752,933 filed Dec. 21, 2005, and
  60/758,751 filed Jan. 13, 2006;
a continuation in part of U.S. non-provisional patent application Ser. No. 13/084,433 filed Apr. 11, 2011 which in turn is a continuation in part of Ser. No. 11/458,620 filed Jul. 19, 2006, now U.S. Pat. No. 7,924,156 which is a continuation in part of:
  Ser. No. 11/382,052 filed May 7, 2006,
  Ser. No. 11/382,053 filed May 7, 2006,
  Ser. No. 11/382,054 filed May 8, 2006,
  Ser. No. 11/382,264 filed May 8, 2006,
  Ser. No. 11/382,265 filed May 8, 2006, and
  Ser. No. 11/420,721 filed May 26, 2006,
  and claims benefit of provisional patent applications:
  60/700,884 filed Jul. 19, 2005,
  60/712,308 filed Aug. 30, 2005,
  60/715,641 filed Sep. 10, 2005,
  60/752,933 filed Dec. 21, 2005,
  60/758,751 filed Jan. 13, 2006,
  60/782,068 filed Mar. 13, 2006,
  60/744,154 filed Apr. 3, 2006, and
  60/746,636 filed May 6, 2006, and is
a continuation in part of Ser. No. 11/382,050 filed May 7, 2006, which claims benefit of provisional patent applications:
  60/678,428 May 6, 2005, and
  60/685,331 May 27, 2005; and
a continuation in part of U.S. non-provisional patent application Ser. No. 14/468,110 filed Aug. 25, 2014, which is a continuation of Ser. No. 12/577,209 Oct. 12, 2009, now U.S. Pat. No. 8,816,826, which (Ser. No. 14/468,110) claims benefit of provisional patent applications:
  60/700,884 filed Jul. 19, 2005,
  60/712,308 filed Aug. 30, 2005,
  60/715,641 filed Sep. 10, 2005,
  60/752,933 filed Dec. 21, 2005,
  60/758,751 filed Jan. 13, 2006,
  60/782,068 filed Mar. 13, 2006,
  60/744,154 filed Apr. 3, 2006, and
  60/746,636 filed May 6, 2006, and
is a continuation in part of
  CIP Ser. No. 11/382,052 filed May 7, 2006,
  CIP Ser. No. 11/382,053 filed May 7, 2006,
  CIP Ser. No. 11/382,054 filed May 8, 2006,
  CIP Ser. No. 11/382,264 filed May 8, 2006,
  CIP Ser. No. 11/382,265 filed May 8, 2006,
  CIP Ser. No. 11/420,721 filed May 26, 2006, and
  CIP Ser. No. 11/382,050 filed May 7, 2006 which claims benefit of provisional patent applications:
  60/678,428 filed May 6, 2005, and
  60/685,331 filed May 27, 2005.

The disclosures of the above provisional and nonprovisional patent applications are hereby incorporated herein by reference.

BACKGROUND OF THE INVENTION

Field of the Invention

The invention is in the fields of electronic passports, and more specifically in the field of electronic passports including shielding and/or switchable RFID tags.

Description of Related Art

Radio Frequency identity (RFID) tags are typically small, flexible, and low profile devices that can be affixed to items for electronic tracking and information storage purposes. An RFID tag can be read by an RFID reader when the RFID tag is brought within a certain vicinity of the reader that is broadcasting a radio frequency signal. In some cases, once within that vicinity, the RFID tag receives sufficient power from the radio frequency signal to permit it to transmit a return radio frequency signal using the received power. These RFID tags are referred to as passive RFID tags. In other cases the RFID tag has an independent power source for generating a return radio frequency signal. These RFID tags are referred to as active RFID tags. With either passive or active RFID tags, the return radio frequency signal may include an encoded copy of information stored within the RFID tag. As used herein, RFID tags include radio frequency contactless chips.

SUMMARY

The invention includes the use of shielding in relation to RFID tags. For example, some embodiments of the invention include shielded containers for storing devices including RFID tags. These devices can include identification devices such as passports, credit cards, or driver's licenses.

Some embodiments of the invention include shielded containers and RFID tags, the RFID tags configured for use in determining a state of the container. For example, detection of an RFID tag can be used to determine if the container is open or closed. These embodiments are optionally used in event logging or security.

Some embodiments of the invention include shielding attached to identification devices. This shielding may, for example, be included in a clamshell configuration, as a shielding insert, or as part of a page or cover.

Various embodiments of the invention include a container comprising an RFID tag configured for determining if the container is open or closed, and radio frequency shielding configured to shield a signal from the RFID tag responsive to whether the container is open or closed.

Various embodiments of the invention include a vehicle comprising a receptacle attached to the vehicle and configured to receive an identification device including an RFID tag, and a radio frequency shielding attached to the receptacle and configured to shield the RFID tag when the identification device is placed within the receptacle.

Various embodiments of the invention include a purse comprising a receptacle configured to receive an identification device including an RFID tag, and a radio frequency shielding attached to the purse and configured to shield the RFID tag when the identification device is placed in the receptacle.

Various embodiments of the invention include a wallet comprising a receptacle configured to receive an identification device including an RFID tag, and a radio frequency shielding attached to the wallet and configured to shield the RFID tag when the identification device is placed in the receptacle.

Various embodiments of the invention include a shielded RFID device comprising an identity device including an RFID tag, and a cover physically attached to the device, the cover including a radio frequency shielding material configured to shield the RFID tag in a first position and to not shield the RFID tag in a second position.

Various embodiments of the invention include an identification device comprising a base including a surface configured to display identifying information, an RFID tag configured to transmit identifying information, and a cover including a radio frequency shielding material configured to shield the RFID tag when closed and to allow the RFID tag to communicate with a reader when open.

Various embodiments of the invention include a passport device comprising an RFID tag configured to transmit identifying information, a surface configured to visually display the identifying information, and an attached cover including a radio frequency shielding material configured to shield the RFID tag when the cover is closed, and configured to enable reading of the RFID tag when the cover is open.

Various embodiments of the invention include a passport device comprising a first cover part including identifying information on an inside surface, a second cover part separated from the first cover part by a fold, an RFID tag within the first cover or the second cover part, and a page between the first cover part and the second cover part, the page including shielding configured for shielding the RFID tag in a first position and not shielding the RFID tag in a second position.

Various embodiments of the invention include a driver's license device comprising an RFID tag configured to transmit identifying information, a surface configured to visually display the identifying information, and a cover including a radio frequency shielding material configured to shield the RFID tag in a first position, and configured to enable reading of the RFID tag in a second position.

Various embodiments of the invention include a credit card device comprising an RFID tag configured to transmit account information, an attached cover including radio frequency shielding and configured to move relative to the RFID tag, to shield the RFID tag in a first position, and not to shield the RFID that in a second position.

Various embodiments of the invention include a shielding device comprising a shielding material configured to be temporally attached to an identity device and to shield an RFID tag within the identity device, and an attachment mechanism configured for attaching the shielding material to the identity device.

Various embodiments of the invention include a passport reading system comprising an RFID reader, and a base disposed to form a slot between the base and the RFID reader, a width of the slot configured for passage of a passport in an open position such that shielding material within the passport does not interfere with communications between the RFID reader and an RFID tag included in the passport.

Various embodiments of the invention include a passport reading system comprising a first RFID reader, a second RFID reader, a third RFID reader, the first, second and third RFID readers surrounding a passport reading volume and being disposed such that at least one of the first, second and third RFID readers will be at a proper angle relative to an antenna of an RFID tag within a passport in the passport reading volume to read the RFID tag, and also disposed such that transmission between the RFID tag and the at least one of the first, second and third RFID readers is not prevented by shielding within the passport when the passport is open in the passport reading zone regardless of the angle of the shielding relative to the first, second and third readers.

Various embodiments of the invention include a system comprising a cover material configured for inclusion in a polarity of identity devices, a strip of shielding deposited on the cover material, a first RFID tag deposited on the cover material, a second RFID tag deposited on the cover material, and a cutting area configured to be cut in order to produce the plurality of identity devices, the cut including cutting of the strip of shielding and separation of the first RFID tag and the second RFID tag.

Various embodiments of the invention include a passport comprising an RFID tag configured to transmit identifying information, a surface configured to visually display the identifying information, and a cover including a first part and a second part separated by a fold, the first part including the RFID tag and the second part including a radio frequency shielding configured to shield the RFID tag when the cover is closed, and configured to allow reading of the RFID tag when the cover is open, the radio frequency shielding including metallic fibers disposed within the second part.

Various embodiments of the invention include a passport comprising a first cover part including identifying information including a photograph on an inside surface, a second cover part separated from the first cover part by a fold, an RFID tag within the first cover or the second cover part, and a page between the first cover part and the second cover part, the page including shielding configured for shielding the RFID tag in a first position and not shielding the RFID tag in a second position.

Various embodiments of the invention include a passport comprising a first cover part including an RFID tag disposed at least 5 mm from a fold, a second cover part separated from the first cover part by the fold and including shielding configured for shielding the RFID tag in a first position of the second cover part and not shielding the RFID tag in a second position of the cover part.

Various embodiments of the invention include a system comprising a cover material configured for inclusion in a polarity of identity devices, a strip of shielding deposited on the cover material, a first RFID tag deposited on the cover material, a second RFID tag deposited on the cover material, and a cutting area configured to be cut in order to produce the plurality of identity devices, the cut including cutting of the strip of shielding and separation of a location for depositing of the first RFID tag and a location for depositing of the second RFID tag.

Various embodiments of the invention include a method comprising depositing a radio frequency shielding material on a first part of a cover material, depositing at least a first radio frequency identity tag and a second radio frequency identity tag on a second part of the cover material, cutting the cover material through the radio frequency shielding, and creating a fold in the flexible material, the fold separating the first part of the cover material from the second part of the cover material.

Various embodiments of the invention include a remotely powered RFID (radio frequency identity) tag having an electronically controlled switch. This switch is optionally a remotely (wirelessly) controlled switch. In some embodiments, when the switch is in an off state, the RFID tag will not transmit and when the switch is in an on state the RFID tag will transmit in response to an RF (radio frequency) signal. In some embodiments, the switch includes multiple on states in which different information or signals are transmitted responsive to the state of the switch. The RFID tag includes a memory configured to store the states of the RFID tag and an integrated circuit configured to determine whether to transmit responsive to the stored state of the RFID tag and a received RF signal.

Various embodiments of the invention include switchable RFID devices. These switchable RFID devices can include identity documents such as passports or driver's licenses, financial cards such as credit or debit cards, remote controls, security devices, access devices, communication devices, or the like. In some embodiments, more than one switchable RFID tag is included in a single RFID device. In various embodiments, one or more switches are used to change operation of an RFID tag from a responsive state to a non-responsive state, to change operation of an RFID tag from one responsive state to another responsive state, to enter data into an RFID device, to control an external device, or the like. In various embodiments, the switches are electronic, wireless, and/or mechanical.

Various embodiments of the invention includes an RFID tag comprising an antenna configured to receive data in a first RF signal, to receive energy from the first RF signal, and to transmit data in a second RF signal, the transmission of the second RF signal being powered by the energy received from the first RF signal; and an integrated circuit including an input configured to receive data from the antenna and to receive power resulting from the energy received from the antenna, an output configured to provide an RF signal to the antenna for transmission, a state memory configured to store an ON/OFF state of the RFID tag, a key memory configured for storing a key for changing the ON/OFF state stored in the state memory, and a switch logic configured to receive data from the input, to read the key from the key memory, to compare the received data with the read key, and to change the ON/OFF state stored in the state memory responsive to this comparison, the switch logic is further configured to determine whether or not to provide a second RF signal to the antenna for transmission, the determination being responsive to the ON/OFF state stored in the state memory.

Various embodiments of the invention include a method of changing an ON/OFF state of an RFID Tag, the method comprising receiving energy sufficient to power the RFID Tag through an RF antenna included in the RFID tag, receiving first data through the RF antenna, reading a key from a key memory, using an integrated circuit to compare the first data received through the RF antenna with the key read from the key memory, the integrated circuit powered by the received energy, and writing data to state memory responsive to the comparison, the data written to the state memory being configured to change the RFID tag from an OFF state in which the RFID tag will not transmit an RF signal to an ON state in which the RFID tag will transmit an RF signal.

Various embodiments of the invention includes a method of operating an RFID tag, the method comprising receiving energy sufficient to power the RFID tag through an RF antenna included in the RFID tag, reading a state from state memory, sending an RF response through the RF antenna unless the read state is an OFF state.

Various embodiments of the invention includes a method of operating an RFID tag, the method comprising receiving energy sufficient to power the RFID tag through an RF antenna included in the RFID tag, reading a state from state memory, sending an RF response through the RF antenna if the read state is an ON state, and disabling the RF response through the RF antenna if the read state is an OFF state.

Various embodiments of the invention includes a method of operating an RFID tag, the method comprising receiving energy sufficient to power the RFID tag through an RF antenna included in the RFID tag, reading a state from state memory, sending an RF response through the RF antenna only if the read state is an ON state.

Various embodiments of the invention includes a multi-layer identity document comprising a first outer layer, an electrical conductor configured to conduct a current, a spacer layer including an opening configured to contain a switch activator, the switch activator configured to make and break an electrical connection to the electrical connector, and an inner layer disposed such that the spacer layer and switch activator are between the first outer layer and the second outer layer, the inner layer being configured to be pressed to activate the switch activator.

Various embodiments of the invention includes a switchable RFID tag comprising an antenna configured to receive an RF transmission, an integrated circuit configured to generate a response transmission, and a switch configured to turn on and of the ability of the integrated circuit to generate the response transmission, the switch being disposed such that it is surrounded by the antenna.

Various embodiments of the invention includes a system comprising a plurality of switches configured for a user to enter data, logic configured to transmit a first wireless signal responsive to the entered data, and a circuit configured to receive energy from a received second wireless signal and to power the logic and the transmission of the system using the received energy.

Various embodiments of the invention includes a system comprising logic configured to transmit a first wireless signal in response to a received second wireless signal, a wireless I/O configured to receive the second wireless signal and to transmit the first wireless signal, a memory configured to store an account number, the account number being included in the first wireless signal, a physical contact I/O configured for writing the account number to the memory, logic configured to allow writing of the account number to the memory if the account number is received via the physical contact I/O but if the account number is received via the wireless I/O, and a circuit configured to receive energy from the received second wireless signal and to power the logic and the transmission of the first wireless signal using the received energy.

Various embodiments of the invention includes a system comprising logic configured to transmit a first wireless signal in response to a received second wireless signal, a wireless I/O configured to receive the second wireless signal and to transmit the first wireless signal, the second wireless signal including an identification data associated with a reader, a memory configured to store a log of received identification data received from a plurality of readers, a physical contact I/O configured for uploading the log of received identification data from the memory, logic configured to allow uploading of the log of received identification data from the memory via the physical contact I/O but via the wireless I/O, and a circuit configured to receive energy from the received second wireless signal and to power the logic and the transmission of the first wireless signal using the received energy.

Various embodiments of the invention includes a method comprising mounting a plurality of RFID antenna and RFID tags on a support, mounting a the support on a first side of a spacer, the spacer including opening 140 and optionally including one or more cavity to receive the RFID tags, mounting a cover layer on a second side of the spacer, and cutting the support and spacer to generate a plurality of RFID enabled financial Cards.

Various embodiments of the invention include a method comprising mounting an RFID antenna and RFID tag on a support, mounting a spacer on the support, the spacer being compliant (soft) so that the RFID tag can enter a plane of the spacer to form a cavity, allowing the spacer to harden, and mounting a cover layer on the spacer.

Various embodiments of the invention include a method of assembling an identity device, the method comprising depositing an integrated circuit, antenna and switch contacts on a support layer, and laminating the support layer, spacer and flexible membrane together, the spacer having a cavity in which the integrated circuit fits.

Various embodiments of the invention include a method of assembling an identity device, the method comprising depositing an integrated circuit, antenna and switch contacts on a support layer 150, depositing spacer 120 on the support layer, spacer 120 covering the integrated circuit, and depositing a flexible membrane on the support layer, the flexible membrane or the support layer optionally including an image of a user. The Spacer is optionally configured to create a hermetic seal around the integrated circuit and/or the RFID antenna.

Various embodiments of the invention include a method comprising programming data to non-volatile memory of an RFID tag in a programmable mode, and changing a state of a switch coupled to the RFID tag so as to change the RFID tag from the programmable mode to a non-programmable mode.

Various embodiments of the invention include an RFID tag comprising an antenna configured to transmit data, a power circuit configured to provide power, an integrated circuit configured to receive power from the power circuit, to provide the data to the antenna, the integrated circuit including a non-volatile memory configured to store the data and a logic circuit configured to determine a state of a switch, the switch being configured to control whether the volatile memory can or cannot be programmed.

Various embodiments of the invention include an integrated circuit comprising a first logic input configured for determining a state of a switch, a power input configured to receive power from a radio frequency antenna, the received power being sufficient for powering the integrated and transmitting a data output signal via the radio frequency antenna, and a data output configured for generating the data output responsive to the state of the switch as determined by the first logic input.

Various embodiments of the invention include an Identity Device comprising an RFID antenna configured to receive power from and communicate with an RFID reader, a circuit configured to receive power from the RFID Antenna, a tag configured to be powered by power received through the RFID antenna and to generate a signal for transmission between the RFID antenna and the RFID reader, and a switch configured to repeatedly turn on and turn off detectability or readability of the tag.

Various embodiments of the invention include a locking mechanism comprising a RFID tag activation circuit configured to turn on a switchable RFID tag by operating a switch within the switchable RFID tag, an RFID reader configured to read the switchable RFID tag, and a lock configured to open responsive to the RFID reader.

Various embodiments of the invention include a method of operating an RFID tag, the method comprising activating a switch in order to turn on the detectability or readability of the RFID tag, the RFID tag powered by power received through an RFID antenna, and activating the switch in order to turn off the detectability or readability of the RFID tag. In some embodiments, the switch is configured to keep the readability of the RFID tag off until the switch is activated again. The switch optionally being included in an identity device.

Various embodiments of the invention include a method of operating a switchable RFID tag, the method comprising operating a switch to turn the RFID tag on, responsive to a first action of a user, receiving a signal at an RFID antenna, collecting power from the signal, using the collected power to power an integrated circuit, collecting data from the signal, processing the collected data using the integrated circuit, transmitting a signal generated by the integrated circuit in response to the collected data, using the RFID antenna, and operating the switch to turn the RFID tag off, responsive to a second action of a user.

Various embodiments of the invention include a switchable RFID tag comprising an RFID antenna configured to receive power from and communicate with an RFID reader, a tag configured to be powered by power received through the RFID antenna and to generate a signal for transmission between the RFID antenna and the RFID reader, and a switch configured to repeatedly turn on and turn off detectability or readability of the tag.

Various embodiments of the invention include a method of controlling an electronic device, the method comprising receiving a wireless RF signal from an RF transmitter, converting the received RF signal into electronic power, generating a wireless return signal using the electronic power, the wireless return signal configured to control the electronic device, placing a switch in a first position to turn on the generation of the wireless return signal, placing the switch in a second position to turn off the generation of the wireless return signal, and returning the switch to the first position to turn on the generation of the wireless return signal.

Various embodiments of the invention include a method of controlling an electronic device, the method comprising receiving a wireless RF signal from an RF transmitter; converting the received RF signal into electronic power; repeatedly changing a switch from a first position to a second position; and generating a wireless return signal using the electronic power, the wireless return signal configured to control the electronic device and being responsive to whether the switch is in the first position and the second position.

Various embodiments of the invention include a system comprising an antenna configured to receive a wireless RF signal from an RF transmitter, a power circuit configured to convert the RF signal into electronic power, a circuit configured to receive the electronic power and to send a wireless response signal in response to the RF signal, and a first switch configured to repeatedly turn on and off a first operation of the circuit under control of a user.

Various embodiments of the invention include a method of receiving control instructions, the method comprising, generating a wireless RF signal, transmitting the wireless RF signal to a RF powered remote control device configured to send a wireless return signal responsive to the states of one or more switches, the return signal being generated and transmitted using power converted from the wireless RF signal, receiving the return signal, and determining the states of the one or more switches using the received return signal.

Various embodiments of the invention include a system comprising a RF transmitter configured to send a wireless RF signal, a controlled device, a RF powered remote control configured to be powered by the wireless RF signal and to send a wireless response signal to the controlled device responsive to a first switch, the first switch configured to be repeatedly turned on and off by a user.

Various embodiments of the invention include a method of operating an RFID tag, the method comprising receiving energy sufficient to power the RFID tag through an RF antenna included in the RFID tag, reading a state from state memory, and sending an RF response through the RF antenna unless the read state is an OFF state.

Various embodiments of the invention include a method of operating an RFID tag, the method comprising receiving energy sufficient to power the RFID tag through an RF antenna included in the RFID tag, reading a state from state memory, sending an RF response through the RF antenna if the read state is an ON state, and disabling the RF response through the RF antenna if the read state is an OFF state.

Various embodiments of the invention include a method of operating an RFID tag, the method comprising receiving energy sufficient to power the RFID tag through an RF antenna included in the RFID tag, reading a state from state memory, sending an RF response through the RF antenna only if the read state is an ON state.

BRIEF DESCRIPTION OF DRAWINGS

FIG. 4 illustrates further details of an embodiment of the container of FIG. 2 that includes a monitored vial.

FIG. 5 illustrates another embodiment of a monitored vial that includes more than one compartment.

FIG. 15 illustrates a method of allowing communication to an RFID tag, according to various embodiments of the invention.

FIG. 16 illustrates a method of modifying an RFID enabled identification device, according to various embodiments of the invention.

FIG. 17 illustrates a method of making an identity device including, according to various embodiments of the invention.

FIGS. 23 and 24 illustrate some of many possible locations for a switch within a switchable RFID device, according to various embodiments of the invention;

FIG. 25A illustrates an OFF Position of a switch, according to various embodiments of the invention;

FIG. 25B illustrates an ON position of a switch, according to various embodiments of the invention;

FIGS. 26A and 26B illustrates a membrane switch, according to various embodiments of the invention;

FIG. 26C illustrates an embodiment of a membrane switch including a spring, according to various embodiments of the invention;

FIG. 26D illustrates a cross-sectional view of a membrane switch disposed within a switchable RFID Tag, according to various embodiments of the invention;

FIGS. 37A-37C illustrate an antenna within a credit card, according to various embodiments of the invention;

FIG. 40 is a flowchart illustrating a method of changing a state of the RFID tag illustrated in FIG. 22, according to various embodiments of the invention; and FIG. 41 is a flowchart illustrating a method of operating the RFID tag illustrated in FIG. 22, according to various embodiments of the invention.

DETAILED DESCRIPTION

Figure 2:
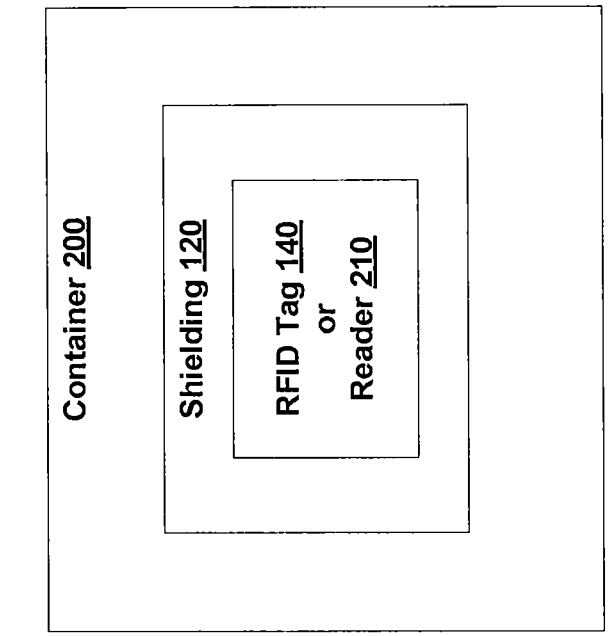
FIG. 2 illustrates a container including an RFID tag or alternatively an RFID tag reader.

Various embodiments of the present invention includes holders (e.g., containers) including radio frequency shielding materials to protect items, such as IDs (identification devices), incorporating RFID tags from being read. In some embodiments, a person can allow information within an RFID tag to be read by removing the item from the holder, while in other embodiments the holder is merely opened or removed to allow the RFID tag to be read. Replacing the item within the holder, or closing the holder, secures the item's RFID tag from unwanted readings from, or detection by, unknown or unauthorized RFID readers. It will be appreciated that items other than IDs, such as library books, consumer electronics, medications, and so forth, can also include, or be packaged with, RFID tags that a person may wish to shield from unauthorized RFID readers. Holders specifically tailored for such items, as well as general purpose holders such as wallets, purses and briefcases, can also include radio frequency shielding (also referred to herein as shielding) according to the present invention.

The holder can be in the general form of a container as an illustrative example, having two similar rectangular sides joined around three edges, being configured to be repeatedly opened and close, and optionally including a closure or flap along the fourth side. Such holders are well suited to the typical shape of most personal IDs such as passports, driver's licenses, green cards, credit and debit cards, medical information cards, insurance cards, medical alerts, student identification cards, security badges, immigration documents, or the like. Typically, the holder is configured to be repeatedly opened and closed to receive the ID.

The holder can also be a case such as a carrying-case for a cell phone or digital camera. The holder can also be a purse, suitcase, backpack, briefcase, satchel, glove compartment, a jewelry container, and the like. In some embodiments, the RF shielding is physically attached to the holder. The holder can alternatively include a checkbook holder, a wallet, a ticket holder, or a windshield visor pocket. Some embodiments of the invention are directed at articles of clothing in which one or more pockets include an attached radio frequency shielding material. Additional embodiments are directed to key holders.

The desirability of RFID shielding for the objects listed above will be readily appreciated. Being able to read an RFID tag on a green card (an immigration document) without the owner of the green card giving consent or being aware that the green card is being read, for example, can enable less scrupulous individuals to engage in improper behaviors. Incorporating RFID shielding into a wallet, purse, or other type of holder would prevent an RFID tag on an item within the holder from being read unless the item is deliberately exposed to the RFID reader, for instance, by removing the item from the holder. In view of the problem of identity theft, such shielding is desirable for credit cards with RFID tags, social security cards with RFID tags, driver's licenses with RFID tags, and so forth.

In some instances the RFID tag is essentially a label that has been attached to an object for inventory or similar purposes. Library books can carry RFID tags, for example. Accordingly, providing RFID shielding for various carrying devices, such as purses, suitcases, book bags, briefcases, and satchels can prevent RFID tags in library books and other objects from being read without permission. In other instances the RFID tag is more integral with an object. Consumer electronics, electronic media, and so forth, can be manufactured to include RFID tags inside of housings, on printed circuit boards, and on electronic components, for example. Often, such devices have specially designed cases such as cell phone cases and camera cases. These cases can also comprise RFID shielding to prevent the RFID tags in the associated devices from being read without authorization.

In some embodiments, the holder is clear (e.g., transparent) so that the ID, such as a driver's license, can be readily seen without having to be removed from the holder. Many wallets include either a plastic sleeve or a leather pocket with a plastic window for this purpose. In some embodiments, of the invention in which at least part of the holder is transparent, the shielding in the transparent region needs to also be transparent. Certain electrically conductive polymers can serve as the RFID shielding material in these embodiments. Other transparent and non-transparent materials for RFID shielding are discussed further herein.

In some embodiments, the holder is designed to allow the ID to be easily and repeatedly removed and returned. For instance, some credit and debit cards have a smaller format (mini-cards) and can be stored in a matching case that can serve as a fob for keys. In some of these embodiments, the holder and the ID card are pivotally attached to one another so that the ID card can flip out from the holder, and in still further embodiments a spring mechanism aids in extending and retracting the ID card. Other cases of the present invention can comprise a clamshell configuration. Such ID card holders of the present invention include an RFID shielding material.

The present invention also provides for articles of clothing designed to include pockets that can shield RFID tags on objects within the pockets. In these embodiments the articles of clothing can be made from a cloth that includes a radio frequency shielding material, or the pocket can be lined with the radio frequency shielding material.

The present invention also provides for key holders comprising RFID shielding. The keys that are held by such key holders can be either mechanical or electronic, where mechanical is used herein to refer to keys meant to fit into mechanical locks such as car keys, house keys, and the like. Electronic keys refer to keys that carry an encoded password on a magnetic strip, a bar code, an RFID tag, or the like. Either type of key can include an RFID tag as either a further component of the locking mechanism or for completely unrelated reasons. An RFID tag on a key is part of the locking mechanism, for example, when the lock reads the RFID tag for some purpose, such as to read the key numbers from RFID tags on different keys in order to track which keys are being used in the lock.

Electronic keys are often placed on ID badges and other forms of identification. An RFID tag with such electronic keys may carry confidential information but be unrelated to the lock mechanism. In some embodiments, the key holder is retractable, and in some of these embodiments the key holder is spring-loaded to automatically retract the key into the key holder.

In the embodiments described herein, the holder, whether an container, case, article of clothing, or key holder, has some form of opening through which the ID or other object having an RFID tag can be transferred. In some embodiments, the holder also includes a closure for closing the opening. In some of these embodiments, the closure can comprise a flap that closes over the opening. In other embodiments the closure is a zipper, Velcro, or related closure device. The closure can provide an electrical contact between opposing sides of the opening, in some instances.

In some embodiments, the RFID shielding material is incorporated into an ID. For example, a passport can include an RFID shielding material in the passport's cover so that an RFID tag within the passport can only be read when the passport is opened. Similarly, a driver's license can include a clamshell cover and base including an RFID shielding material, or a pivoting cover including an RFID shielding material.

The RFID shielding material can be provided in numerous different ways. The radio frequency shielding material can include a conductive material such as a metal or an electrically conductive plastic. The RFID shielding can be attached using adhesive. The radio frequency shielding material can include a mesh with a mesh size small enough to provide shielding against the radio frequency range used by RFID readers. The radio frequency shielding material can be laminated, either by laminating the RFID shielding material to another layer, such as a protective material layer, and/or by laminating together multiple layers of RFID shielding materials. In many embodiments the RFID shielding material is either flexible, transparent, or both. Examples of suitable RFID shielding materials include metal-coated elastomers such as aluminized Mylar and copper-coated plastic sheets and films. In some embodiments, the RFID shielding material is a semi-transparent mesh.

In some embodiments, the RFID shielding material is effective to form a Faraday cage around the ID, object, or key. Closing the closure can be effective to complete the Faraday cage, in some instances. In other embodiments the RFID shielding is used in selective locations in the holder. For example, where a nation's passport includes an RFID tag in a lower right-hand corner of the cover, passport holders designed for that nation's passports need only include RFID shielding above and/or below the location of the RFID tag when the passport is in the passport holder.

The RFID shielding shields an RFID tag from a reader in two ways. First, the RFID shielding greatly reduces the power being broadcast from the reader that reaches the RFID tag within the holder. This cuts the power available to the RFID tag to transmit information back. Secondly, even if the RFID tag receives enough power to transmit, the signal sent from the RFID tag is also attenuated. Accordingly, it will be appreciated that the effectiveness of the RFID shielding can be varied considerably based on choices of radio frequency shielding materials and their thicknesses, mesh sizes, and so forth. In some embodiments, the radio frequency shielding material provides a reduction of input power to the RFID tag by between about 5 db-30 db, 10 db-25 db, 15 db-20 db, or more than 15, 25, 35 or 45 db.

In some embodiments, the container is configured to be repeatedly opened and closed to receive an item including an RFID tag. In some embodiments, the container includes a closure configured to enhance the shielding.

In some embodiments, the container configured to just fit a standard California driver's license. These embodiments may be characterized by inner dimensions of less then 3.5 inches, 3.75 inches, 4 inches or 4.5 inches height, and less than 2.25 inches, 2.5 inches or 2.75 inches in width. In some embodiments, the container is configured to just fit a U.S. passport or a passport issued by another country. These embodiments may be characterized by inner dimensions of less then 5 inches, 5.25 inches, 5.5 inches or 6 inches in height, and less than 3.5 inches, 3.75 inches, 4 inches or 4.5 inches in width.

Figure 1:
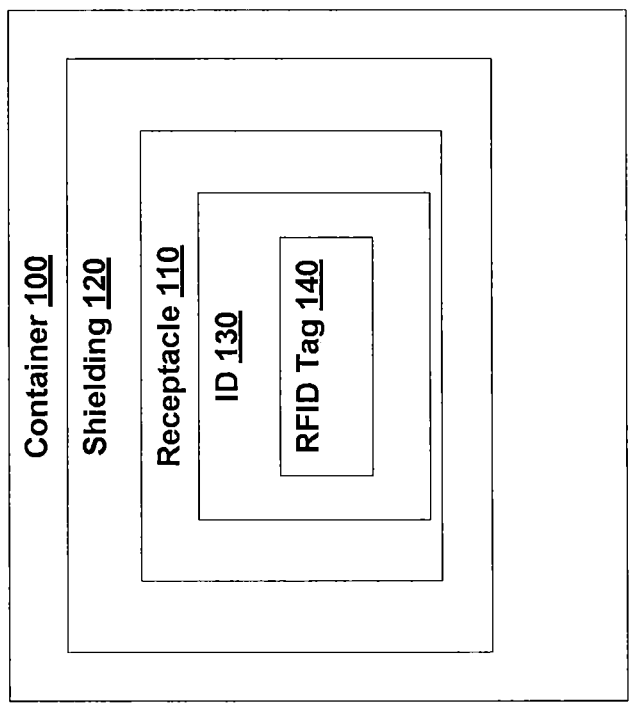
FIG. 1 illustrates a container including a receptacle configured to store an ID incorporating an RFID tag, according to various embodiments of the invention.

FIG. 1 illustrates a Container 100 including a Receptacle 110 configured to store an ID 130 (identification device) incorporating an RFID Tag 140. The Container 100 and Receptacle 110 may include a wallet, purse, passport holder, key chain, ticket holder, pocket, sleeve, slot, opening, niche, compartment, lid & base, glove compartment, jewelry, suitcase, backpack, bag, carrier, carton, box, sack, carton, casing, shell, carapace, covering, sheath, or the like. Container 100 further includes attached Shielding 120 configured to attenuate the transmission of radio frequency signals to or from the RFID Tag 140. Receptacle 110 is configured to be repeatedly opened and repeatedly closed for insertion and removal of ID 130.

FIG. 2 illustrates an embodiment of a Container 200 including RFID Tag 140 or alternatively an RFID tag Reader 210. Container 200 is optionally an embodiment of the Container of FIG. 1, and visa-versa. Container 200 further includes Shielding 120 configured to attenuate the transmission of radio frequency signals to or from the RFID Tag 140 or Reader 210. The shielding effect of the Shielding 120 is optionally dependent on a state of the Container 200. For example, in some embodiments, the Shielding 120 may be more efficient at attenuating RF transmission when Container 120 is closed than when it is open. As such, in some embodiments, the state of the Container 200 may be determined by a magnitude of a detected radio frequency signal between RFID Tag 140 and Reader 210 either of which may be within Container 200.

Figure 3:
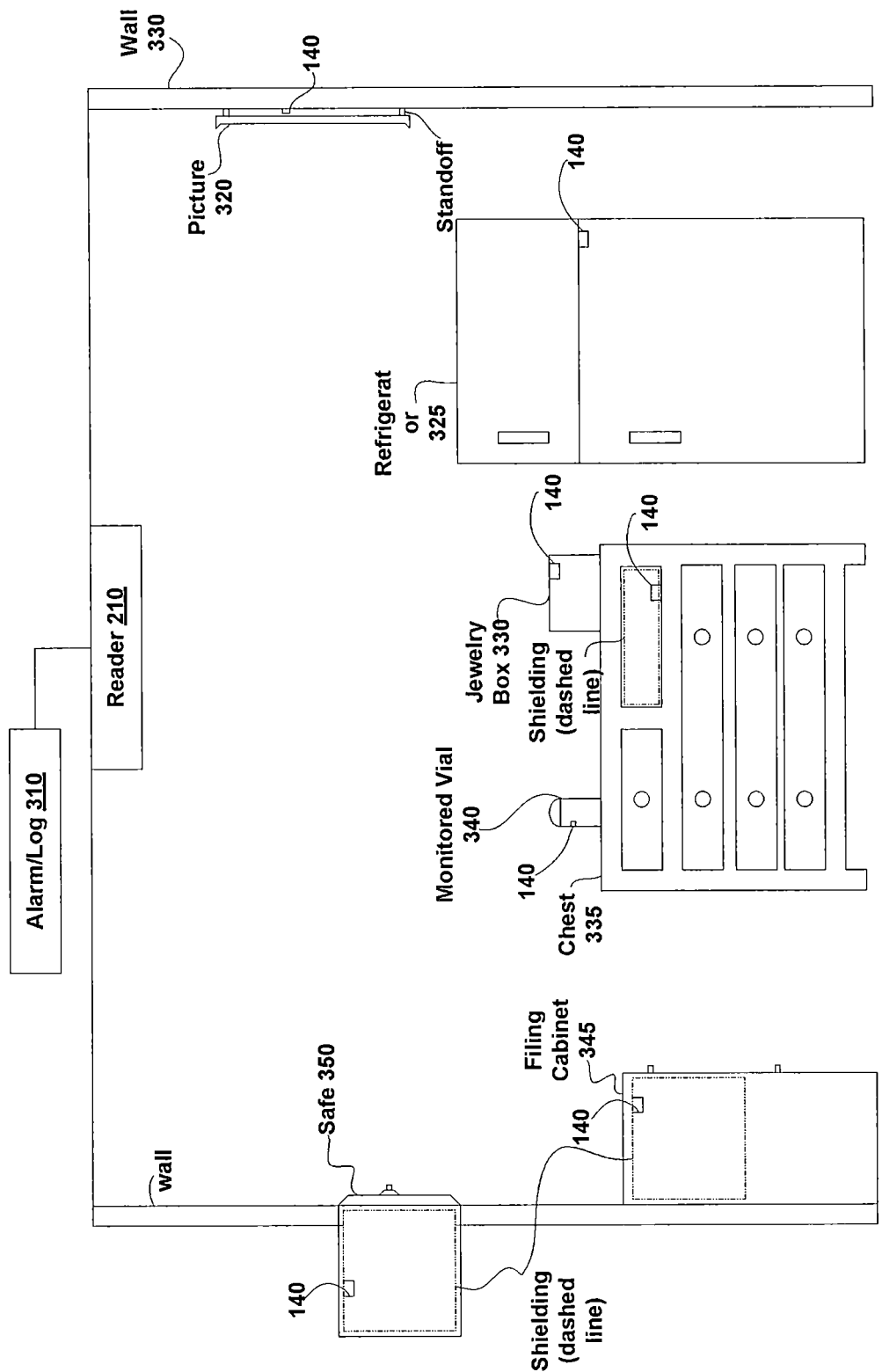
FIG. 3 illustrates various monitoring systems that employ illustrative embodiments of the container of FIG. 2.

FIG. 3 illustrates various monitoring systems that employ illustrative embodiments of Container 200. These illustrative embodiments include a wall hanging (e.g., a Picture 320), a Refrigerator 325, a Jewelry Box 330, a Chest of Drawers 335, a Monitored Vial 340, a Filing Cabinet 345, and a Safe 350. In these embodiments, the monitoring systems further include RFID tag Reader 210 and optional Alarm and/or Log 310. Each of these examples of Container 200 include one or more RFID Tag 140 and Shielding 120 (whether shown or not) configured to modify the transmission of RFID signals from Reader 210 to RFID Tags 140 responsive to a state of the Container 200.

For example, the Picture 320 illustrated includes Shielding 120 (not shown) that surrounds the RFID Tag 140 while Picture 320 is mounted on Wall 330. Shielding 120 is configured such that the attenuation effect of the shielding will be reduced if Picture 320 is removed from Wall 330. For example, Shielding 120 may be disposed to form a Faraday cage around or interfere with the RFID Tag 140 (e.g. be on the back of the picture, optional standoffs, and/or wall) and if Picture 320 is removed from Wall 330 a resulting gap, or reduction in interference, will allow increased RFID signal transmission between the associated RFID Tag 140 and Reader 210. Picture 320 may alternatively be a statue or some other object designed to sit on a surface with an RFID tag between the object and the surface.

In a similar manner each of the Refrigerator 325, Jewelry Box 330, Chest 335, Monitored Vial 340, Filing Cabinet 345 and Safe 350 includes Shielding 120 configured such that a magnitude of an RFID tag signal received by Reader 210 is dependent on whether the particular container is open or not.

Reader 210 is configured to detect RFID signals from one or more of the RFID Tags 140 and to generate a responsive output signal. In some embodiments, this responsive output signal is a quantitative or qualitative indication of the state of one or more of the containers. The reader is optionally configured to distinguish the signals received from each of the one or more RFID tags and, thus, identify which of the containers is open.

Alarm/Log unit 310 is optionally an alarm system or a logging system configured to activate an alarm or log an event responsive to the output signal of Reader 210. For example, in some embodiments, the Alarm/Log unit 310 is configured to activate an alarm when Picture 320 is removed from the wall or Safe 350 is opened. In some embodiments, the Alarm Log unit 310 is configured to log when Filing Cabinet 345, Chest 335 or Drawers or Refrigerator 325 is opened.

In alternative embodiments, Reader 210 may be placed within the container and RFID Tag 140 outside.

FIG. 4 illustrates further details of an embodiment of the Container of FIG. 2 that includes Monitored Vial 340. Monitored Vial 340 includes shielding in a Lid 410 and/or Base 420. When the Lid 410 and Base 420 are attached the shielding attenuates any signal from the enclosed RFID Tag 140. When Lid 410 is opened the attenuation is reduced. The RFID tag is optionally disposed on the underside of Lid 410. The illustrated embodiments are optionally used to monitor the use of medication or other material stored within Monitored Vial 340. The monitored vial is optionally an alternative form of Container 200 and optionally configured to store alternative types of goods. In some embodiments, Reader 210 of FIG. 3 is configured to log when Monitored Vial 340 is opened and closed. For example, if a user has a medication that should be taken at a specific time Reader 210 may be used to detect if Monitored Vial 340 is opened at these times and activate a reminder using Alarm/Log 310 if Monitored Vial 340 is not opened at a time medication should be taken.

FIG. 5 illustrates another embodiment of Monitored Vial 340 that includes more than one Compartment 510. Each Compartment 510 includes a separate RFID Tag 140 that may be separately identifiable using Reader 210. This embodiment may be used, for example, to monitor an activity that should occur at a variety of different times (e.g., times of day or days of the week).

Figure 6:
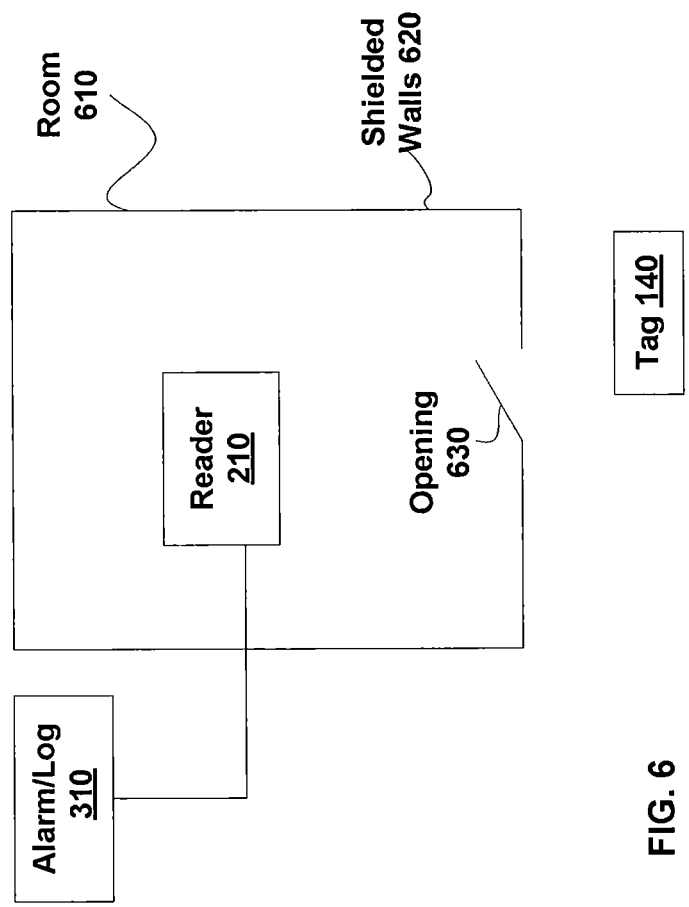
FIG. 6 illustrates an embodiment of the container of FIG. 2 wherein the container is a room.

FIG. 6 illustrates an embodiment of the Container of FIG. 2 wherein Container 200 includes a Room 610. In these embodiments, radio frequency signals between RFID Tag 140 and Reader 210 may be used to determine if an opening to the room is open. Room 610 includes Shielded Wall(s) 620 that block radio frequency signals between Tag 140 and Reader 210 when an Opening 630 is closed. When Opening 630 is open Tag 140 can be detected by Reader 210 and this stage can be logged by Alarm/Log 310. While the illustration shows Reader 210 within Room 610 and RFID Tag 140 outside, these positions are optionally exchanged. Room 610 is optionally a shipping container. RFID Tag 140 is optionally mounted on Opening 630 such that Tag 140 is brought within reading range of Reader 210 when Opening 630 is opened. Opening 630 can be, for example, a window or door.

Figure 7:
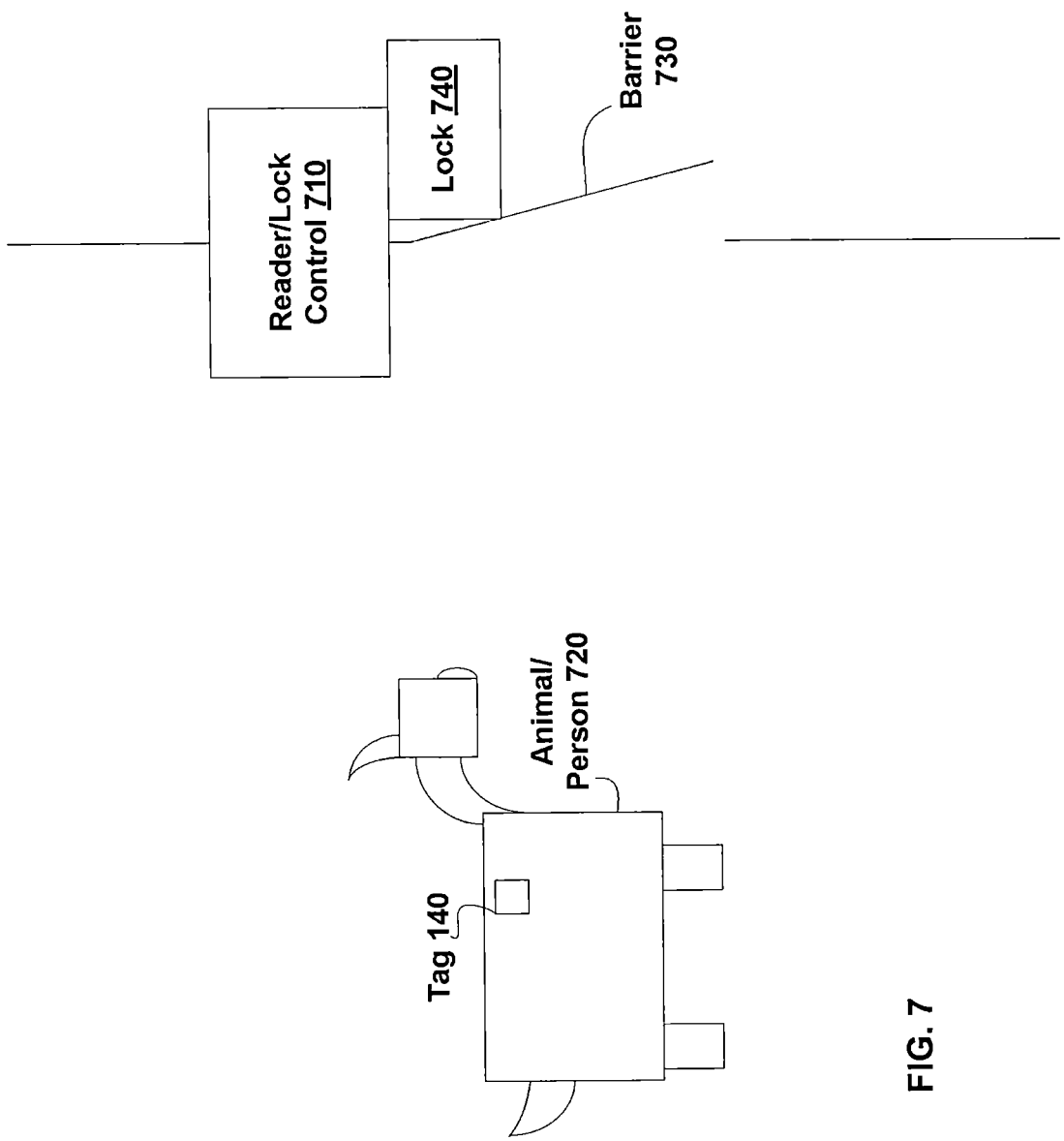
FIG. 7 illustrates an access system based on an RFID tag, according to various embodiments of the invention.

FIG. 7 illustrates an access system based on an RFID Tag 140. RFID Tag 140 is optionally implanted within a Animal or Person 720 or attached to an animal collar. A Reader/Lock Control 710 is configured to detect a signal from RFID Tag 140 and to control a Lock 740 in response. Lock 740 controls the function of a Barrier 730, such as a door or gate. Reader/Lock Control 710 is optionally programmable to operate responsive to particular instances of RFID Tag 140.

The Reader/Lock Control 710 illustrated in FIG. 7 is optionally used in the following manner. RFID Tag 140 is placed within or attached to the Animal or Person 720. Reader/Lock Control 710 is placed in a programming mode. A serial number of the RFID Tag 140 is programmed into the Reader/Lock Control 710 either by digital data entry or communication, or by bringing the RFID Tag 140 within the reading range of the Reader/Lock Control 710, such that the serial number can be read from the RFID Tag 140. The Reader/Lock Control 710 in placed in a normal operation mode wherein it monitor's for the presence of the RFID Tag 140. The RFID Tag 140 is detected by the Reader/Lock Control 710. The serial number is read from the detected RFID Tag 140 by Reader/Lock Control 710. Reader/Lock Control 710 compares the read serial number with the serial number programmed into the Reader/Lock Control 710 while in the programming mode. If the read and programmed serial numbers agree Lock 740 is activated in response. Activation of Lock 730 controls (e.g., locks or unlocks) access through Barrier 730. After the detected RFID tag is no longer detected by the Reader/Lock Control 710, Reader/Lock Control 710 optionally reactivates Lock 740 to return it to a previous state.

Figure 8:
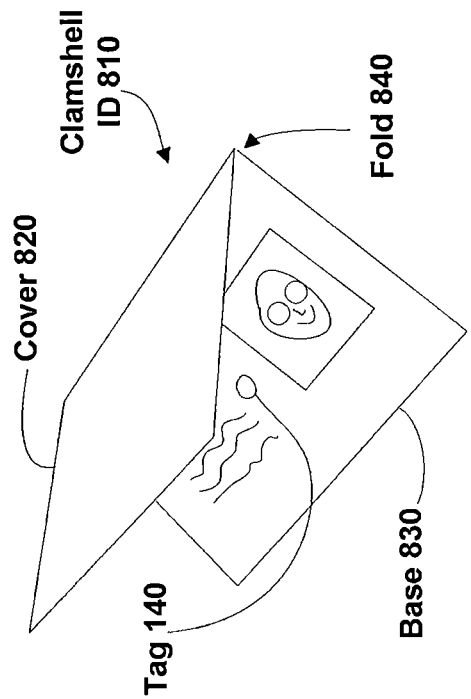
FIG. 8 illustrates a clamshell ID including a base including an RFID tag and a cover connected to the base, according to various embodiments of the invention.

FIG. 8 illustrates a Clamshell ID 810 (e.g. greencard (immigration card), passport, driver's license, transaction card, key card, national identity card, or the like). Transaction cards include credit cards, debit cards, check cards, payment cards, fare (e.g., transit) cards, or the like. Clamshell ID 810 includes an optional picture, a Base 830 including an RFID Tag 140, and a Cover 820 connected to Base 830 in a clamshell configuration, e.g., connected along an edge or Fold 840. Cover 820 and/or Base 830 include RFID shielding configured to attenuate radio frequency signals to or from RFID Tag 140 when Cover 820 is closed (e.g., shut), and to not attenuate, or attenuate to a lesser extent, radio frequency signals to or from RFID Tag 140 when Cover 820 is open. The shielding is optionally laminated into Base 830 and/or Cover 820. In some embodiments, Clamshell ID 810 includes shielding in both Base 830 and Cover 820. Base 820 can be the cover of a passport or other document. In some embodiments, Base 830 includes a plastic card.

In various embodiments, Clamshell ID 810 includes a passport, driver's license, credit card, etc. that includes RF shielding in one part (e.g., a page or cover) and an RFID tag in another part (e.g., a different page or cover). Not shown in FIG. 8 are pages that may be included between the covers (e.g., Base 830 and Cover 820). The RF shielding and RFID Tag 140 are configured such that, when Clamshell ID 810 is closed the shielding interferes with the RF pickup of the RFID tag to an extent sufficient for reading of RFID Tag 140 to be attenuated.

In some embodiments, Clamshell ID 810 can be closed in two ways. First, such that a picture and/or other identification information is displayed on the exposed surface of Base 830. Or, second, such that the picture and/or other identification information are covered by Cover 820. These two methods of closure are achieved by rotating Cover 820 and Base 830 relative to each other in different directions around Fold 840. In the first instance, the picture and/or other identification information can be used for identification while RFID Tag 140 is still shielded. Thus, Clamshell ID 810 can be used for identification (non-RFID) without unshielding RFID Tag 140.

When the Clamshell ID 810 is open, the shielding is less close to RFID Tag 140 and, thus, the interference of the shielding is reduced and RFID Tag 140 can be read. The shielding does not necessarily form a Faraday cage around RFID Tag 140 when Clamshell ID 810 is closed. In some embodiments, shielding is not included in the part of Clamshell ID 810 that includes the RFID Tag 140. Clamshell ID 810 is optionally formed by laminating RFID Tag 140 and RF shielding between layers of Cover 820 or to a page disposed between Cover 820 and Base 830. Further visible information such as a name and/or photograph can be placed on any surface of the Clamshell ID. Thus, in some embodiments, this visible information is visible when the Clamshell ID is open or closed. In other embodiments, this visible information is visible only when the Clamshell ID is open.

Figure 9:
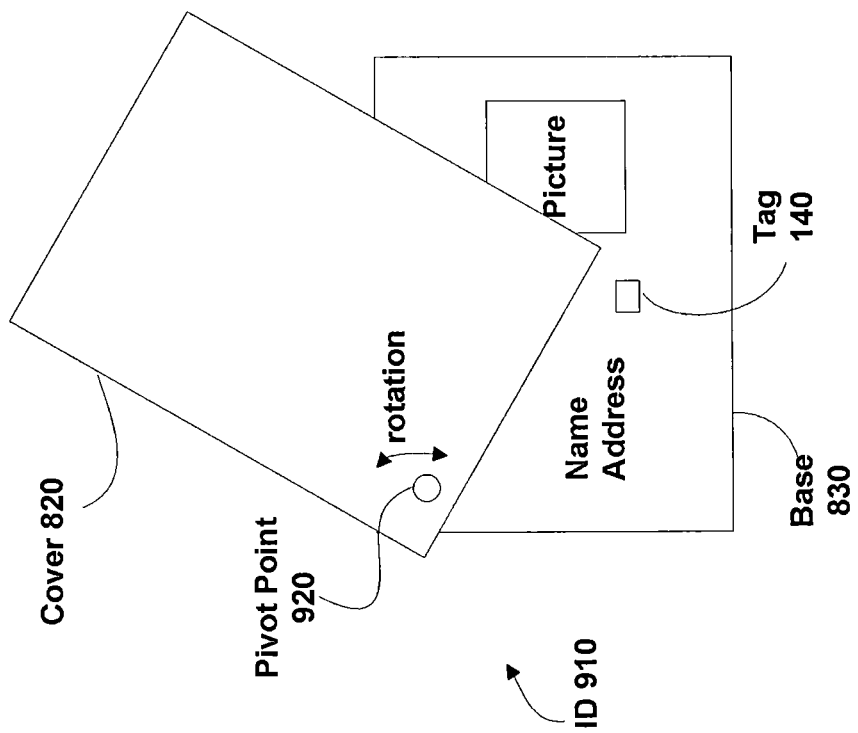
FIG. 9 illustrates a clamshell ID similar to that shown in FIG. 8 except that the base and cover are pivotally connected at a point rather than along an edge, according to various embodiments of the invention.

FIG. 9 illustrates an ID 910 similar to that shown in FIG. 8 except that Base 830 and Cover 820 are pivotally connected at a Pivot Point 920 rather than in a clamshell configuration. Cover 820 is configured to rotate over Base 830 as shown. When Cover 820 covers the Base 830 the RFID Tag 140 is shielded. When Cover 820 is rotated away from Base 830 RFID Tag 140 is unshielded. In some embodiments, Cover 820 may have two sections between which Base 830 fits. Either Cover 820 and/or Base 830 can include the RF shielding.

Figure 10B:
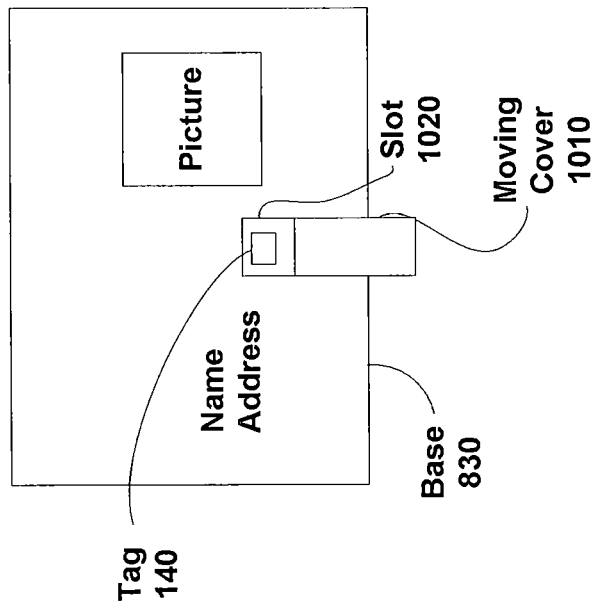
FIGS. 10A and 10B illustrate an ID similar to that shown in FIGS. 8 and 9 except that the cover is configured to fit into the base, according to various embodiments of the invention.
Figure 10A:
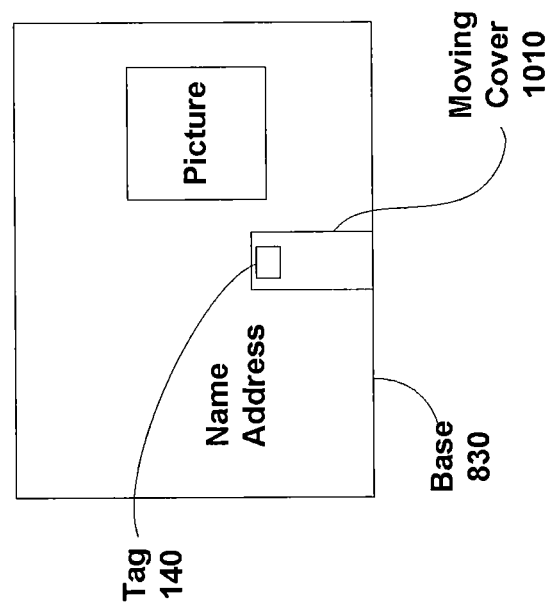

FIGS. 10A and 10B illustrate an ID similar to that shown in FIGS. 8 and 9 except that Cover 820 is configured to fit into Base 839, or visa versa. In the example shown, Cover 820 slides into and out of a slot in Base 830 and thus shields and exposes, respectively, RFID Tag 140. This embodiment may include an item to be worn such as a medical alert bracelet, an identity tag, a ring, clothing, glasses, or the like. For example, in the case of a medical alert bracelet, the bracelet includes an RFID tag (having medical information) that is only readable when a cover element of the bracelet is opened to expose the RFID tag to an RFID tag reader. When the cover is opened medical personal can read data from the RFID tag. When the cover is closed the medical information is shielded from being read by unauthorized persons and is thus kept confidential.

One embodiment of the invention includes the credit card (16) and case having sides (12) and (14) as illustrated in U.S. patent application Pub. 2004/0117514. In this embodiment, credit card (16) further (additionally) includes an RFID Tag 140 and sides (12) and/or (14) n further include RF shielding, or visa versa. The credit card may be replaced by an alternative type of ID device, e.g., a driver's license, debit card, or others discussed herein.

On embodiment of the invention includes the credit card (3) and holder (1) as illustrated in U.S. patent application Pub. 2005/0011776. In this embodiment, credit card (3) further includes an RFID Tag 140 and the holder (1) further includes RF shielding. The credit card may be replaced by an alternative type of ID device, e.g., a driver's license, debit card, or the like.

One embodiment of the invention includes the carrying case taught in U.S. patent application Pub. 2004/0256469, wherein the carrying case further includes RF shielding.

One embodiment of the invention includes the credit card and pivoting case described in U.S. patent application Pub. 2004/0237360, wherein an RFID tag is included in one part (e.g., the credit card) and shielding in another part (e.g., the case). Thus, when the credit card is pivoted into the case the RFID tag is shielded. One embodiment of the invention includes a credit card and case illustrated in FIG. 10 of U.S. patent application Pub. 2004/0237360. In this embodiment, the credit card includes an RFID Tag 140 and the case includes shielding. The credit card may be replaced by an alternative type of ID device, e.g., a driver's license, debit card, or the like.

One embodiment of the invention includes the security wallet illustrated in U.S. Pat. No. 4,744,497, wherein the security wallet further includes RFID shielding.

Various embodiments of the invention include the foldable transaction cards illustrated in US. Patent Applications Pubs. 2004/0169087 and 2004/0089724, wherein shielding is further included in one side of the fold while RFID Tag 140 is further included in the other side. RFID Tag 140 is shielded when the transaction card is folded closed and unshielded when it is open.

Various embodiments of the invention include the several different folding cards illustrated in U.S. Pat. No. 5,700,037 and Application Pub. 2005/0205665. Wherein these cards further include RFID Tag 140 in one part and shielding in another part, such that in one fold position RFID Tag 140 is shielded by the shielding, and in another fold position RFID Tag 140 is un-shielded.

One embodiment of the invention includes the credit card case illustrated in U.S. patent application Pub. 2002/0117243. Where in the credit card case further includes shielding configured to shield an rfid enabled credit card or other identification device.

Figure 11:
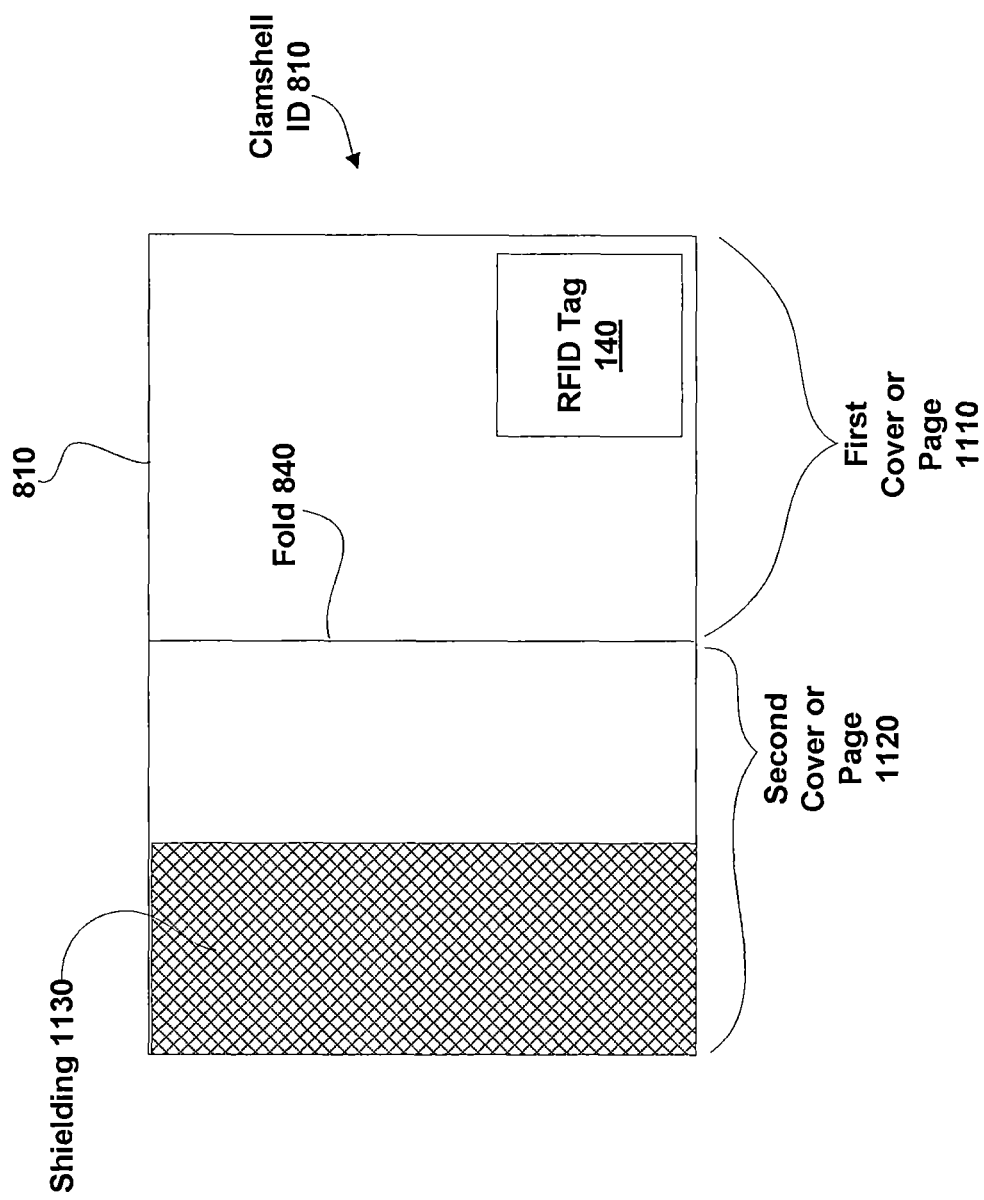
FIG. 11 illustrates further detail of some embodiments of a clamshell ID having a first cover and second cover separated by a fold.

FIG. 11 illustrates further detail of some embodiments of Clamshell ID 810, having a First Cover 1110 and a Second Cover 1120 separated by Fold 840. First Cover 1110 and a Second Cover 1120 may be, for example, Base 830 and Cover 820. Fold 840 can be a spine, hinge, crease, or the like. In alternative embodiments, First Cover 1110 and/or Second Cover 1120 can be embodied as a page or pages between covers of an identity document. Shielding 1130 is disposed as part of the second cover (e.g., or on or in an ID document cover or page). Shielding 1130 is optionally disposed away from fold 840 such that, when Clamshell ID 810 is open, the shielding as well separated from RFID Tag 140. In various embodiments, the separation between shielding 1130 and Fold 840 is greater than 5 mm, 10 mm, 15 mm, 20 mm, 25 mm or 30 mm. Likewise, RFID Tag 140 is optionally disposed away from Fold 830. In various embodiments, the separation between RFID Tag 140 (including antenna) and Fold 840 is greater than 5 mm, 10 mm, 15 mm, 20 mm, 25 mm or 30 mm. Alternatively, RFID Tag 140 and/or Shielding 1130 may be disposed to abut Fold 840.

Figure 12:
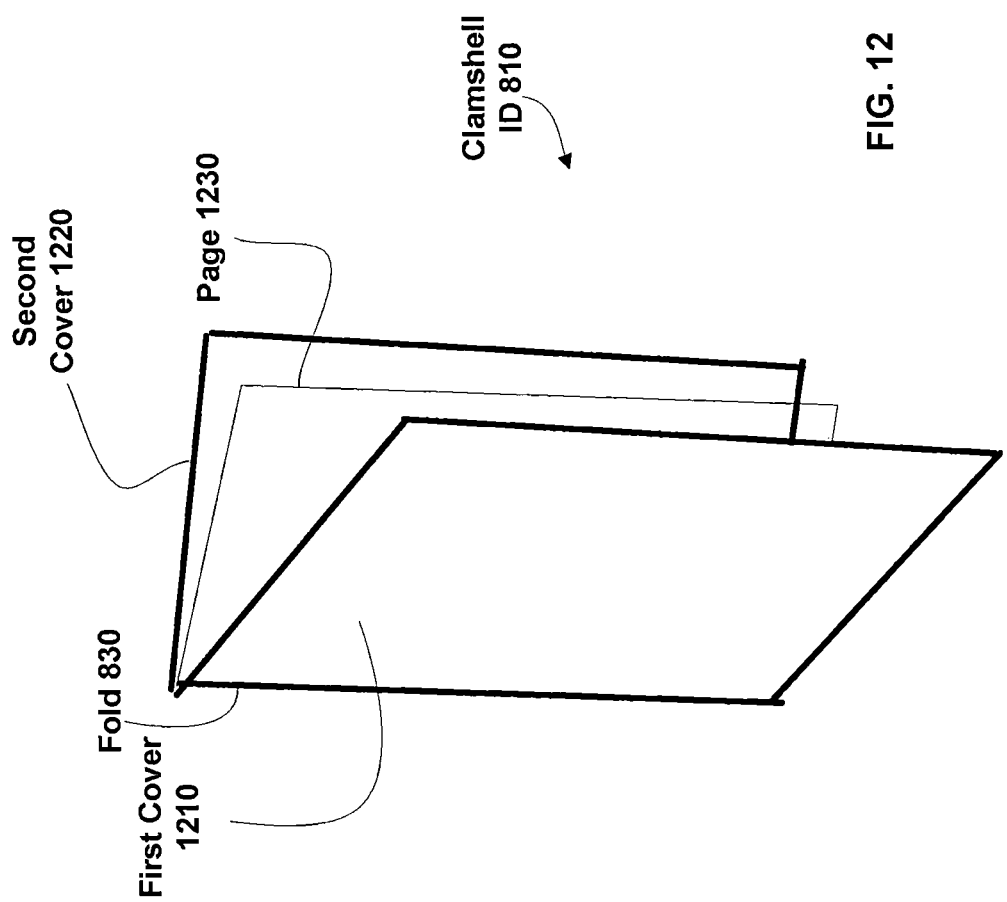
FIG. 12 illustrates further embodiments of a clamshell ID including a first cover and second cover separated by a fold.

FIG. 12 illustrates embodiments of Clamshell ID 810 including a First Cover 1210 and a Second Cover 1220 separated by Fold 830. These embodiments further include a Page 1230 disposed between First Cover 1210 and Second Cover 1220. Page 1230 includes RFID Tag 140 or Shielding 1130. For example, these embodiments of Clamshell ID 810 can include a passport including a photograph and identity information within an inside surface (facing toward Page 1230) of First Cover 1210, RFID Tag 140 within First Cover 1210 or Second Cover 1220, and Shielding 1130 within Page 1230. RFID Tag 140 can be shielded and un-shielded by moving Page 1230 close to or away from RFID Tag 140. In embodiments, wherein RFID Tag 140 is included in Second Cover 1220, RFID Tag 140 is shielded when Page 1230 is held close to Second Cover 1220. In this position is may be possible to view the photograph and identity information within the inside surface of First Cover 1210 without un-shielding RFID Tag 140. When Page 1230 is moved away from Second Cover 1220 then RFID Tag 140 is unshielded.

By including the RF Shielding 1130 with one of the one or more Page 1230, Clamshell ID 810 can be opened without necessarily removing Shielding 1130 from the vicinity of RFID Tag 140. For example, if RFID Tag 140 is disposed within the back cover, and Clamshell ID 810 is opened such that the inside of the First Cover 1210 is visible, Page 1230 including Shielding 1130 could remain adjacent to Second Cover 1220 and thus limit communication with the RFID Tag 140. To allow communication with RFID Tag 130 Page 1230 including Shielding 1130 is turned such that it moves away from Second Cover 1220. The Shielding 1130 may be attached to Page 1230 or be included within Page 1230. For example, Shielding 1130 may be laminated within Page 1230, be sewn on Page 1230, be glued on Page 1230, be within the material of Page 1230, or otherwise be connected to Page 1230. In various embodiments, Shielding 1130 includes a wire mesh, metallic fibers, metallic particles, metallic thread, or the like. Shielding is optionally attached to a binding of Clamshell ID 810 as Page 1230. Page 1230 is optionally bound to Clamshell ID by stable, pin, wire, thread, adhesive, laminate, or the like.

Figure 13:
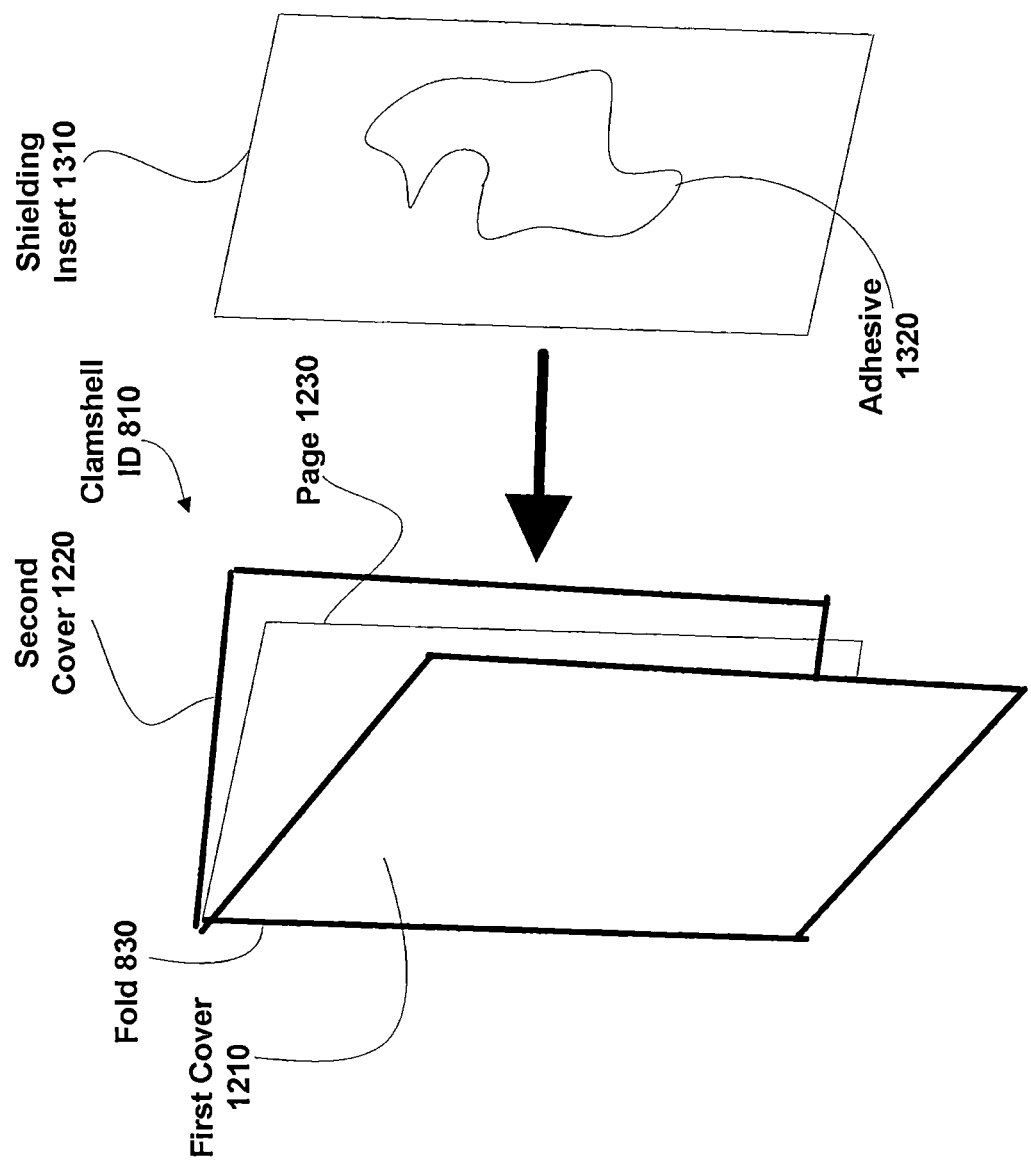
FIG. 13 illustrates a clamshell ID wherein shielding is added to a page, according to various embodiments of the invention.

FIG. 13 illustrates embodiments of Clamshell ID 810 wherein Shielding 1130 is added to Page 1230 following assembly of Clamshell ID. In these embodiments, Shielding 1130 is included in a Shielding Insert 1310. Shielding Insert 1310 optionally includes Adhesive 1320 or some other mechanism for attaching Shielding Insert 1310 to Page 1230. The attachment of Shielding Insert 1310 to Page 1230 can be permanent or temporary (e.g., Shielding Insert 1310 may be removable). In various embodiments, Shielding Insert 1310 includes a metal plate, wire mesh, metallic fibers, metallic particles, metallic thread, or other forms of shielding.

The size of Shielding Insert 1310 is optionally the same as or slightly smaller then a European Union Passport, a Japanese Passport, a Chinese Passport, a United States Passport, or the like. Alternatively, in various embodiments, Shielding Insert 1310 is configured in size such that it can be attached to Clamshell ID 810 at least greater than 5 mm, 10 mm, 15 mm, 20 mm, 25 mm or 30 mm from Fold 830. For example, Shielding Insert 1310 may be configured to attach to Page 1230 such that Shielding Insert 1310 extends from near an outer edge (opposite Fold 830) of Page 1230 to within 10 mm of Fold 830.

Figure 14:
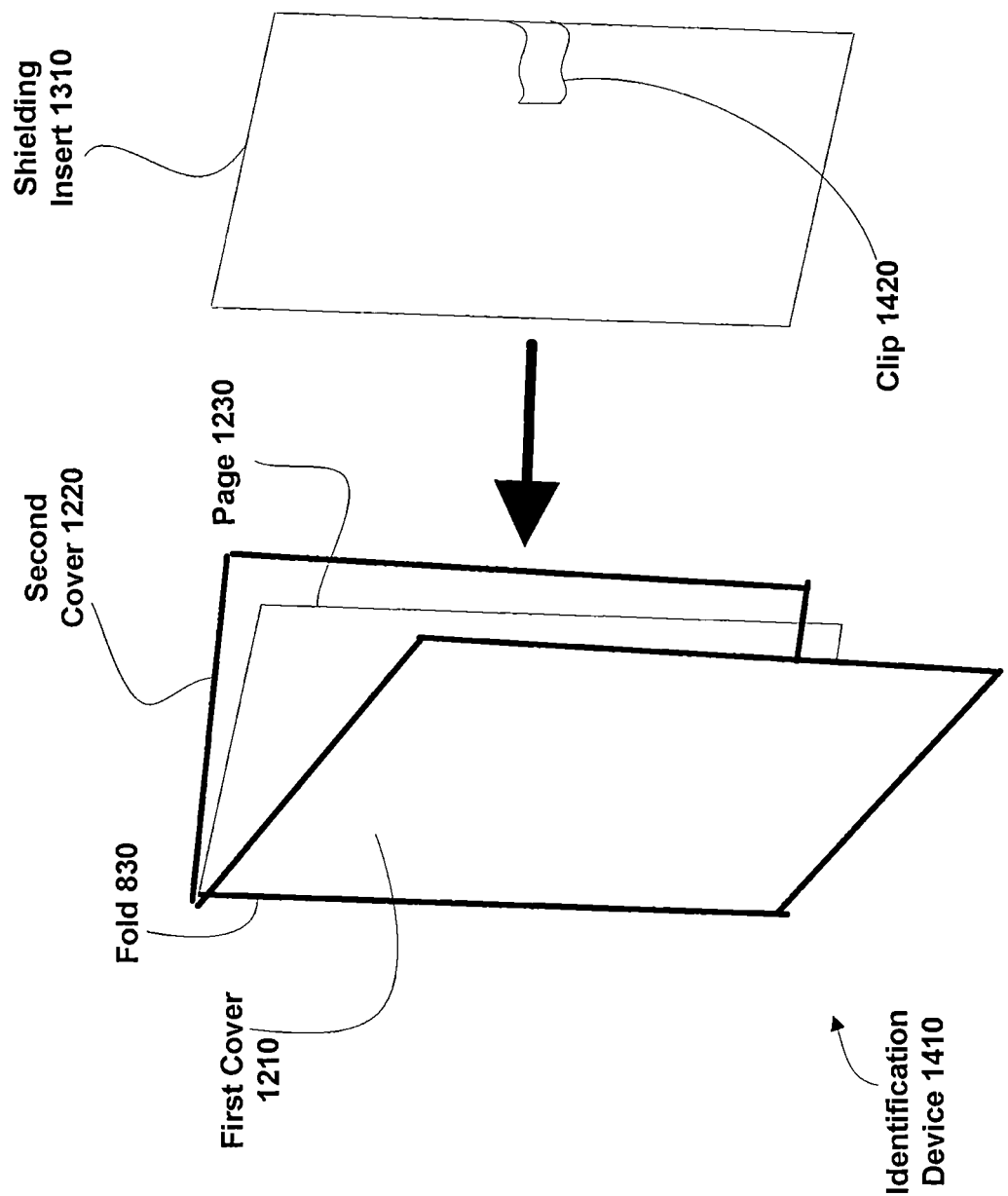
FIG. 14 illustrates an identification device, according to various embodiments of the invention.

FIG. 14 illustrates embodiments of an Identification Device 1410, such as Clamshell ID 810. In these embodiments, Shielding Insert 1310 includes one or more clips 1420, clamp, pin, slot, rivet, or other mechanism configured for, optionally temporary, attaching Shielding Insert 1310 to Identification Device 1410. In some embodiments Clip 1420 is replaced by a slot configured to receive that part of Identification Device 1410 including an RFID tag. Shielding Insert 1320 is optionally pivotally connected to Identification Device 1210. In the embodiments illustrated by FIG. 14, Fold 830, Second Cover 1220 and Page 1230 are optional. For example, Identification Device 1410 can be a single piece driver's license, credit card, etc. (without separate front and back covers) including RFID Tag 140. Shielding Insert 1310 is configured to be attached to First Cover 1210, Page 1230, and/or Second Cover 1220. In these embodiments Page 1230 need not include shielding. In some embodiments, Shielding Insert 1310 may be attached to that part of Identification Device 1410 that includes RFID Tag 140. In these embodiments, Shielding Insert 1310 is inserted to shield RFID Tag 140 and removed in order to un-shield RFID Tag 140. In some embodiments, Shielding Insert 1310 includes a flat metal plate configured to fit within a passport, e.g., a passport issued by the United States, a European Country, or an Asian Country. In these embodiments, the size of shielding insert may be similar to or slightly smaller than the dimensions of the passport. In some embodiments, Shielding Insert 1310 can include an attachment device, such as Clip 1420, on more than one side (face). As such, Shielding Insert 1310 may be configured to shield and RFID enabled driver's license on one side and an RFID enabled credit card on the other side. Shielding Insert 1310 is optionally approximately the size of a driver's license or credit card. In some embodiments, Shielding Insert 1310 has height and width dimensions similar to or smaller than a page between the front cover and the back cover. Shielding Insert 1310 is optionally thin and optionally flexible.

As illustrated in FIG. 15, some embodiments of the invention include a method of allowing communication to an RFID tag. The method includes a Step 1510 of opening a front cover of an identification device, such as Clamshell ID 810 or Identification Device 1410, in order to make information included on the inside of the front cover visible, an RF shielding page being kept in proximity of the back cover such that an RF tag within the back cover is unreadable. The RF shielding page can be for example an instance of Page 1230 or a page with Shielding Insert 1310 attached. The method further includes a Step 1520 of visually presenting the information on the inside of the front cover. The information can include a name, citizenship, photograph, identification number, or the like. A step 1530 includes turning the shielding page away from the back cover such that the RFID tag becomes un-shielded and can communicate with a reader. The shielding page is a page, between the front cover and the back cover, that includes or is attached to RF shielding configured to limit communication with the RFID tag. In alternative embodiments of this method, the rolls of the front cover and back cover are reversed.

As illustrated in FIG. 16, some embodiments of the invention include a method of modifying an RFID enabled identification device, e.g., Identification Device 1410. This method includes, a Step 1610 of opening the identification device by turning a back cover away from a front cover; a Step 1620 of selecting a page disposed (optionally bound) between the front cover and the back cover; an optional Step 1630 of exposing an adhesive surface on an RF shielding insert, the RF shielding configured to limit RF communication between an RFID tag included in the identification device and a reader; and a Step 1640 of attaching the RF shielding insert to the selected page using the exposed adhesive. In alternative embodiments, the adhesive is optionally replaced by a clip, clamp, pin, slot, or other mechanism configured for temporary attachment to the identification device. The identification device is optionally a passport, driver's license, immigration document, national identity document, or other identification device discussed herein. The RF shielding insert is optionally sized (as discussed elsewhere herein) such that it is disposed at a distance from a fold in the identification device.

As illustrated by FIG. 17, one embodiment of the invention includes a method of making an identity device including: a Step 1710 of adding an RFID tag to a first cover layer; a Step 1720 of adding a second cover layer such that the RFID tag is disposed between the first cover layer and the second cover layer; and a Step 1730 of a attaching an RF shield to the combined first cover layer and second cover layer. The RF shield is optionally attached as a page configured to be disposed between to parts of the combined first cover layer and second cover layer when the combination is folded. The RF shield is optionally temporally attached to the combined first cover layer and second cover layer.

Figure 18:
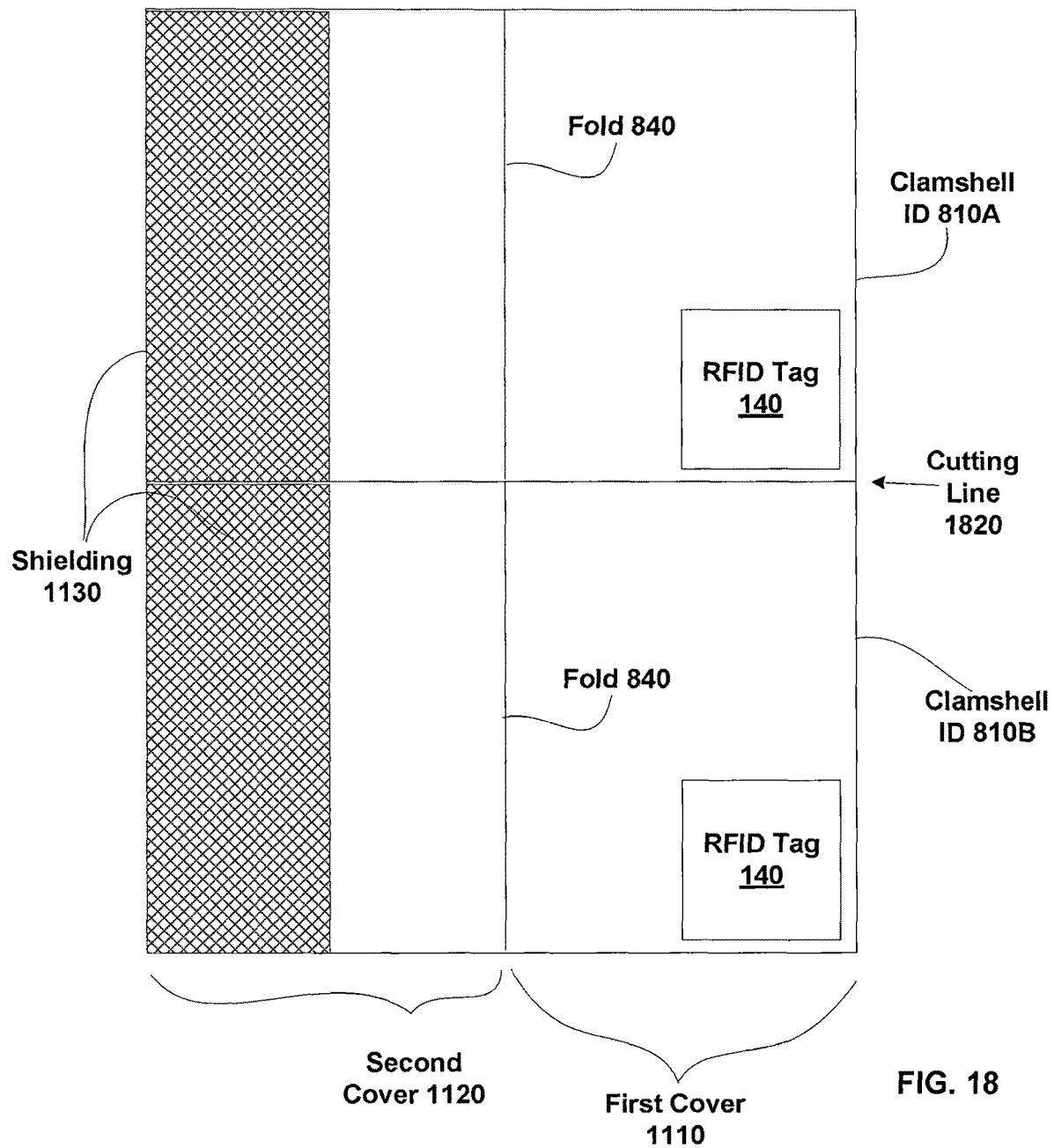
FIG. 18 is a block diagram illustrating a stage in the manufacture of an identification device, according to various embodiments of the invention.

FIG. 18 is a block diagram illustrating the manufacture of an identification device, such as a passport. At one stage in the manufacturing process Shielding 1130 is dispensed in the form of a strip. The strip is laid down over what will be several separate identification devices when the manufacturing is completed. A plurality of RFID Tags 140 are deposited. The assembled material, including shielding is cut along a Cutting Line 1820 (cutting area) to separate the locations where the RFID Tags 140 are deposited or to be deposited. As a result a plurality of identity documents are produced. The cut along Cutting Line 1820 occurs after Shielding 1130 is laid down. Pages are optionally added to the assembled material prior to cutting.

Figure 19:
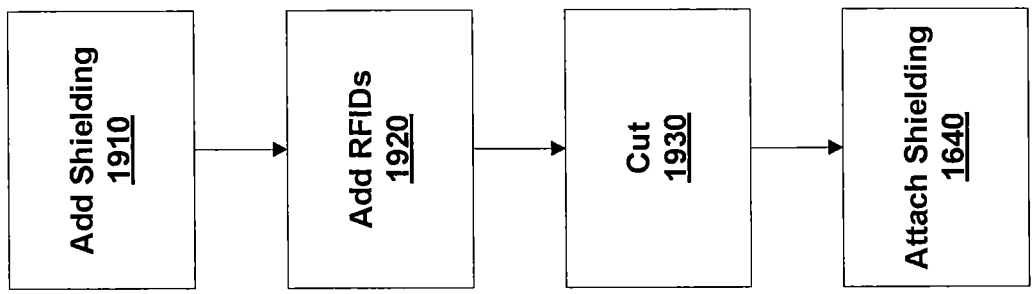
FIG. 19 illustrates the method of manufacturing an identification device, according to various embodiments of the invention.

FIG. 19 illustrates the method of illustrating an identification device as shown in FIG. 18. In an Add Shielding Step 1910, shielding is added to an area of a cover that will become a first identification device and a second identification device. In an Add RFIDs Step 1920, a first RFID tag is added to that part of the cover that will become the first identification device and a second RFID tag is added to that part of the cover that will become the second identification device. In a Cut Step 1930, the cover is cut to separate that part that will become the first identification device and that part that will be come the second identification device. Cut Step 1930 includes cutting the shielding added in Add Shielding Step 1910.

Figure 20:
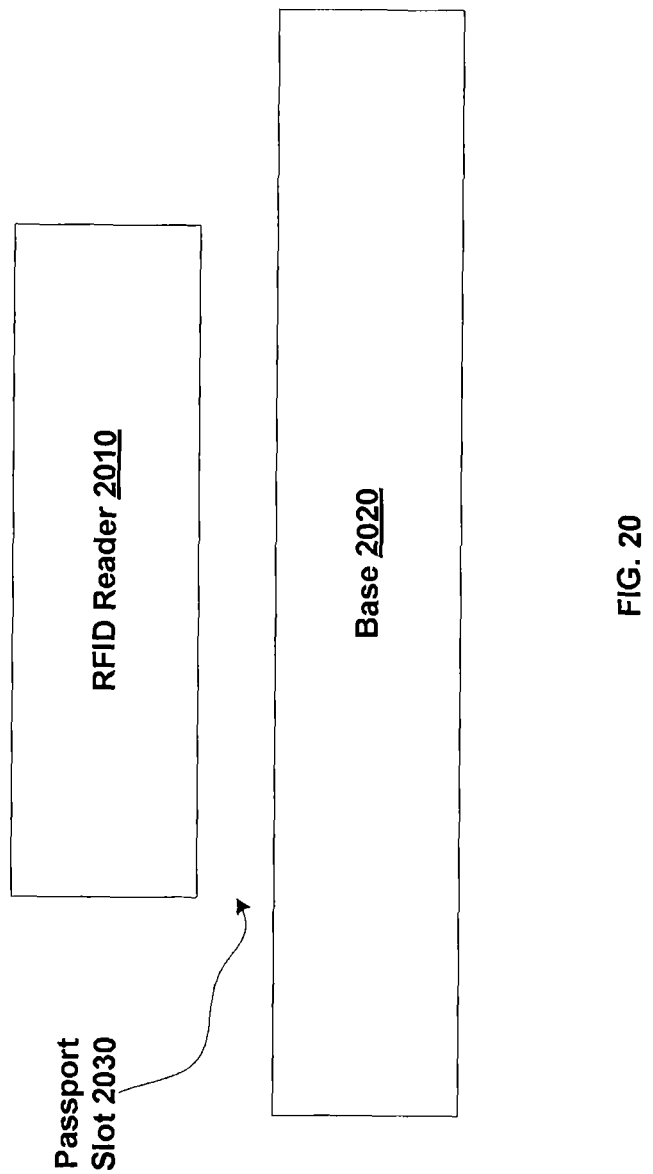
FIG. 20 illustrates an RFID reader system, according to various embodiments of the invention.

FIG. 20 illustrates an RFID reader system configured to read Clamshell ID 810 e.g., an RFID enabled passport including shielding. Spacing between an RFID Reader 2010 and a Base 2020 is configured to form a Passport Slot 2030. RFID Reader 2010 is configured to read Clamshell ID 810. The height of Passport Slot 2030 is configured such that Clamshell ID 810 is sufficiently open when passed though Passport Slot 2030 between the RFID Reader 2010 and Base 2020. E.g., Passport Slot 2030 is configured such that, in order to pass through Passport Slot 2030 Clamshell ID 810 cannot be partially open such that shielding within Clamshell ID 810 could block the communication between RFID Reader 2010 and the RFID tag included in Clamshell ID 810. The width of the passport slot is optionally configured to assure that the shielding is not disposed between the RFID reader and the RFID tag.

Figure 21:
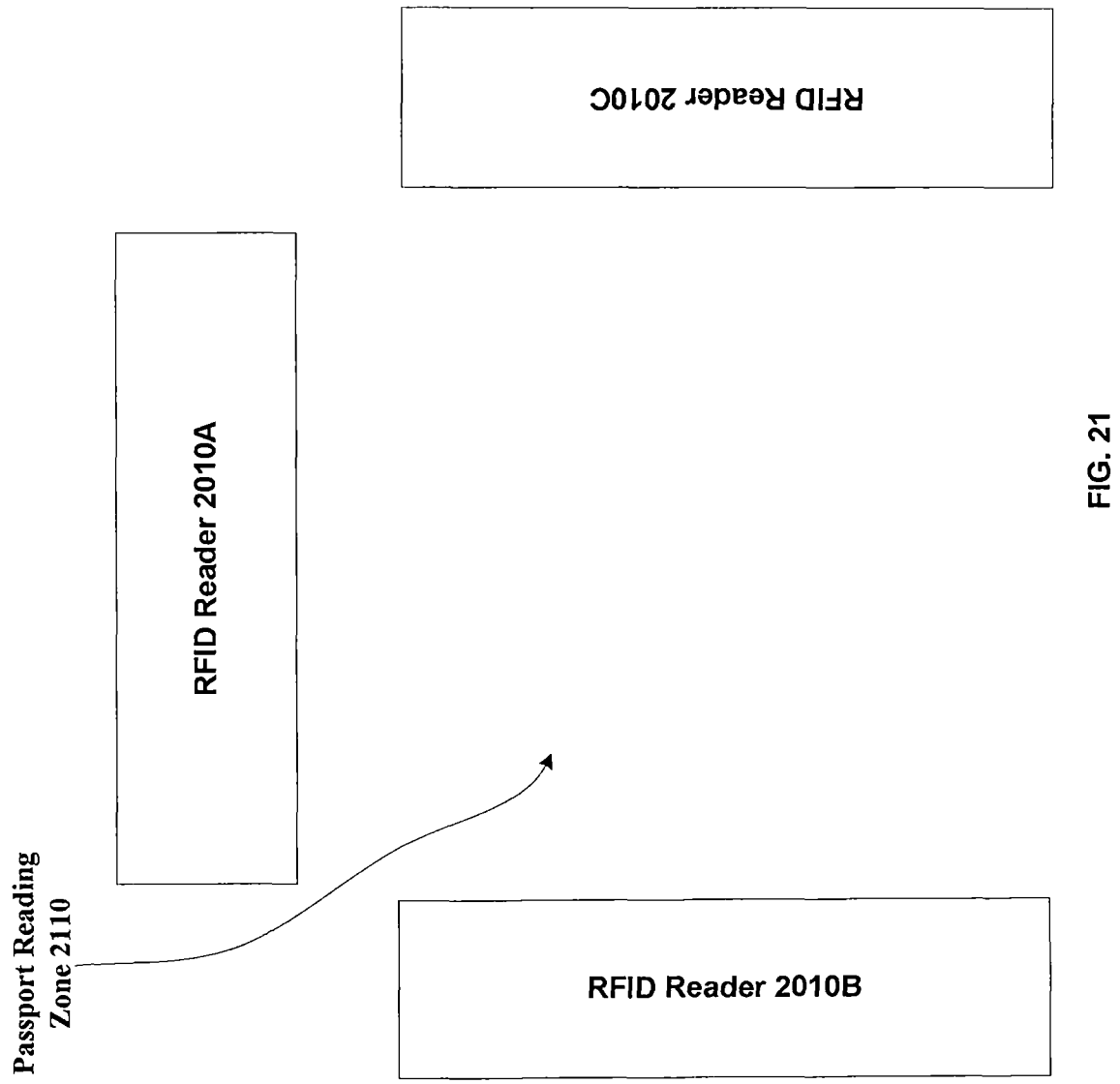
FIG. 21 illustrates an alternative RFID reader system, according to various embodiments of the invention.

FIG. 21 illustrates an RFID reader system including more than one RFID readers (RFID Reader 2010A, RFID Reader 1010B, and optionally RFID Reader 1010C). The more than one RFID readers are disposed such that any shielding within an ID is never within the line of sites between all of the one or more RFID readers and an RFID tag in a reading volume. And in addition, the more than one RFID readers are disposed such that the angle between an antenna of the RFID tag is at least one of the RFID readers is favorable for communicating between the RFID tag and RFID reader. Achieving both or these criteria may require three or more RFID readers. In alternative embodiments, this system may include fewer or more RFID readers than illustrated. The illustrated readers optionally surround a walk through reading volume.

Figure 22:
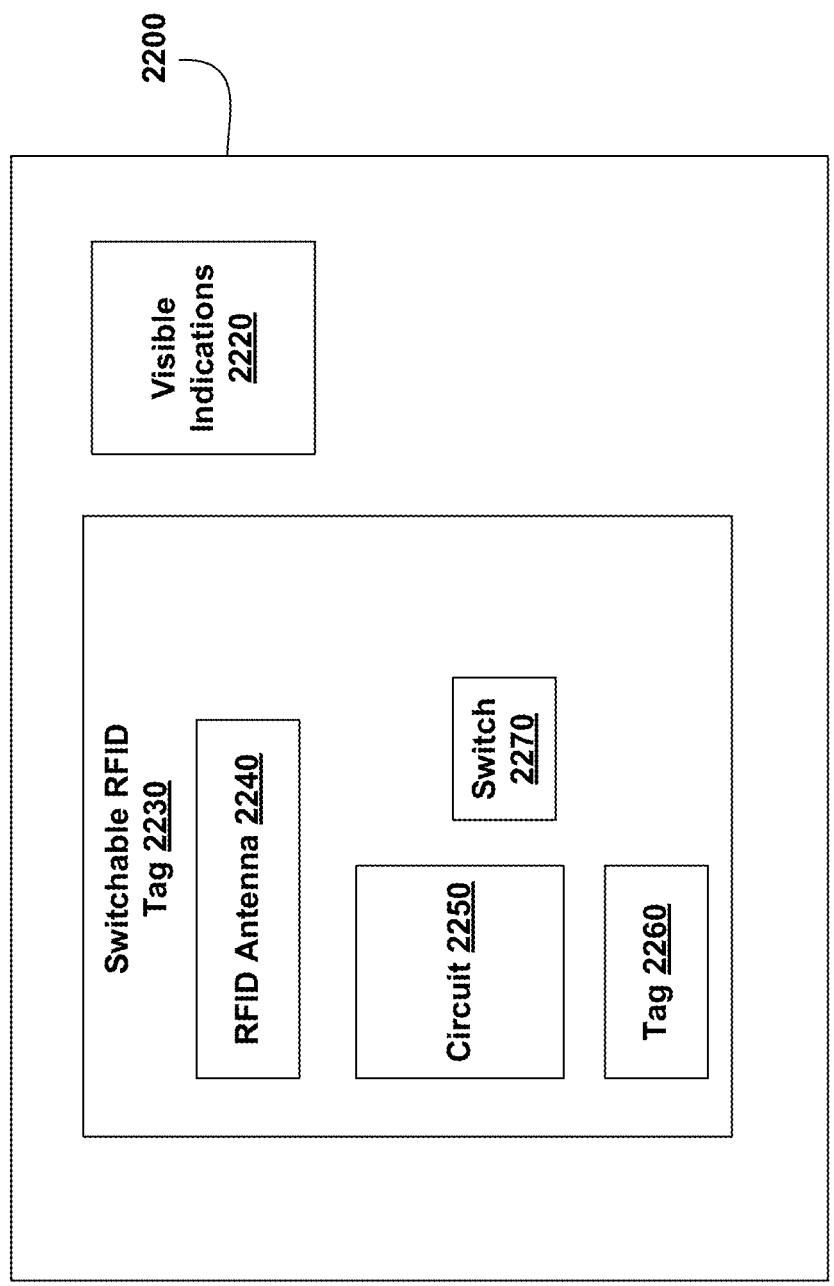
FIG. 22 is a block diagram of a switchable RFID device, according to various embodiments of the invention.

FIG. 22 is a block diagram of a Switchable RFID Device 2200. In some embodiments, Switchable RFID Device 2200 is an identity device such as a passport, identity card, driver's license, immigration document (e.g., green card or visa), student identity card, library card, financial card (e.g., credit card, debit card or prepaid card), social security card, Military ID card, key, keycard or the like. Switchable RFID Device 2200 optionally includes Visible Indications 2220 such as a barcode, picture, image, name, address, text, and/or the like. Switchable RFID Device 2200 further includes one or more Switchable RFID Tag 2230. Switchable RFID Tag 2230 includes one or more RFID Antenna 2240, a Circuit 2250, one or more Tag 2260 and one or more Switch 2270. Switch 2270 is optionally disposed within Circuit 2250 or Tag 2260. RFID Antenna 2240 is configured for sending a radio frequency (RF) signal from Switchable RFID Device 2200 in response to a received signal. The received signal is optionally used to power Switchable RFID Tag 2230. In some embodiments, the received signal is an RF signal received by RFID Antenna 2240. In alternative embodiments, the received signal is received through an inductive coupling or a non-RF antenna within Circuit 2250. RFID Antenna 2240 is optionally a dipole antenna.

In some embodiments, Switchable RFID Tag 2230 is configured for a user to be able to repeatedly turn on and off the function (e.g., delectability or readability) of Tag 2260 using Switch 2270. Circuit 2250 typically further includes a diode, capacitor, transistor, and/or the like configured to receive power through RFID Antenna 2240 or an inductive coupling and to convey signals between RFID Antenna 2240 and Tag 2260. In some embodiments, Tag 2260 includes an integrated circuit.

Switchable RFID Tag 2230 is differentiated from circuits found in RFID tags of the prior art by at least the inclusion of Switch 2270. Switch 2270 is optical, thermal, magnetic, mechanical, wireless, and/or electronic. Switch 2270 is configured to be activated by a magnetic field, an electric field, a wireless signal, light, heat, mechanical force, and/or an electronic circuit external to Switchable RFID Device 2200. Switch 2270 is optionally a sliding switch, a flip switch, a rotating switch, membrane switch, pushbutton switch, or other mechanical switch known in the art of mechanical switches. In typical embodiments, Switch 2270 is configured for both turning on and turning off function of Tag 2260.

In various embodiments, Switch 2270 is normally open or normally closed, and the function of Tag 2260 can be normally on or normally off. For example, In some embodiments, Switch 2270 is a mechanical contact switch activated by applying pressure to an outside surface of Switchable RFID Device 2200. In some embodiments, when this pressure is applied the functionality of Tag 2260 will be turned on, and when this pressure is not applied the functionality of Tag 2260 will be off. In some embodiments, Switch 2270 is a mechanical contact switch activated using a magnetic field. In some embodiments, Switch 2270 is an electrical switch turned on or off by a circuit external to Switchable RFID Device 2200. For example, Switch 2270 may include two electrical contacts exposed at the exterior of Switchable RFID Tag 2230. When a conductance path, current and/or voltage is applied between these electrical contacts Switch 2270 is turned on, or in alternative embodiments, turned off.

In various embodiments, Switch 2270 functions by creating a short circuit. For example, Switch 2270 can be configured to turn off the function of Tag 2260 by short circuiting RFID Antenna 2240, a diode within Circuit 2250, a capacitor within Circuit 2250, a transistor within Circuit 2250, and/or a connection within Tag 2260.

In various embodiments, Switch 2270 functions by creating an open circuit. For example, Switch 2270 can be configured to create an open circuit between (or within) RFID Antenna 2240, Circuit 2250, and/or Tag 2260.

In some embodiments, Switchable RFID Device 2200 is configured to operate as a key and Switch 2270 is activated to turn on the functions of Tag 2260 by mechanical insertion of the key into a locking device. In these embodiments, the functions of Tag 2260 are typically off when the key is not inserted in the locking device. The locking device is configured to activate Switch 2270 using an electronic circuit, a mechanical force, or a magnetic field.

In alternative embodiments, an instance of Switch 2270 is included in Tag 2260 and/or Circuit 2250. Thus, Switchable RFID Tag 2230 may include a plurality of Switch 2270, one Switch 2270 in Circuit 2250 and one Switch 2270 in Tag 2260. As is described further herein, these instances of Switch 2270 may be configured to perform different functions.

FIG. 23 illustrates some of many possible locations for Switch 2270 within Switchable RFID Device 2200 where Switch 2270 creates an open circuit. FIG. 24 illustrates some of man possible locations for Switch 2270 within Switchable RFID Device 2200 wherein Switch 2270 creates a short circuit. The embodiments illustrated by FIGS. 23 and 24 include a Transistor 2310, a Diode 2320, and a Capacitor 2330. Possible positions for Switch 2270 are indicated by an "X."

In some embodiments, Switch 2270 is configured to partially limit the functionality of Tag 2260. Thus, Tag 2260 may be configured to respond with data indicating a first state when Switch 2270 is on and to respond with data indicating a second state when Switch 2270 is off. For example, Switch 2270 can be connected to logic circuits of Tag 2260 in such a way that Tag 2260 will transmit a limited amount of data when Switch 2270 is off and a less limited amount of data when Switch 2270 is on. For example, Tag 2260 may be configured to respond with data indicating the name of a person when Switch 2270 is off and to respond with the data including the name, an address, an account number and a telephone number when Switch 2270 is on. When Switch 2270 is connected to a circuit within Tag 2260, Switch 2270 (or a plurality thereof) is optionally configured to separately control detection of and readability of Tag 2260. Detection occurs when Tag 2260 sends any response signal, while readability is a function of the data that may be included in the contents of the response signal.

FIGS. 25A and 25B illustrate one embodiment of Switchable RFID Device 2200 in which Switch 2270 is a sliding switch disposed along an Edge 2520 of Switchable RFID Device 2200. FIG. 25A illustrates an OFF Position wherein an Electrical Connector 2510 between Circuit 2250 and Tag 2260 is in an open circuit state. In this state, Tag 2260 is not normally detectable or readable. FIG. 25B illustrates an ON position wherein Switch 2270 completes an electrical connection between Circuit 2250 and Tag 2260. In this position, Tag 2260 is detectable and readable. In this embodiment, Switch 2270 is configured to be moved between the on position and the off position, for example using a finger. In the on position, Switch 2270 optionally extends from Edge 2520 of Switchable RFID Device 2200. In the off position, Switch 2270 is optionally approximately flush with Edge 2520. Some embodiments of the invention include a switch configured to be approximately flush with an edge of a financial card (e.g., credit card or debit card) in at least one position. Some embodiments of the invention include a switch configured to be below an edge of a financial card in at least one position. Switch 2270 may be bistable or astable. Other features illustrated in FIGS. 25A and 25B are optional.

FIGS. 26A and 26B illustrates a Membrane Switch, generally designated 2600, (and surrounding area) for use in a switchable RFID device such as Switchable RFID Device 2200. Membrane Switch 2600 is optionally an embodiment of Switch 2270. Membrane Switch 2600 is shown in the OFF and ON positions, in FIGS. 26A and 26B respectively. The use of a finger to operate Membrane Switch 2600 is optional, other devices may be used to activate the switch. By bringing electrical conductors on a Surface 2630 and a Surface 2625 together, a switchable RFID tag is controlled, activated or deactivated. Typically, Surface 2625 and Surface 2630 are coated with an electrical conductor, such as copper. In some embodiments, a Support Layer 2610 is disposed at a First Surface 2615 of Switchable RFID Device 2200 and a Flexible Membrane 2620 is disposed at a Second Surface 2635 of Switchable RFID Device 2200. Thus, the Flexible Membrane 2620 includes both Surface 2625 and an outer surface, e.g., Surface 2635 of Switchable RFID Device 2200. In some embodiments, Surface 2635 extends beyond Membrane Switch 2600 to Surrounding Areas 2650. As such Flexible Membrane 2620 is essentially flush with a surface of Switchable RFID Device 2200. Flexible membrane 2620 and Support Layer 2610 are separated by a Spacer 2640. In some embodiments, Spacer 2640 extends beyond the immediate vicinity if Membrane Switch 2600 to Surrounding Areas 2650. Spacer 2640 optionally extends essentially throughout Switchable RFID Device 2200. As such, Surface 2635 can be essentially smooth, e.g. does not include raised portions near Membrane Switch 2600. Support Layer 2610 is typically stiffer than Flexible Membrane 2620.

In various embodiments, Membrane Switch 2600 is included in an identity device such as a passport, driver's license, immigration card, key card, financial card, ID card, or the like. For example, in some embodiments, Membrane Switch 2600 is included within a passport or other identity device having a clamshell configuration. In these embodiments, Flexible Membrane 2620 is optionally disposed toward an interior of the identity device when the identity device is closed. In this position, Flexible Membrane 2620 is protected from inadvertent contact and typically can only be pressed after the identity device is opened.

In various embodiments, Membrane Switch 2600 is included in a financial card (e.g., a credit card, debit card or the like). In some of these embodiments, Flexible membrane 2620 is essentially flush with Surrounding Areas 2650 of the financial card including Surface 2625, as illustrated in FIGS. 26A and 26B. In this position Membrane Switch 2600 does not substantially stick out from First Surface 2625 of the financial card and is, thus, protected by Surrounding Areas 2650 from inadvertent activation. In some embodiments, Membrane Switch 2600 is recessed below First Surface 2635.

FIG. 26C illustrates an embodiment of Membrane Switch 2600 further including a Spring 2655. Spring 2655 may be considered a switch activator. Spring has an activation height at which the spring center will spring into contact with the Support Layer 2610 this activation height is typically below First Surface 2635.

FIG. 26D illustrates a cross-sectional view of Membrane Switch 2600 disposed within Switchable RFID Tag 2230. Tag 2260 is at least partially disposed within Spacer 540 and/or Support Layer 2610. Spacer 2640 and/or Support Layer 2610 optionally include a cavity configured to receive Tag 2260. In some embodiments, Tag 2260 is deposited on Support Layer 2610 before Spacer 2640 is deposited on Support Layer 2640. In these embodiments, Support Layer 2640 is formed around Tag 2260. In some embodiments, Spacer 2640 is configured to hermetically seal Tag 2260 and/or Membrane Switch 2600.

In various embodiments, an Opening 2670 within Membrane Switch 2600 is less than or equal to 2.0 mm, 1.5 mm, 1.75 mm, 1.25 mm, 1.0 mm, 0.75 mm, or 0.5 mm think as measured from Surface 2625 to Surface 2630.

The membrane switch illustrated in FIGS. 26A and 26C is optionally disposed such that Flexible Membrane 2620 is approximately flush with, or recessed in, First Surface 2635 of an identity device such as a driver's license or credit card. As such, Spacer 2640 prevents the membrane switch from being activated when a force is applied to the entire first surface. For example, when the identity device is placed within a wallet and the wallet is compressed.

Spacer 2640 optionally extends essentially throughout an identity device. For example, where Switchable RFID Device 2200 is a credit card, Spacer 2640 may extend to the outer edges of the credit card. Flexible Membrane 2620 optionally includes a picture of a user and/or an indication of the location of Opening 2670 in Spacer 2640. In some embodiments, Flexible Membrane 2620 is transparent and Spacer 2640 includes a picture of a user or a credit card number. In some embodiments, Spacer 2640 includes a cavity configured to fit an integrated circuit, the integrated circuit configured to operate as part of Tag 2260 and optionally mounted on Support Layer 2640. In some embodiments, Support Layer 2640 includes conductive traces configured to connect Tag 2260 to an RFID Antenna 2240. In some embodiments, Spacer 2640 is generally rectangular in shape, (e.g., in the shape of a financial card).

Figure 27:
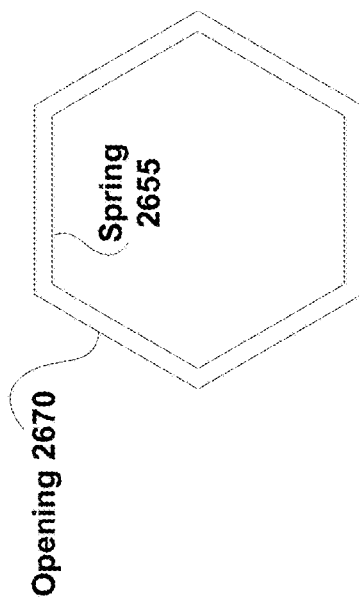
FIG. 27 illustrates a top view of a membrane switch, according to various embodiments of the invention.

FIG. 27 illustrates a top view of Membrane Switch 2600 of FIG. 26C, according to various embodiments of the invention. In these embodiments, the shape of the Opening 2670 is configured to prevent Spring 2655 from rotating. A wide variety of alternative shapes may be used in alternative embodiments.

Figure 28:
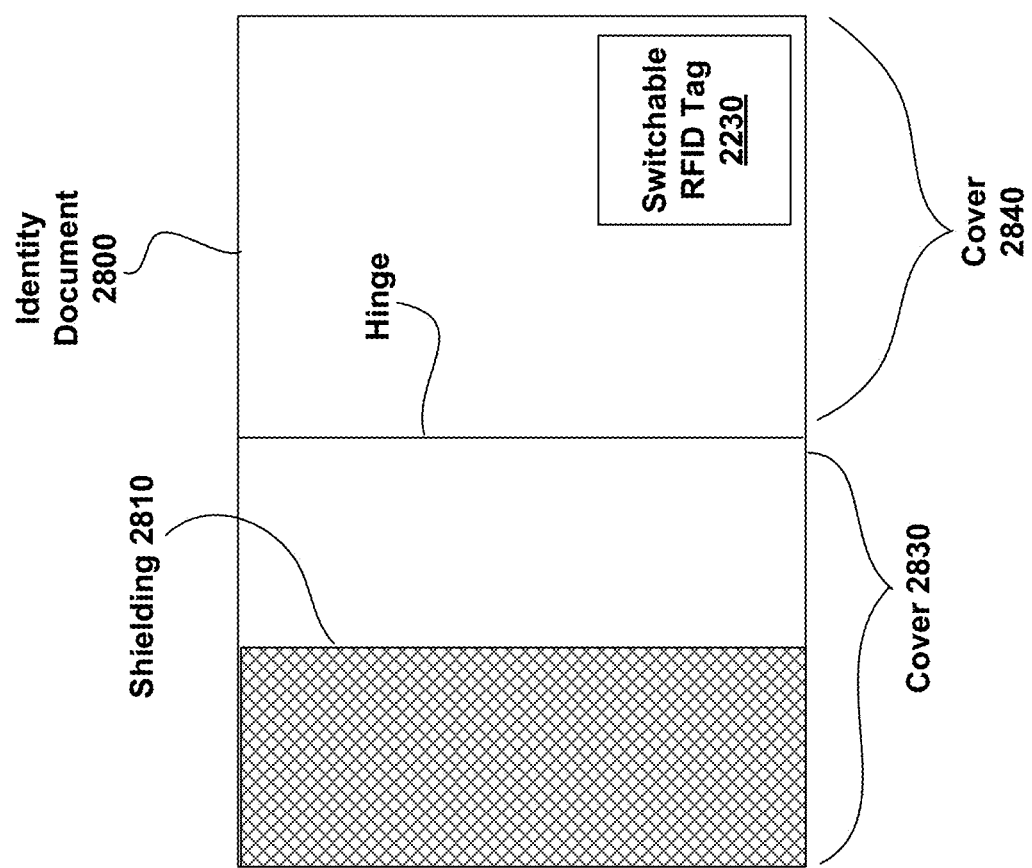
FIG. 28 illustrates a switchable RFID tag in an identity document, according to various embodiments of the invention.

FIG. 28 illustrates Switchable RFID Tag 2230 in an embodiment wherein Switchable RFID Device 2200 includes an Identity Document 2800 having a clamshell configuration (e.g., a passport). Switchable RFID Tag 2230 may be included in a Cover 2840, a Cover 2830, or an interior page (not shown) of Identity Document 2800. Identity Document 2800 optionally includes Shielding 2810. Flexible Membrane 2620 is typically disposed such that it is on the interior of Identity Document 2800 when Identity Document 2800 is closed. See U.S. Pat. No. 7,719,425 issued May 18, 2010 for further details of Identity Document 2800, according to some embodiments.

Figure 29:
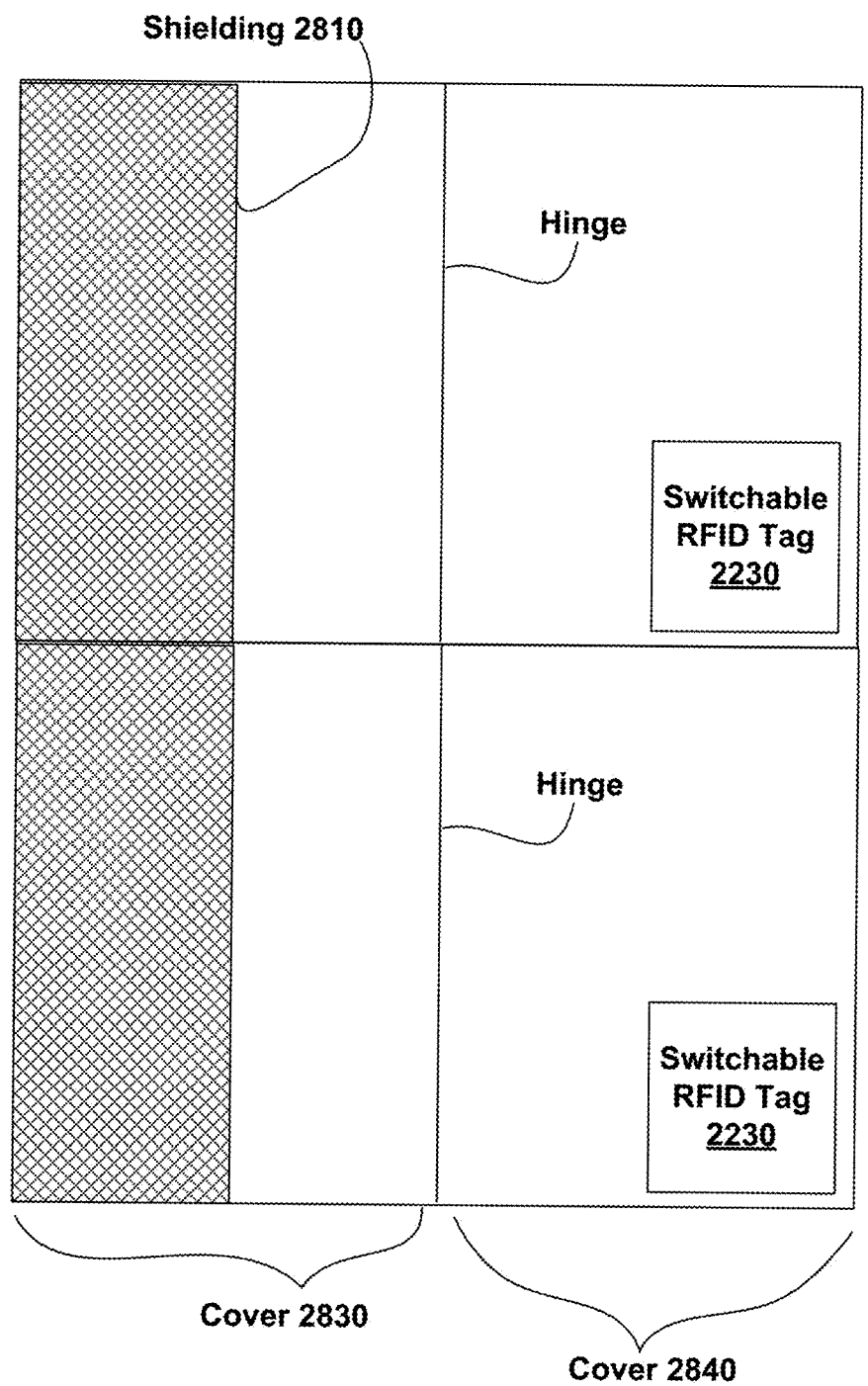
FIG. 29 illustrates the manufacture of instances of an identity document, according to various embodiments of the invention.

FIG. 29 illustrates the manufacture of instances of Identity Document 2800. At one stage in the manufacturing process, Shielding 2810 is dispensed in the form of a strip. The strip is laid down over what will be several separate instances of Identity Document 2800 (after when the manufacturing is completed). A plurality of Switchable RFID Tag 2230 are deposited, creating a device including several Switchable RFID Tag 2230. The assembled material, including Shielding 2810 is optionally cut to separate the locations where the instances of Switchable RFID tag 2230 are deposited or to be deposited. As a result a plurality of Identity Document 2800 are produced. Pages are optionally added to the assembled material prior to cutting. See U.S. non-provisional patent application Ser. No. 11/350,309 filed Feb. 7, 2006 for further details, according to some embodiments.

In the above and other embodiments, Switchable RFID Tag 2230 is optionally disposed such that the switch mechanism is accessed from the inside of Cover 2830 or Cover 2840, the inside being the sides that face each other when Identity Document 2800 is closed. This orientation is optionally configured to reduce the probability of inadvertently activating Switch 2270 when Identity Document 2800 is closed. For example, in these embodiments, Flexible membrane 2610 may be to the inside (of the closed Identity Document 2800) and Support Layer 2610 may be to the outside. Support Layer 2610 optionally includes a stiffener in the region near Opening 2670.

Figure 30:
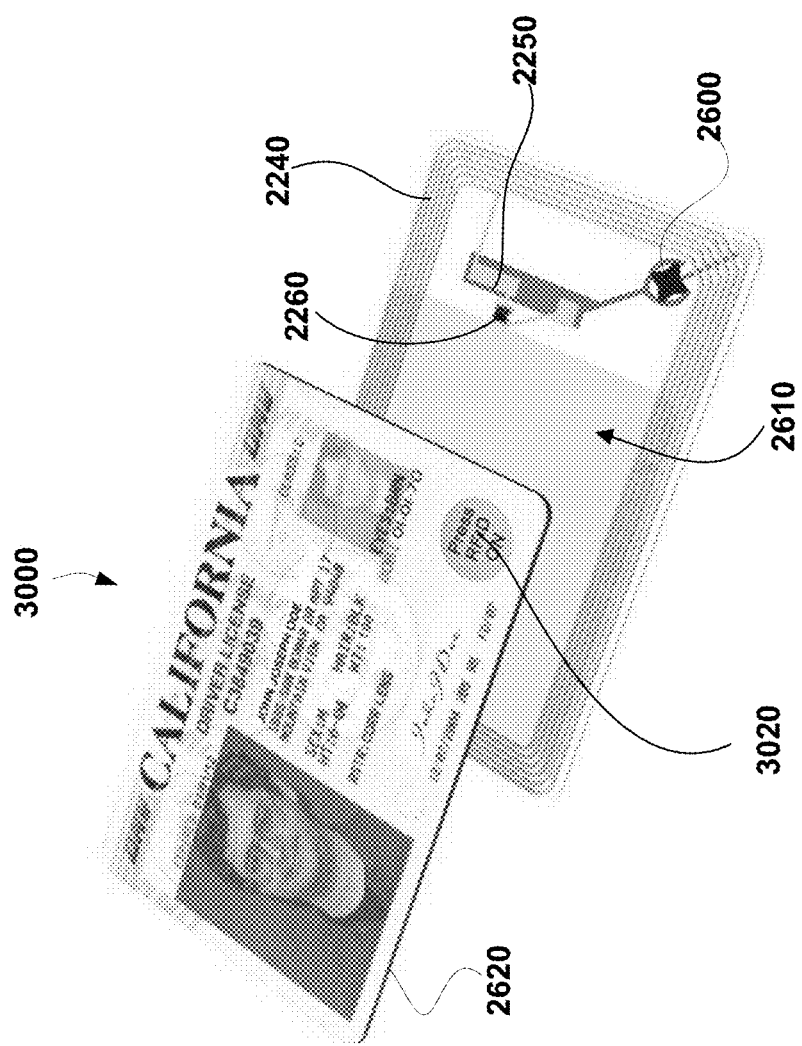
FIG. 30 illustrates an exploded view of an embodiment of a switchable RFID device including a driver's license, according to various embodiments of the invention.

FIG. 30 illustrates an exploded view of an embodiment of Switchable RFID Device 2200 including a Driver's License, generally designated 3000. In this view, for clarity, Spacer 2640 is removed and Flexible Membrane 2620 is separated from Tag 2260, RFID Antenna 2240, Circuit 2250 and Support Layer 2610. A location of Membrane Switch 2600 is indicated by Markings 3020 visible at Flexible Membrane 2620. Surface 2635 is of uniform level across the face of Driver's License 3000. As such, Switchable RFID Device 2200 can smoothly be placed in a wallet and Membrane Switch 2600 is protected from inadvertent activation by Spacer 2640. Membrane Switch 2600 is optionally disposed at least partially within RFID Antenna 2240. A similar embodiment of Switchable RFID Device 2200 may include a credit card or similar financial device.

Figure 31:
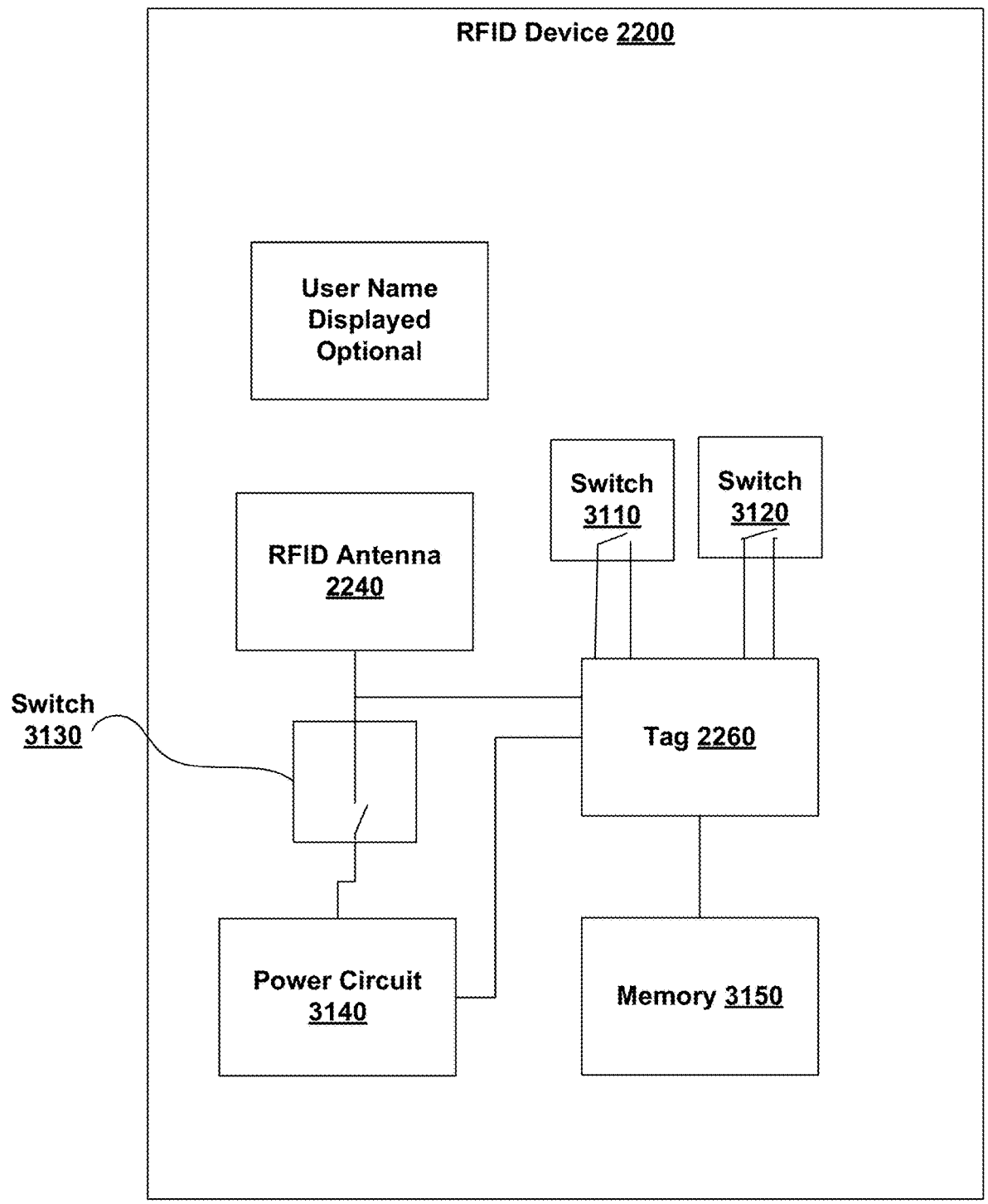
FIG. 31 illustrates an embodiment of a switchable RFID device including a plurality of switches, according to various embodiments of the invention.

FIG. 31 illustrates an embodiment of Switchable RFID Device 2200 including a plurality of Switches, designated 3110, 3120 and 3130. These embodiments of Switchable RFID Device 2200 may include an identity device, financial device, credit card, debit card, remote control, product label, communication device, or the like. Any of Switches 3110, 3120, and 3130 are optional. Switch 3130 is configured for turning Switchable RFID Device 2200 ON and OFF. For example, as illustrated, Switch 3130 may be disposed in a connection between RFID Antenna 2240 and a Power Circuit 3140. Power Circuit 3140 is an embodiment of Circuit 2250 configured to generate electrical power from a received signal to power Tag 2260.

Switch 3110 and Switch 3120 are configured to control processing logic within Tag 2260. For example, in some embodiments, Switch 3110 and Switch 3120 are configured to provide Boolean (true/false) values to a logic circuit within Tag 2260. Some embodiments include further switches (e.g., 3, 4, 6, 8, 10 or more) configured to control processing logic.

In various embodiments, the processing logic within Tag 2260 can be configured to perform a wide variety of functions responsive to Switch 3110, Switch 3120, and any additional switches present. For example, in some embodiments, the processing logic is configured such that when Switch 3110 is activated a transaction amount is approved and when Switch 3120 is activated the transaction amount is disapproved. Alternatively, Switch 3110 and Switch 3120 may be part of a set of switches used to enter a PIN (personal identification number), an encryption key, an amount, an authorization code, an RFID reader identification number, an identification number associated with Switchable RFID Device 2200, a selection of a mode of Tag 2260, text, numbers, and/or other data.

In some embodiments, data sent by Tag 2260 using RFID Antenna 2240 is responsive to Switch 3110 and/or Switch 3120. For example, in some embodiments, Tag 2260 will send a different identification number depending on whether Switch 3110 or Switch 3120 is activated. In some embodiments, Tag 2260 is configured to allow a transaction up to a certain value if neither Switch 3110 nor Switch 3120 is activated, and progressively higher values if Switch 3110 or Switch 3120 is activated. In some embodiments, Tag 2260 is configured to require that Switch 3110 and Switch 3120 be activated in a specific combination, order and/or with a specific temporal pattern in order to perform some operation, e.g., a financial transaction.

While the embodiment of Switchable RFID Device 2200 illustrated in FIG. 31 includes one instance of Tag 2260, as discussed elsewhere herein, Switchable RFID Device 2200 optionally includes more than one instance of Tag 2260. When more than one instance of Tag 2260 is present, a separate instance of Switch 3130 may be disposed between RFID Antenna 2240 (or Circuit 2250) and each instance of Tag 2260. In this configuration, the instances of Switch 3130 may be used to select which instance of Tag 2260 to activate. Switch 3110 and/or Switch 3120 may, likewise, be configured to select, activate or control different instances of Tag 2260.

In some embodiments, Switchable RFID Device 2200 includes a Memory 3150. Memory 3150 is optionally programmable. For example, in some embodiments, Memory 3150 is programmable using data entered through instances of Switch 3110 and Switch 3120. In some embodiments, Memory 3150 is changed from a write state to a read only state, using Switch 3110. In various embodiments, Memory 3150 is configured to store data to be broadcast, encryption information, data keys, values to be used in conjunction with data entered suing Switch 3110, data for logic processing, identifying data, account data, mode data characterizing a mode of Switchable RFID Tag 2230, or the like. Memory 3150 can be volatile or non-volatile, FLASH, SDRAM, ROM, DDRAM, DRAM, or the like. Some embodiments of the invention include an automated device configured to actuate Switch 2270 in order to place Switchable RFID Tag 2230 in a programmable mode.

Figure 32:
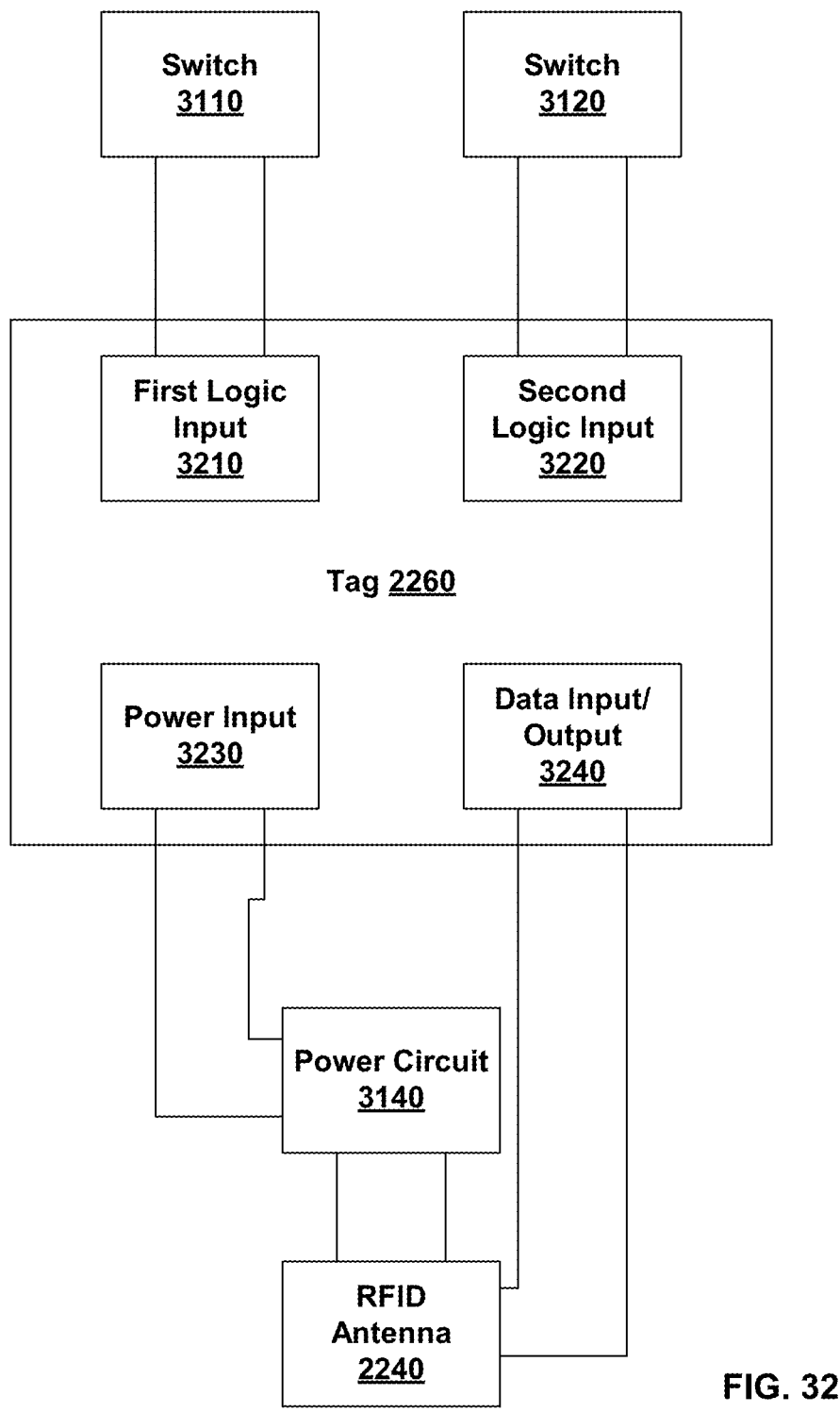
FIG. 32 illustrates various embodiments of an tag configured for use in embodiments of a switchable RFID device including a plurality of switches, according to various embodiments of the invention.

FIG. 32 illustrates various embodiments of Tag 2260 configured for use in embodiments of Switchable RFID Device 2200 including a plurality of switches. In the illustrated embodiments, Tag 2260 includes a First Logic Input 3210 and an optional Second Logic Input 3220, configured to be coupled to Switch 3110 and Switch 3120, respectively. First Logic Input 3210 and Second Logic Input 3220 are each configured to be responsive to a different switch. First Logic Input 3210 and Second Logic Input 3220 are configured to control the function of Tag 2260.

For example, in some embodiments, Tag 2260 is configured to output different data via a Data Input/Output 3240 depending on the state of Switch 3110 as determined by the First Logic Input 3210. Tag 2260 is optionally configured to output different data depending on whether a switch coupled to First Logic Input 3210 or a switch coupled to Second Logic Input 3220 is activated.

In some embodiments, the switches illustrated in FIG. 32 are membrane switches. In some embodiments, the switches illustrated in FIG. 32 are irreversible switches.

Figure 33:
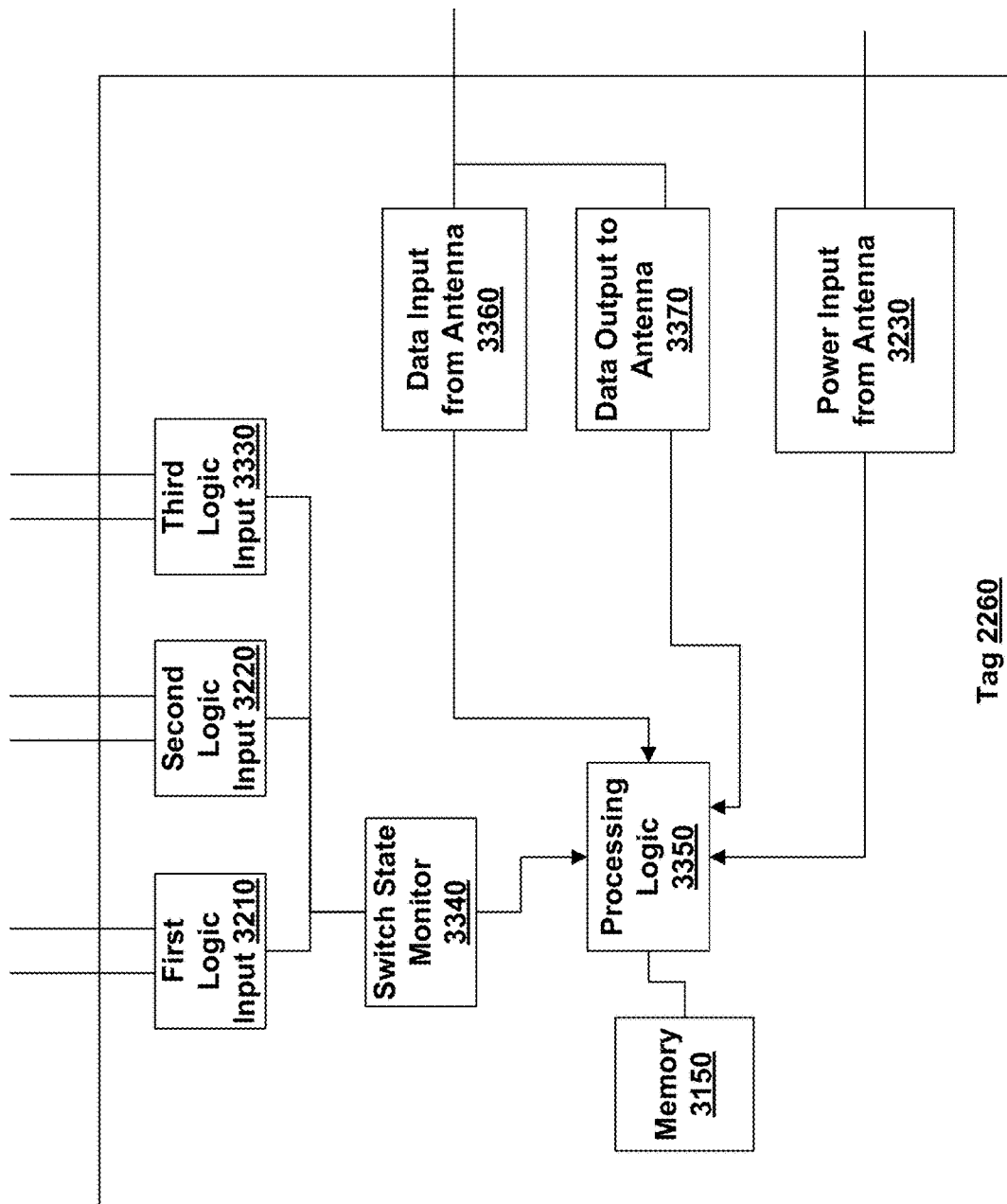
FIG. 33 illustrates an instance of a tag, according to various embodiments of the invention.

FIG. 33 illustrates an instance of Tag 2260, according to various embodiments of the invention. These embodiments include a plurality (e.g., 2, 3, 4, 8, 10, 12 or more) of switch inputs, such as First Logic Input 3210, Second Logic Input 3220 and Third Logic Input 3330. First Logic Input 3210, Second Logic Input 3220 and Third Logic Input 3330 are configured to receive inputs from Switch 3110, Switch 3120, Switch 3130, or the like, respectively. The state of connected switches (Switch 3110, Switch 3120, etc.) is monitored by an optional Switch State Monitor 3340 and a Processing Logic 3350. Switch State Monitor 3340 is optionally a multiplexer, latch, logic circuit, or the like.

In some embodiments, Processing Logic 3350 is configured to process data received through a Data Input From Antenna 3360, to receive power from a Power Input From Antenna 3230, and to generate data for output through a Data Output to Antenna 3370 responsive to the states of Switch 3110, Switch 3130, etc. The generated data is optionally further responsive to data stored in Memory 3150 and/or data received from Data Input from Antenna 3360.

The data received from Memory 3150 can include codes required for Processing Logic 3350 to generate specific data for communication through Data Output to Antenna 3370. For example, in some embodiments, Tag 2260 is configured to output an RF signal only if data in Memory 3150 matches a state of Switches 3110 and 3120. In some embodiments, the state of switches is used to determine which of several different alternative RF signals to transmit. For example, if Switch 3110 is activated then a first signal is transmitted, if Switch 3120 is activated then a second signal is transmitted, and if no switches are depressed than no signal is transmitted or an third signal is transmitted. The first and second signals are optionally associated with different financial accounts and/or different functions.

Some embodiments of the invention include a multi-switch credit card including one or more instances of Tag 2260. This multiswitch credit card optionally is configured to be associated with more than one financial account and switches may be used to indicate which of the more than one financial account should be used for a transaction. In one example, the multiswitch credit card includes an instance of Tag 2260 configured for engaging in a financial transaction responsive to Switch 3110 and also configured to operate an electronic lock responsive to Switch 3120.

Some embodiments of the invention optionally include programming of Tag 2260 to make associations with the one or more financial account. This programming can include entering data within Memory 3150. Alternatively, Tag 2260 is configured to include a plurality of exchangeable Memory 3150. In these embodiments, Tag 2260 is programmed to operate with different financial accounts and/or functions by inserting different instances of Memory 3150 within Switchable RFID Tag 2230. The multiswitch credit card is, thus, optionally a multi account credit card.

Some embodiments of Switchable RFID Device 2200 are configured to include a plurality of Tag 2260. Each member of the plurality of Tag 2260 may be responsive to one or more switches. In some embodiments, Switchable RFID Device 2200 is configured to receive one or more replaceable instances of Tag 2260. In these embodiments, Switchable RFID Device 2200 may be programmed by replacing an instance of Tag 2260. Multiple instances of Tag 2260 optionally share one instance of RFID Antenna 2240 and/or one instance of Memory 3150.

Figure 34:
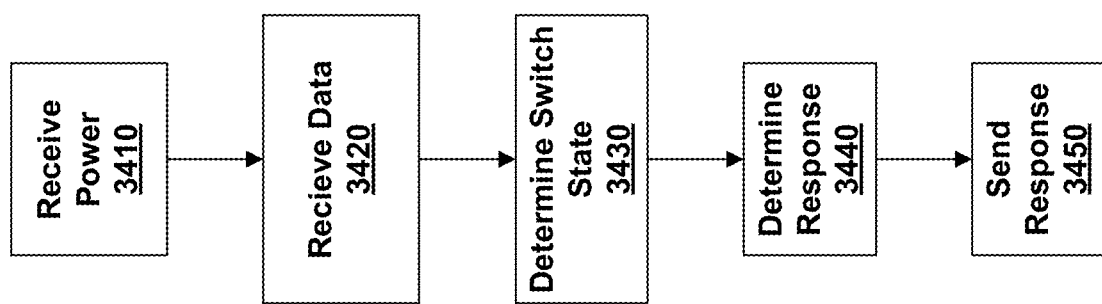
FIG. 34 illustrates a method according to various embodiments of the invention, according to various embodiments of the invention.

FIG. 34 illustrates a method according to various embodiments of the invention. In these embodiments, power is received by Tag 2260 through an RF or inductive signal in a Receive Power Step 3410. The RF signal optionally includes data received in a Receive Data Step 3420. The state of one or more of Switches 3110, Switch 3120, etc. is then determined in a Determine Switch State 3430 Step. This state is used to determine an RF response, of any, in a Determine Response Step 3440. The RF response is then sent in a Send Response Step 3450.

Figure 35:
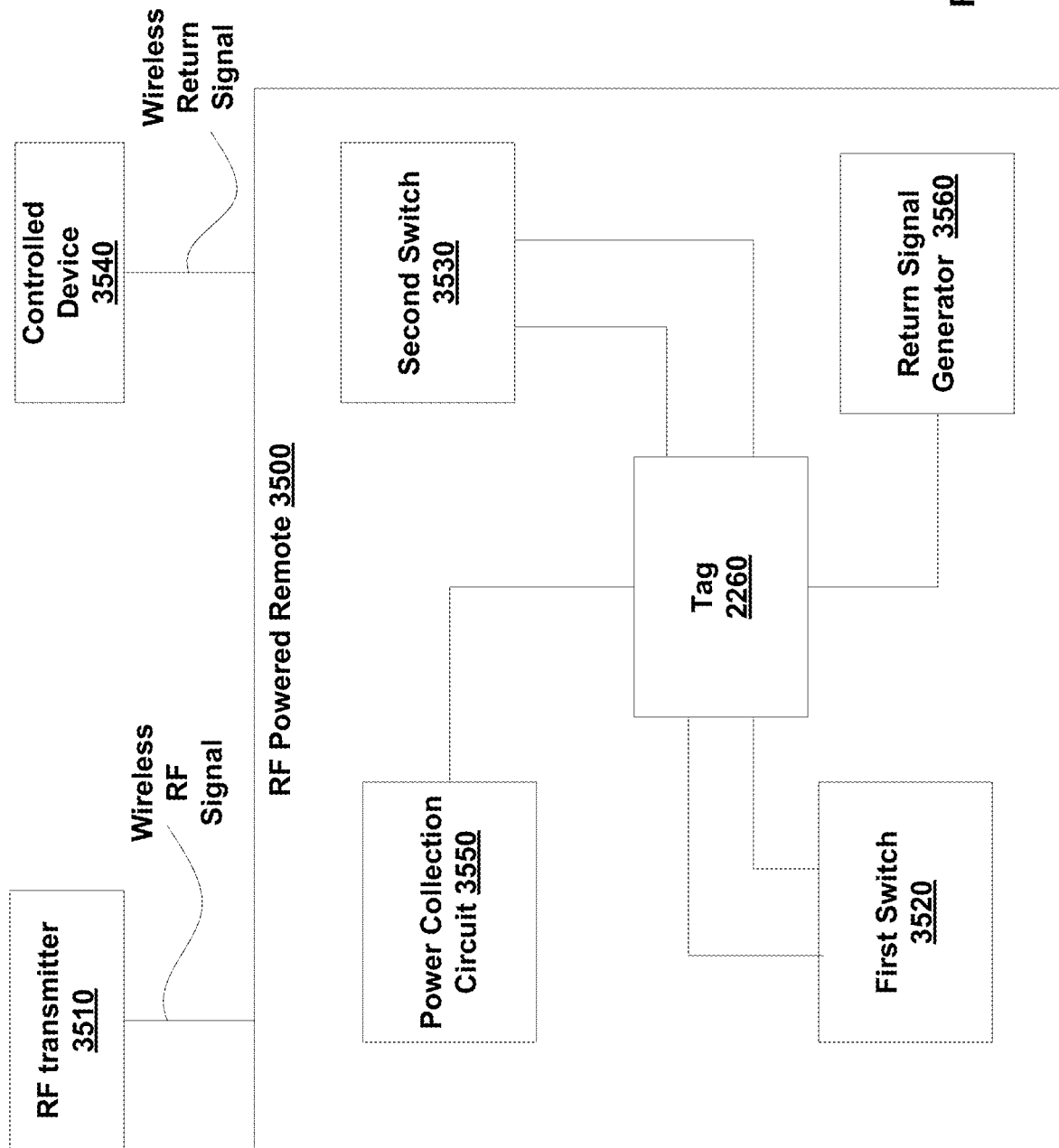
FIG. 35 illustrates a switchable RFID device configured to operate as a remote control, according to various embodiments of the invention.

FIG. 35 illustrates various embodiments of the invention in which Switchable RFID Device 2200 is configured as a RF Powered Remote 3500 configured to control external devices. This RF Powered Remote 3500 optionally does not require an internal power source (e.g., is powered wirelessly). Power is received from an RF (radio frequency) signal via RFID Antenna 2240 and used to send a return signal, typically through the same instance of RFID Antenna 2240. RF Powered Remote 3500 uses one or more Switchable RFID Tag 2230 to activate and deactivate or modify the return signal. The one or more Switchable RFID Tag 2230 optionally share RFID Antenna 2240, power circuits, and/or processing logic. RF Powered Remote 3500 is typically a multifunction remote control.

RF Powered Remote 3500 is optionally used as part of a locking mechanism, such as in a vehicle lock or door lock. RF Powered Remote 3500 is optionally configured to control electronic equipment, such as a computing device, a video recording device, projector, a game, a stereo, or a television. RF Powered Remote 3500 is optionally configured to control a garage door opener.

As illustrated in FIG. 35, a Transmitter 3510 is configured to send an RF signal to provide power to RF Powered Remote 3500. This RF signal is received by RF Powered Remote 3500. When a switch (e.g. a First Switch 3520 or a Second Switch 3530), included in RF Powered Remote 3500, is in a first position the received power is used to send a return signal from RF Powered Remote 3500 to the device being controlled, e.g. a Controlled Device 3540. Transmitter 3510 is optionally included in Controlled Device 3540. When First Switch 3520 and/or Second Switch 3530 is in a second position the received power is not used to send the return signal from the remote, or is used to send a different return signal. The return signal may include audio, RF, infrared light, visible light, or the like. First Switch 3520 and Second Switch 3530 are optionally embodiments of Switch 3110, Switch 3120, or Switch 3130. In various embodiments, RF Powered Remote 3500 includes 1, 2, 3, 4 or more switches, such as First Switch 3520 and Second Switch 3530. Typically, different switches are configured to control different functions of Controlled Device 3540.

In some embodiments, First Switch 3520 and/or Second Switch 3530 are configured to control the collection of power from the RF signal. In some embodiments, First Switch 3520 and/or Second Switch 3530 are configured to prevent the power from flowing through an integrated circuit within the RF Powered Remote 3500. In some embodiments, the First Switch 3520 and/or Second Switch 3530 are configured to decouple an instance of RFID Antenna 2240 within RF Powered Remote 3500. In some embodiments, the First Switch 3520 and/or Second Switch 3530 are configured to prevent data transmission from RF Powered Remote 3500. In some embodiments, First Switch 3520 and/or Second Switch 3530 are configured to control logic within an instance of Tag 2260 within RF Powered Remote 3500. In various embodiments, First Switch 3520 and/or Second Switch 3530 are normally on or normally off. In some embodiments, more than one switch is configured to control logic within the same integrated circuit.

The embodiments of RF Powered Remote 3500 illustrated in FIG. 14 include a Power Collection Circuit 3550 configured to convert the received RF signal to electrical power of the operation of one or more Tag 2260. RF Powered Remote 3500 is configured to power an integrated circuit, e.g., Tag 2260, and send a return signal using the electrical power produced by Power Collection Circuit 3550. The RF Powered Remote optionally receives all of its electrical power from the Power Collection Circuit 3550.

Depending on the state of First Switch 3520 and/or Switch 3530, Tag 2260 may cause the return signal to be transmitted using a Return Signal Generator 3560. Return Signal Generator 3560 is optionally included in Tag 2260. Return Signal Generator 3560 is optionally shared by a plurality of Tag 2260 within RF Powered Remote 3500. In some embodiments, Return Signal Generator 3560 includes an instance of RFID Antenna 2240.

First Switch 3520 and Second Switch 3530 each control Tag 2260, such that the return signal is responsive to the states of these, and optionally further, switches. For example, in some embodiments, if First Switch 3520 is on, then Tag 2260 will include a first data in the return signal, and if Second Switch 3530 is on, then Tag 2260 will include a second (typically different) data in the return signal.

The RF Transmitter 3510 and Controlled Device 3540 are optionally separate. For example, the RF transmitter may be included in an automobile and the controlled device may be a garage door.

In some embodiments, First Switch 3520 is activated by insertion of RF Powered Remote 3500 in part of a locking system.

In some embodiments, First Switch 3520 is coupled to a button configured for turning the volume of an electronic device up and/or Second Switch 3530 is coupled to a different button configured for changing a channel.

In some embodiments, RF Powered Remote 3500 is configured to unlock a car.

In various embodiments, RF Powered Remote 3500 includes a wireless keypad, a wireless computer mouse, a wireless keyboard, a wireless microphone, a key, a telephone, an identity document, or the like.

In some embodiments, RF Powered Remote 3500 is included in a hermetically sealed and/or waterproof housing. Because the RF powered remote is remotely powered, there is no necessity for a battery compartment or power plug.

First Switch 3520 and Second Switch 3530 may include a push-button switch, a membrane switch, a sliding switch, a magnetic switch, or any of the many other switches known in the art to make and break electrical connections. First Switch 3520 is optionally part of a roller, wheel or dial that makes and breaks an electrical connection as it is turned. First Switch 3520 and Second Switch 3530 are optionally embodiments of Switch 2270.

In some embodiments, a single instance of RF Transmitter 3510 is configured to power a plurality of Tag 2260. Each of this plurality of Tag 2260 is optionally configured to control a separate electronic device or operate different functions in a single electronic device. The plurality Tags 2260 optionally included in the same RF Powered Remote 3500.

In some illustrative embodiments, an instance of RF Transmitter 3510 is disposed within a vehicle dashboard and a plurality of Tag 2260 are disposed within a steering wheel of the vehicle or rear view mirror. One of the plurality Tag 2260 is configured to control an audio system and another of the plurality of switchable RFID tags is configured to control a climate system (e.g., air conditioner or heating). In some embodiments, the wireless response signals generated by both of these Tag 2260 is received by a RF receiver and communicated to a circuit that then controls the separate electronic devices. In alternative embodiments, each of the separate electronic devices (e.g., audio system and climate system) includes a separate RF receiver configured to receive the response signals.

Figure 36:
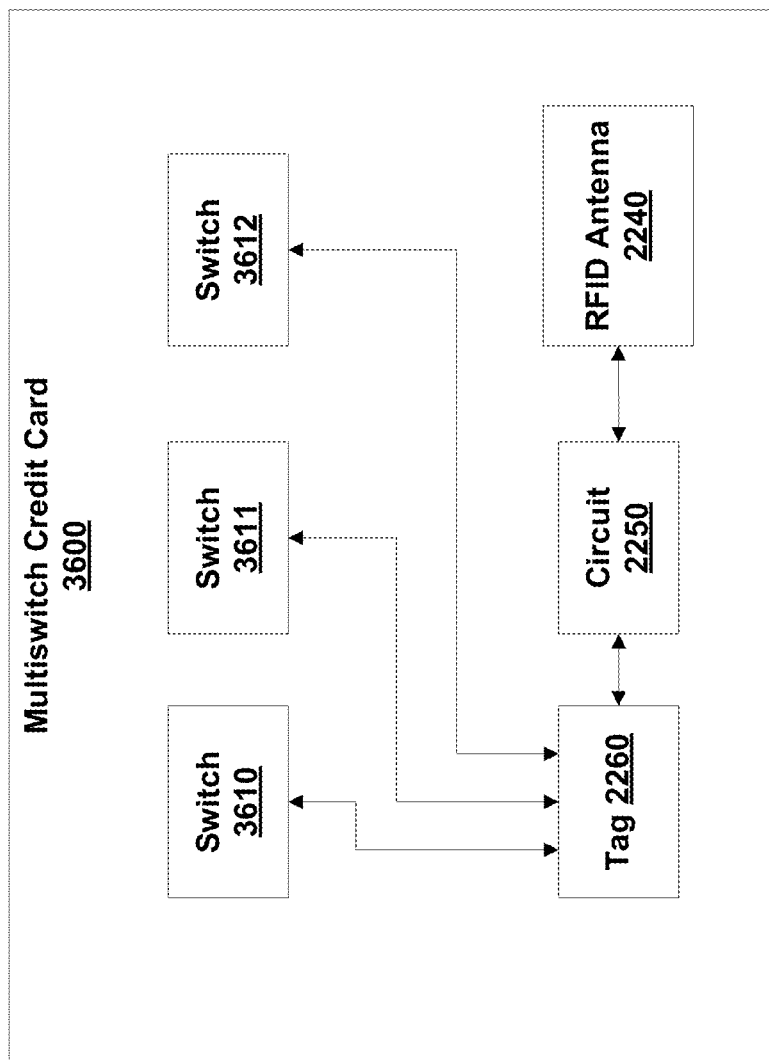
FIG. 36 illustrates a multiswitch credit card, according to various embodiments of the invention.

FIG. 36 illustrates an embodiment of Switchable RFID Device 2200 including a Multiswitch Credit Card 3600, according to various embodiments of the invention. Multiswitch Credit Card 3600 includes two or more switches, such as Switch 3610, Switch 3611, and optional Switch 3612. Switches 3610, 3611 and 3612 are optionally embodiments of Switch 3110 and Switch 3120. Multiswitch Credit Card 3600 further includes one or more instances of Tag 2260, an optional instance of Circuit 2250 configured to generate power for used by Tag 2260, and RFID Antenna 2240. In embodiments without Circuit 2250, Multiswitch Credit Card 3600 includes its own power source (not shown).

Switches 3610-3612 are each configured to make or break an electrical connection, the state of which can be determined by the resistance of electric current flow or the presence of a current or voltage. In some embodiments, Switches 3610-3612 are membrane switches, such as Membrane Switch 2600. In various embodiments, Multiswitch Credit Card 3600 including Switches 3610-3612 is less than 4, 3, 2, 1.5, 1, or 0.5 mm thick. In various embodiments, Switches 3610-3612 are essentially flush with a front surface of Multiswitch Credit Card 3600.

In some embodiments, Circuit 2250 is configured to generate electrical power from the RF signal received via RFID Antenna 2240 for use by one or more instances of Tag 2260. In some embodiments, Circuit 2250 and/or RFID Antenna 2240 are shared by several instances of Tag 2260 within Multiswitch Credit Card 3600. In some embodiments, Multiswitch Credit Card 3600 is configured not to transmit an RF signal unless at least one of Switches 3610-3612 is activated. In some embodiments, Switches 3610-3612 are configured for entering an access code, such as PIN or password. The access code is optionally encoded by an order in which the states of switches are changed, by a switch combination, and/or by a temporal relationship between changes in switch state, e.g., a temporal pattern.

In some embodiments, Switches 3610-3612 are configured for approving the amount of a financial transaction. In some embodiments, Switches 3610-3612 are configured for selecting from among a plurality of financial accounts. For example, activating Switch 3610 may result in a transaction being debited from a checking account, activating Switch 3611 may result in a transaction being applied a first charge account, and activating Switch 3612 may result in a transaction being applied to a second charge account.

In some embodiments, Multiswitch Credit Card 3600 (or other embodiments of Switchable RFID Device 2200) includes encryption logic configured to operate in response to the activation of switches. For example, the encryption logic may be configured to use data received via switches as an encryption or decryption key. The encryption logic may be configured to encrypt data received via switches prior to transmission of this data. In some embodiments, Switchable RFID Tag 2200 is configured to make use of rolling codes for security purposes. In these embodiments, synchronization of the codes is optionally be coordinated by a central server configured to communicate with point of sale stations. In some embodiments, a switch is activated using a biometric sensor. The features described herein with respect to various embodiments of Switchable RFID Device 2200, such as Multiswitch Credit Card 3600, may be included in other types of identity devices.

In various embodiments of the invention, an identity device includes both one or more electrical contact configured to make physical electrical contact with a reader and a RFID tag configured to communicate wirelessly with a reader. The physical contact is optionally used to convey communication that is different from the wireless communication. For example, the physical connection based communication may include programming of a circuit within the RFID tag (e.g., programming account number), while the wireless communication may be more limited than the physical connection based programming, (e.g., the wireless communication may be limited to reading the programmed account number). In another example, the wireless communication may be configured for a limited set of transaction types (e.g., those less than $50, or deposits), while the physical communication is configured for additional transaction types (e.g., larger value withdrawals). Further, the physical communication may be used for downloading transaction logs or other data stored on the ID card. Transaction logs are optionally stored using power received through RFID Antenna 2240.

In various embodiments, an identity device includes a plurality of switches and is configured to engage in a transaction or allow access (to an account, data, or a physical location) responsive to whether proper members of the plurality of switches are pressed. For example, in one embodiment the ID card includes 10 switches configured for a user to enter a PIN (personal identification number) or password. Only when the proper data is entered using the plurality of switches will the ID card participate in certain functions, such as an electronic payment or opening of a lock. As described further herein, different numbers of switches are possible.

In various embodiments, an identity device includes logic configured to process data entered using a plurality of switches. This logic may, for example, prevent the identity device from transmitting an RF signal unless the entered data matches previously stored data, for example, if an entered PIN matches a stored access code. The logic may be responsive to the order of switches activated, combinations of switch activation (e.g., which switches are activated at the same time), or which of the plurality of switches are activated. Timing may be achieved through the use of appropriate RC (resister-capacitor) circuits or a clock signal.

Various embodiments of the invention include a modified version of Basic Access Control. In these embodiments, the logic is configured to prevent the identity device from transmitting certain data unless the data entered using switches on the identity device matches an ID number of a RFID reader making a request. The logic may be configured to implement Basic Access Control, such as that used in electronic U.S. passports, but unlike the system used in current passports, the data entered is an ID of the reader and the data is entered at the passport (or other identity device) rather than at the reader.

In various embodiments, the identity device includes a plurality of switches configured for a user to enter data associated with a reader. For example, in some embodiments, the switches are configured to receive an ID number of a point of sale (POS) device. Logic within the identity device may then use this ID number to assure that a transaction is communicated to the correct POS device. For example, if several vending devices are positioned adjacent to each other, the ID number of one of the vending devices may be entered in the identity device using the plurality of switches and the ID card may then be enabled to engage in a transaction with that particular vending device but not the other nearby vending devices.

Passwords, PINs, or the like received by the identity device through the plurality of switches are optionally stored in volatile memory within the identity device. When the identity device ceases to receive energy through an RF signal the data stored in this volatile memory is discarded (lost). In some embodiments, this data is stored in non-volatile memory and thus retained between RF transmissions.

In some embodiments, the identity device is configured to store an account balance in static memory. Logic within the identity device is optionally configured such that the account balance can only be increased using a physical connection, while the account balance can be debited using a wireless connection. Alternatively, logic within the identity device is optionally configured such that the account balance can only be debited using a physical connection.

Some embodiments of the invention include methods of purchasing using a switchable RFID. The identity device is placed within the reading range of a wireless POS device. One of a plurality of switches within identity device is activated such that an RFID tag will respond to an RF signal from the POS device. The RFID tag responses to the RF signal from the POS by energizing itself using the RF signal and generating a response RF signal. The responsive RF signal includes an account number such as a checking or savings account number, a credit card number, identity number, or the like, responsive to the switch.

FIGS. 37A-37C illustrate positions of RFID Antenna 2240 within Multiswitch Credit Card 3600, according to various embodiments of the invention. As illustrated in FIG. 37A, in some embodiments, RFID Antenna 2240 is disposed such that Embossed Lettering or Numbering 3620 is inside of RFID Antenna 2240. In these embodiments, at least part of Switch 2270 (or a plurality thereof) is optionally disposed inside of RFID Antenna 2240. As illustrated in FIGS. 37B and 37C, in some embodiments, RFID Antenna 2240 is disposed primarily in the part of a credit card (e.g., the upper half) that does not include Embossed Lettering or Numbering 3620. In these embodiments, Switch 2270 (or a plurality thereof) may be disposed either inside and/or outside of RFID Antenna 2240. As illustrated in FIG. 37C, when Switch 2270 is disposed outside of RFID Antenna, Connections 3615 between Switch 2270 and Tag 2260 are optionally routed to avoid Embossed Lettering or Numbering 3620. In some embodiments, Spacer 2640 is comprised of a material that can be embossed to form raised lettering and numbering (e.g., a name and credit card number). In these embodiments, the manufacture of Embossed Lettering or Numbering 3620 can be made through Spacer 2640.

In some embodiments, of the invention, one or more instances of Switch 2270 are configured to control whether Tag 2260 (and/or associated memory) are in a programmable state or a non-programmable state. For example, when an instance of Switch 2270 is in a first state writing to non-volatile memory within Tag 2260 is allowed and when Switch 2270 is in a second state writing to the non-volatile memory is not allowed but reading of the non-volatile memory may be allowed. In some embodiments, Switch 2270 is initially in a state wherein the non-volatile memory can be written to and the switch is then irreversible changed to a state wherein the non-volatile memory can no longer be written to.

Figure 38:
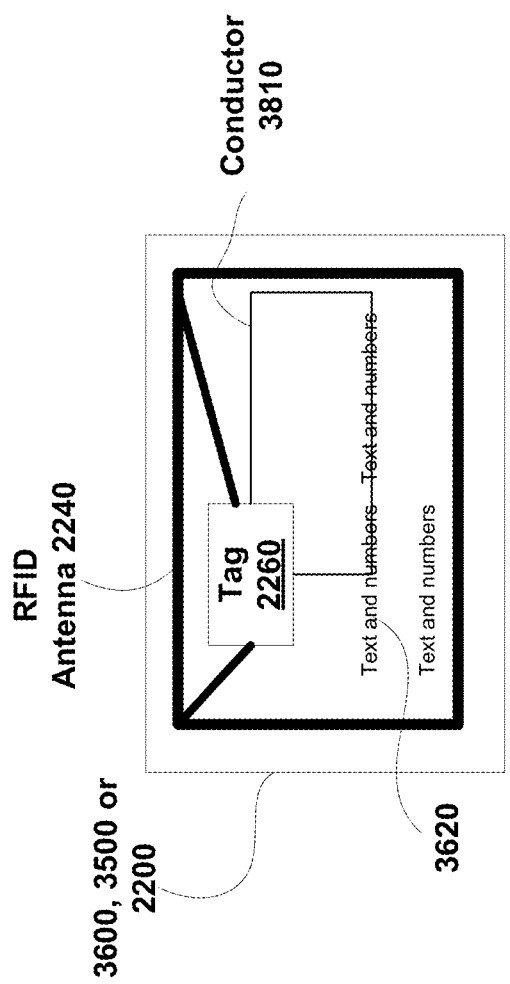
FIG. 38 illustrates an RFID device including a conductor configured to set a state of an RFID tag, according to various embodiments of the invention.

The irreversible change optionally includes breaking of a conductor. For example, in some embodiments, an RFID enabled identity device is configured such that an instance of Switch 2270 comprises a Conductor 3810 coupled to Tag 2260. As illustrated in FIG. 38, when Conductor 3810 is unbroken Tag 2260 is in a programmable state, e.g., non-volatile memory within Switchable RFID Tag 2230 can be written to. After programming this conductor is broken and Tag 2260 is thus irreversibly changed to a nonprogrammable state. Data already programmed within Switchable RFID Tag 2230 may be locked by the breaking of Conductor 3850. In one embodiment, Conductor 3810 is broken through the manufacture of Embossed Lettering or Numbering 3620. For example, embossing a credit card number into a credit card can break a conductor and thus lock the contents of non-volatile memory within the credit card. In alternative embodiments, an identity device includes a plurality of Conductor 3810 and members of this plurality are broken in order to program function of Tag 2260. Each member of the plurality of Conductor 3810 that is or is not broken represents one bit of logic programmed.

Some embodiments of the invention include a switchable RFID tag is configured to be remotely switched using an RF signal. In some embodiments, in an OFF state, the RFID tag will not transmit a response signal and thus is not remotely detectable using an RF signal. In an ON state, the RFID tag will transmit a response signal. The RFID tag is switched between the ON state and the OFF state through receipt of a specific command or commands, through an RF signal. In alternative embodiments, the RFID tag includes multiple ON states, optionally in combination with an OFF state.

Figure 39:
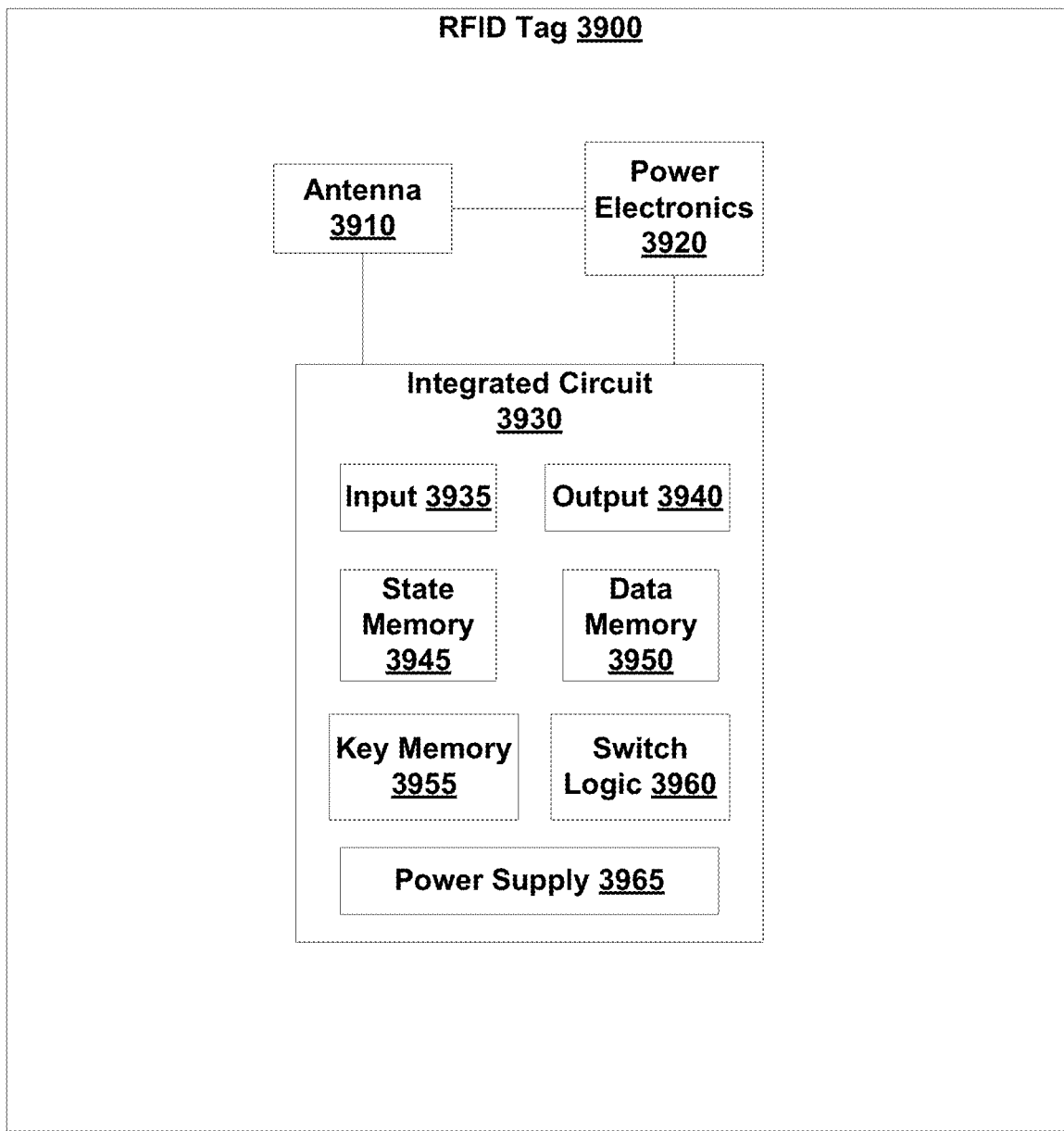
FIG. 39 is a block diagram illustrating an RFID tag, according to various embodiments of the invention.

FIG. 39 illustrates a remotely switchable RFID Tag 3900 including an Antenna 3910, a Power Electronics 3920, and an Integrated Circuit 3930. RFID Tag 3900 is optionally an embodiment of other RFID tags disclosed herein. Likewise, Antenna 3910, Power Electronics 3920 and Integrated Circuit 3930 are optionally embodiments of other antennae, power electronics and integrated circuits disclosed herein. Antenna 3910 is configured to send and receive data encoded in an RF signal and also optionally configured to receive sufficient energy to power RFID Tag 3900.

Power Electronics 3920 are configured to receive energy through Antenna 3910 and to power Integrated Circuit 3930 using this received energy. Power Electronics 3920 typically include elements such as a diode, capacitor, transistor, or the like.

Integrated Circuit 3930 includes an Input 3935 configured to receive data from Antenna 3910 and power from Power Electronics 3920. Integrated Circuit 3930 further includes an Output 3940 configured to convey data to Antenna 3910 for transmission as an RF signal.

Integrated Circuit 3930 further includes an optional State Memory 3945 configured to store the current state of the RFID Tag, e.g., ON or OFF. In various embodiments, State Memory 3945 includes a memory location in a static random access memory, a magnetic memory, or the like. In these embodiments, the state stored within State Memory 3945 is preserved without a constant source of power. In some embodiments, State Memory 3945 includes memory configured to store data only while power is available. In this embodiment, the ON state is typically temporary and automatically reverts to the OFF state after power is no longer available.

Integrated Circuit 3930 further includes an optional Data Memory 3950 configured to store data received through Antenna 3910, and/or to be transmitted using Antenna 3910. The data stored in Data Memory 3950 may include a serial number of RFID Tag 3900, identification data, biometric data, medical information, license information, or the like.

Integrated Circuit 3930 further includes a Key Memory 3955 configured to store a key required to change the state of the RFID Tag 3900 from ON to OFF, from OFF to ON, and/or between two ON states. Key Memory 3955 is typically static memory, and optionally read only memory or write-once memory. In other embodiments, the Key Memory 3955 is memory configured for temporary storage of data.

Integrated Circuit 3930 further includes Switch Logic 3960 configured to read the state stored in State Memory 3945 and, responsive to the read state, either transmit or not transmit an RF signal using Antenna 3910. The transmitted data optionally includes data stored in Data Memory 3950. In some embodiments, Switch Logic 3960 is configured to not transmit an RF signal unless the state read from State Memory 3945 indicates that the RFID Tag is in an ON state. In some embodiments, Switch Logic 3960 is configured to read the state stored in State Memory 3945 and, responsive to the read state, transmit one of a plurality of alternative data stored in Data Memory 3950. In some embodiments, Switch Logic 3960 is configured to read the state stored in State Memory 3945 and, responsive to the read state, transmit different amounts of data stored in Data Memory 3950.

In some embodiments, Switch Logic 3960 is configured to receive data through Antenna 3910, to read a key from Key Memory 3955, to compare the received data with the read key, and to change the state stored in State Memory 3945 responsive to this comparison. For example, in some embodiments, if the read key matches the received data, the state of the RFID Tag 3900 is set to ON, or changed from one ON state to another ON state. In some embodiments, Switch Logic 3960 includes logic configured to decrypt or apply a hash function to the received data prior to the comparison. The Switch Logic 3960 can include software, hardware, and/or firmware. In some embodiments, State Memory 3945 is configured to store a rolling code.

In some embodiments, Integrated Circuit 3930 is embodied in several devices. For example, the functionality of Integrated Circuit 3930 may be distributed among several chips. In some embodiments, Key Memory 3955, Antenna 3910, Switch Logic 3960 and/or State Memory 3945 are configured to be shared by more than one instance of Integrated Circuit 3930. For Example, two or more instances of RFID Tag 3900 may be included in a single device and these two or more instances of RFID Tag 3900 may share a single instance of Key Memory 3955, Antenna 3910, Switch Logic 3960 and/or State Memory 3945.

In some embodiments, RFID Tag 3900 further includes a mechanical switch configured to control operation of RFID Tag 3900. This switch may include, for example, Switch 2270 (FIG. 22). For example, in one embodiment, Switch Logic 3960 is configured for turning ON and OFF operation of RFID Tag 3900, while Switch 2270 is configured to select between alternative ON states. In an alternative embodiment, Switch 2270 is configured for turning ON and OFF operation of RFID Tag 3900 and Switch Logic 3960 is configured for selecting between alternative ON states. In some embodiments, proper activation of both Switch 2270 and Switch Logic 3960 is required to turn RFID Tag 3900 to an ON state. Thus, in order for RFID Tag 3900 to transmit certain information, or to transmit at all, Switch 2270 must be activated by a person and Switch Logic 3960 must receive a proper key from an RF reader. This provides a dual layer of mechanical and key based security. In some embodiments, the switch must be activated and a proper key must be received in order for RFID Tag 3900 to transmit certain information. In some embodiments, use of Switch 2270 will activate RFID Tag 3900 in a first ON state and use of Switch Logic 3960 (through an RF signal) will activate RFID Tag 3900 in a second ON state. The second ON state optionally requires use of both Switch 2270 and Switch Logic 3960.

In some embodiments, Integrated Circuit 3930 also includes an independent Power Supply 3965 such as a battery or capattery.

In some embodiments, the switchable RFID Tag 3900 of FIG. 1 is included in an identification document such as a driver's license, green card, passport, or the like. In some embodiments, the Switchable RFID Tag 3900 is included in a wireless key configured to open a lock, to access data, to gain entry, or the like. In some embodiments, Switchable RFID Tag 3900 is included in a cellular telephone or another device configured to communicate using WiFi, WiMAX, or similar non-RFID standards.

FIG. 40 is a flowchart illustrating a method of changing a state of RFID Tag 3900. In an optional Receive Energy Step 4010, energy sufficient to power RFID Tag 3900 is received by Antenna 3910. Receive Energy Step 4010 is typically similar to Receive Power Step 3410. In a Receive Data Step 4020, data is received by Antenna 3910 in the form of an RF signal. In some embodiments, Receive Data Step 4020 requires that a mechanical switch be activated. In a Read Key Step 4030, a key is read from Key Memory 3955. Optionally, the data received in the Receive Data Step 4020 is decrypted or otherwise processed. In a Compare Step 4040, the read key is compared with the, optionally processed, data received in the Receive Data Step 4020.

In a Change State Step 4050, the state of RFID Tag 3900 is changed responsive to results of the comparison made in the Compare Step 4040. In some embodiments, if there is a match between the key and the data then the state of RFID Tag 3900 is set to ON. Setting the state ON optionally includes writing a value to State Memory 3945. In some embodiments, if there is no match between the key and the data then the state is set to OFF. In some embodiments, if there is a match between the key and the data, then the state is set to one of two or more possible ON states. In one of the two or more possible ON states, RFID Tag 3900 can transmit a response RF signal but the data that can be included in the response RF signal is restricted relative to another of the two or more possible ON states. For example, in one embodiment, in one ON state RFID tag 3900 is configured to include a name in the response RF signal, but another ON state RFID tag 3900 is configured to include the name and medical information in the response RF signal.

In some embodiments, RFID Tag 3900 is automatically returned to the OFF state from the ON state, in a Revert Step 4060. For example, in one embodiment the ON state remains only so long as there is charge on a capacitor. When this charge dissipates or is used, the RFID automatically returns to a default OFF state. The automatic switch back to the OFF state can be dependent on when power is no longer received from an RF signal, on the timing characteristics of an RC (resistor-capacitor) circuit, on Switch 2270, on an RF signal received, and/or the like.

FIG. 41 is a flowchart illustrating a method of operating the RFID Tag 3900 illustrated in FIG. 39. In an optional Receive Energy Step 4010 energy sufficient to power the RFID is received by Antenna 3910. In a Read State Step 4120 the state of the RFID Tag is read from State Memory 2245. In a State? Step 4130 the read state is examined. If the read state is ON, then in a Send Response Step 4140 an RF response is sent from the RFID Tag 3900 using Antenna 3910. If the read state is OFF, then the RFID Tag 3900 is prevented from sending an RF response, in an Abort Response Step 4150. In some embodiments, that include more than two states, the read state can be something other than ON or OFF. If the read state is a state other than ON or OFF then a restricted RF response is sent in a Send Restricted Response Step 4160. The restricted response typically includes less or different data than would be included if the read state had been ON.

The steps shown in FIGS. 40 and 41 are optionally performed using Integrated Circuit 3930 of FIG. 39.

In some embodiments, first data in a transmission is configured to change the state of an RFID tag to ON. Further data in the transmission is then configured to elicit a responding transmission from the RFID tag. After the transmission is concluded the RFID tag automatically reverts to the OFF state. These embodiments optionally include non-volatile memory for storage of the state.

In some embodiments, data in a transmission is configured to change the state of an RFID tag to ON. The ON state persists until the RFID tag receives data configured to change the state of the RFID tag to OFF.

Several embodiments are specifically illustrated and/or described herein. However, it will be appreciated that modifications and variations are covered by the above teachings and within the scope of the appended claims without departing from the spirit and intended scope thereof. For example, an RFID key device may include more than one RFID tag and moving of shielding may be used to determine which RFID tag can communicate with readers. The RFID tags discussed herein may include active or passive contactless circuits configured to transmit identification information. For example, in some embodiments, Tag 2260 is an active rather than a passive RFID tag. Examples discussed herein in relation to credit cards can equally be applied to other types of financial card such as a debit card, or prepaid card. For example, in some embodiments, RFID Tag 3900 is configured to change the ON/OFF state in response to a signal from a point of sale system indicating that an item has been sold. In these embodiments, RFID Tag 3900 is optionally configured to send different signals before and after a sale. A first of the different signals may be used to determine that the item has not yet been sold, and a second of the different signals may be used to determine that the item has been sold and/or may be returned. The features illustrated in FIGS. 39-41 are optionally included in embodiments illustrated by other figures of this application.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. An electronic passport comprising:
a back cover comprising a passive RFID tag, a capacitor and an antenna, the antenna being coupled to the capacitor, the capacitor configured to store energy to power the RFID tag;
a front cover comprising a shield and a surface, the surface including a visual display of personal identifying information, the shield being configured to attenuate a radio frequency signal; and
an integrated circuit including non-volatile memory storing the personal identifying information, wherein the RFID tag is configured to transmit at least a portion of the personal identifying information using a radio frequency signal powered by the capacitor.

2. The passport of claim 1, wherein the shield includes a mesh.

3. The passport of claim 1, wherein the shield includes multiple layers of metallic fibers.

4. The passport of claim 1, wherein the shield includes a wire mesh.

5. The passport of claim 1, wherein the shield includes metallic thread.

6. The passport of claim 1, wherein the RFID tag is disposed at least 5 mm from a fold separating the back cover from the front cover.

7. The passport of claim 1, wherein the RFID tag is disposed at least 10 mm from a fold separating the back cover from the front cover.

8. The passport of claim 1, wherein the personal identifying information includes a photograph.

9. The passport of claim 1, wherein the RFID tag is configured to transmit at least the portion of the personal identifying information in an encrypted form.

10. The passport of claim 1, further including a state memory configured to store a state of the RFID tag, the state memory including an integrated circuit.

11. The passport of claim 10, wherein the integrated circuit further includes a state logic configured to modify a state of the RFID tag.

12. The passport of claim 10, wherein the state memory is configured to store two alternative ON states, but not an OFF state.

13. The passport of claim 10, wherein the state memory is configured to store at least an ON state and OFF state.

14. The passport of claim 10, wherein the state memory is configured to store two alternative ON states.

15. The passport of claim 1, wherein the back cover includes at least part of the shield.

16. The passport of claim 1, wherein the shield is configured to attenuate the radio frequency signal by at least 15 dB.

* * * * *